United States Patent
Ohta et al.

(10) Patent No.: US 10,568,107 B2
(45) Date of Patent: Feb. 18, 2020

(54) WIRELESS COMMUNICATIONS SYSTEM, BASE STATION, MOBILE STATION, AND PROCESSING METHOD

(71) Applicant: FUJITSU LIMITED, Kawasaki-shi, Kanagawa (JP)

(72) Inventors: Yoshiaki Ohta, Yokohama (JP); Shinichiro Aikawa, Yokohama (JP); Takayoshi Ode, Yokohama (JP); Junichi Suga, Ota (JP); Ryuichi Takechi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/725,890

(22) Filed: Oct. 5, 2017

(65) Prior Publication Data

US 2018/0035440 A1 Feb. 1, 2018

Related U.S. Application Data

(63) Continuation of application No. PCT/JP2015/063953, filed on May 14, 2015.

(51) Int. Cl.
*H04W 72/08* (2009.01)
*H04W 88/06* (2009.01)
(Continued)

(52) U.S. Cl.
CPC .......... *H04W 72/085* (2013.01); *H04L 12/14* (2013.01); *H04L 12/141* (2013.01);
(Continued)

(58) Field of Classification Search
CPC ..... H04W 72/085; H04W 4/24; H04W 76/16; H04W 76/12; H04W 76/27; H04W 88/10;
(Continued)

(56) References Cited

U.S. PATENT DOCUMENTS 8,036,664 B2* 10/2011 Khetawat ............. H04W 24/02
370/216
8,041,335 B2* 10/2011 Khetawat ............. H04L 63/104
455/404.2
(Continued)

FOREIGN PATENT DOCUMENTS

CN          103974325 A      8/2014
EP          2 941 043 A1    11/2015
(Continued)

OTHER PUBLICATIONS

Office Action issued by Rospatent Federal Service for Intellectual Property for corresponding Russian Patent Application No. 2017134998/08(061292), dated Aug. 31, 2018, with an English translation.
(Continued)

*Primary Examiner* — Jay P Patel
(74) *Attorney, Agent, or Firm* — Myers Wolin, LLC

(57) ABSTRACT

A wireless communications system includes a first wireless-communications-apparatus that controls a second wireless-communication by a controller for a first wireless-communication; a second wireless-communications-apparatus capable of the second wireless-communication; and a third wireless-communications-apparatus capable of data transmission with the first wireless-communications-apparatus via the first or second wireless-communication, and that transmits to the first wireless-communications-apparatus, a control message including an address thereof for the second wireless-communication. When data is transmitted from the first wireless-communications-apparatus to the third wireless-communications-apparatus through the second wireless-communications-apparatus via the second wireless-communication, a processor in the first wireless-communications-apparatus for the first wireless-communication transfers the data to the second wireless-communications-apparatus through an adaptation sublayer
(Continued)

and notifies the second wireless-communications-apparatus of the address acquired from the control message. The data is already processed in a convergence layer for performing the first wireless-communication. The second wireless-communications-apparatus transmits the data to the third wireless-communications-apparatus via the second wireless-communication, using the notified address.

10 Claims, 39 Drawing Sheets

(51) Int. Cl.
```
H04W 88/10    (2009.01)
H04L 12/46    (2006.01)
H04L 12/725   (2013.01)
H04L 12/891   (2013.01)
H04L 12/801   (2013.01)
H04W 76/16    (2018.01)
H04W 76/12    (2018.01)
H04L 12/14    (2006.01)
H04M 15/00    (2006.01)
H04W 4/24     (2018.01)
H04W 28/06    (2009.01)
H04W 76/27    (2018.01)
H04W 80/02    (2009.01)
H04W 84/12    (2009.01)
```

(52) U.S. Cl.
CPC ...... *H04L 12/1403* (2013.01); *H04L 12/4633* (2013.01); *H04L 45/302* (2013.01); *H04L 47/34* (2013.01); *H04L 47/41* (2013.01); *H04M 15/41* (2013.01); *H04M 15/8214* (2013.01); *H04W 4/24* (2013.01); *H04W 28/06* (2013.01); *H04W 76/12* (2018.02); *H04W 76/16* (2018.02); *H04W 76/27* (2018.02); *H04W 88/06* (2013.01); *H04W 88/10* (2013.01); *H04W 80/02* (2013.01); *H04W 84/12* (2013.01)

(58) Field of Classification Search
CPC ..... H04W 88/06; H04W 28/06; H04W 80/02; H04W 84/12; H04M 15/41; H04M 15/8214; H04L 12/141; H04L 12/1403; H04L 12/14; H04L 47/41; H04L 45/302; H04L 12/4633; H04L 47/34
See application file for complete search history.

(56) References Cited

U.S. PATENT DOCUMENTS

| | | | |
|---|---|---|---|
| 2007/0037603 A1 | 2/2007 | Dravida et al. | |
| 2007/0070935 A1 | 3/2007 | Prakash et al. | |
| 2008/0076412 A1* | 3/2008 | Khetawat | H04W 24/02 455/432.1 |
| 2008/0076419 A1* | 3/2008 | Khetawat | H04L 12/66 455/435.1 |
| 2008/0076420 A1* | 3/2008 | Khetawat | H04W 8/04 455/435.1 |
| 2008/0076425 A1* | 3/2008 | Khetawat | H04W 88/12 455/436 |
| 2008/0311855 A1 | 12/2008 | Manousakis et al. | |
| 2009/0303932 A1 | 12/2009 | Tsirtsis et al. | |
| 2013/0088983 A1* | 4/2013 | Pragada | H04W 16/14 370/252 |
| 2013/0216043 A1* | 8/2013 | Ginzboorg | H04W 12/02 380/270 |
| 2014/0029527 A1 | 1/2014 | Okuda | |
| 2014/0369201 A1 | 12/2014 | Gupta et al. | |
| 2015/0003435 A1 | 1/2015 | Horn et al. | |
| 2015/0334601 A1 | 11/2015 | Gao et al. | |
| 2017/0346659 A1 | 11/2017 | Lu et al. | |
| 2017/0374579 A1* | 12/2017 | Wang | H04W 28/08 |
| 2018/0092147 A1* | 3/2018 | Pelletier | H04L 63/205 |

FOREIGN PATENT DOCUMENTS

| | | |
|---|---|---|
| EP | 3 070 975 A1 | 9/2016 |
| JP | 2011-503914 A | 1/2011 |
| JP | 2014-3644 A | 1/2014 |
| JP | 2014-27548 A | 2/2014 |
| RU | 2 420 925 C2 | 9/2009 |
| RU | 2008 116 625 A | 11/2009 |
| WO | 2012/121757 A1 | 9/2012 |
| WO | 2013/068787 A1 | 5/2013 |
| WO | 2013/121090 A1 | 8/2013 |
| WO | 2014/117517 A1 | 8/2014 |
| WO | 2015/047237 A1 | 4/2015 |

OTHER PUBLICATIONS

Search Report issued by Rospatent Federal Service for Intellectual Property for corresponding Russian Patent Application No. 2017134998/08(061292), dated Aug. 31, 2018, with an English translation.
Extended European search report with supplementary European search report and the European search opinion issued by the European Patent Office for corresponding European Patent Application No. 15888527.7, dated Jan. 29, 2018.
Office Action issued by the Canadian Intellectual Property Office for corresponding Canadian Patent Application No. 2,982,804, dated Jul. 26, 2018.
3GPP TS 36.300 V12.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Mar. 2015.
3GPP TS 36.211 V12.5.0, "3rd Generation Partnership Project; Technical Specification Group Radio Access Network; Evolved Universal Terrestrial Radio Access (E-UTRA); Physical channels and modulation (Release 12)", Mar. 2015.
3GPP TS 36.212 V12.4.0, "3rd Generation Partnership Project; Technical Specification Group Radio Access Network; Evolved Universal Terrestrial Radio Access (E-UTRA); Multiplexing and channel coding (Release 12)", Mar. 2015.
3GPP TS 36.213 V12.5.0, "3rd Generation Partnership Project; Technical Specification Group Radio Access Network; Evolved Universal Terrestrial Radio Access (E-UTRA); Physical layer procedures (Release 12)", Mar. 2015.
3GPP TS 36.321 V12.5.0, "3rd Generation Partnership Project; Technical Specification Group Radio Access Network; Evolved Universal Terrestrial Radio Access (E-UTRA); Medium Access Control (MAC) protocol specification (Release 12)", Mar. 2015.
3GPP TS 36.322 V12.2.0, "3rd Generation Partnership Project; Technical Specification Group Radio Access Network; Evolved Universal Terrestrial Radio Access (E-UTRA); Radio Link Control (RLC) protocol specification (Release 12)", Mar. 2015.
3GPP TS 36.323 V12.3.0, "3rd Generation Partnership Project; Technical Specification Group Radio Access Network; Evolved Universal Terrestrial Radio Access (E-UTRA); Packet Data Convergence Protocol (PDCP) specification (Release 12)", Mar. 2015.
3GPP TS 36.331 V12.5.0, "3rd Generation Partnership Project; Technical Specification Group Radio Access Network; Evolved Universal Terrestrial Radio Access (E-UTRA); Radio Resource Control (RRC); Protocol specification (Release 12)", Mar. 2015.
3GPP TS 36.413 V12.5.0, "3rd Generation Partnership Project; Technical Specification Group Radio Access Network; Evolved Universal Terrestrial Radio Access Network (E-UTRAN); S1 Application Protocol (S1AP) (Release 12)", Mar. 2015.
3GPP TS 36.423 V12.5.0, "3rd Generation Partnership Project; Technical Specification Group Radio Access Network; Evolved Universal Terrestrial Radio Access Network (E-UTRAN); X2 application protocol (X2AP) (Release 12)", Mar. 2015.

(56) References Cited

OTHER PUBLICATIONS

3GPP TS 36.425 V12.1.0, "3rd Generation Partnership Project; Technical Specification Group Radio Access Network; Evolved Universal Terrestrial Radio Access Network (E-UTRAN); X2 interface user plane protocol (Release 12)", Mar. 2015.
3GPP TR 36.842 V12.0.0, "3rd Generation Partnership Project; Technical Specification Group Radio Access Network; Study on Small Cell enhancements for E-UTRA and E-UTRAN; Higher layer aspects (Release 12)", Dec. 2013.
3GPP TR 37.834 V12.0.0, "3rd Generation Partnership Project; Technical Specification Group Radio Access Network; Study on Wireless Local Area Network (WLAN)—3GPP radio interworking (Release 12)", Dec. 2013.
Blackberry UK Limited, "On Integration of Unlicensed Spectrum, 3GPP workshop on LTE in unlicensed spectrum", RWS-140027, Sophia Antipolis, France, Jun. 19, 2014.
Intel Corporation, "Evolution of WLAN/3GPP radio interworking towards tight integration", Agenda Item: 14.1.2, 3GPP TSG-RAN Meeting #63, RP-140237, Fukuoka, Japan, Mar. 3-6, 2014.
Intel Corporation et al., "New WI Proposal: LTE-WLAN Radio Level Integration and Interworking Enhancement", Agenda Item: 13.1.2, 3GPP TSG-RAN Meeting #67, RP-150510, Shanghai, China, Mar. 9-12, 2015.
3GPP TS 23.401 V12.8.0, "3rd Generation Partnership Project; Technical Specification Group Services and System Aspects; General Packet Radio Service (GPRS) enhancements for Evolved Universal Terrestrial Radio Access Network (E-UTRAN) access (Release 12)", Mar. 2015.
International Search Report issued for corresponding International Patent Application No. PCT/JP2015/063953, dated Jul. 7, 2015, with an English translation.
International Preliminary Report on Patentability issued for corresponding International Patent Application No. PCT/JP2015/063953, dated Jul. 7, 2015, with an English translation.
Ericsson, "PDCP feedback and flow control", Agenda Item: 20.1.6, 3GPP TSG-RAN WG3 Meeting #84, R3-141325, Seoul, South Korea, May 19-23, 2014.
Notice of Preliminary Rejection issued by the Korean Intellectual Property Office for corresponding Korean Patent Application No. 10-2017-7028778, dated Apr. 10, 2019, with an English translation.
Communication pursuant to Article 94(3) EPC issued by the European Patent Office for corresponding European Patent Application No. 15 888 527.7-1214, dated May 3, 2019.
Non-final Office Action issued by the USPTO for corresponding U.S. Appl. No. 16/373,307, dated Sep. 30, 2019.
Office Action issued by the Indonesian Patent Office for corresponding Indonesian Patent Application PID201706938 dated Jul. 25, 2019; Full English machine translation attached.

* cited by examiner

FIG.11

| FIRST 3 BITS (IP PRECEDENCE) | VALUE | SUPPLEMENT |
|---|---|---|
| 111 | NETWORK CONTROL | RESERVATION FOR CONTROL SUCH AS ROUTING |
| 110 | INTERNET CONTROL | RESERVATION FOR CONTROL SUCH AS ROUTING |
| 101 | CRITICAL | GENERAL USE |
| 100 | FLASH OVERWRITE | GENERAL USE |
| 011 | FLASH | GENERAL USE |
| 010 | IMMEDIATE | GENERAL USE |
| 001 | PRIORITY | GENERAL USE |
| 000 | ROUTINE | GENERAL USE |

← PRIORITY LEVEL

| QCI | TYPE | PRIORITY | EXAMPLE | AC |
|---|---|---|---|---|
| 1 | GBR | 2 | CONVERSATIONAL VOICE | VO |
| 2 | | 4 | CONVERSATIONAL VIDEO (LIVE STREAMING) | VI |
| 3 | | 3 | REAL TIME GAMING | VI |
| 4 | | 5 | NON-CONVERSATIONAL VIDEO (BUFFERED STREAMING) | VI |
| 65 | | 0.7 | MISSION CRITICAL P to T VOICE | VO |
| 66 | | 2 | NON-MISSION CRITICAL P to T VOICE | VO |
| 5 | NON-GBR | 1 | IMS SIGNALING | VO |
| 6 | | 6 | VIDEO (BUFFERED STREAM), TCP BASE APPLICATION | BE |
| 7 | | 7 | VOICE, VIDEO (LIVE STREAMING), INTERACTIVE GAMINING | BE |
| 8 | | 8 | VIDEO (BUFFERED STREAM), TCP BASE APPLICATION | BK |
| 9 | | 9 | | |
| 69 | | 0.5 | MISSION CRITICAL DELAY SENSITIVE SIGNALING | VO |
| 70 | | 0.5 | MISSION CRITICAL DATA | VO |

WIRELESS COMMUNICATIONS SYSTEM, BASE STATION, MOBILE STATION, AND PROCESSING METHOD

CROSS REFERENCE TO RELATED APPLICATIONS

This application is a continuation application of International Application PCT/JP2015/063953, filed on May 14, 2015, which claims priority from International Application PCT/JP2015/061293 filed on Apr. 10, 2015, the contents of which are incorporated herein by reference.

FIELD

The embodiments discussed herein relate to a wireless communications system, a base station, a mobile station, and a processing method.

BACKGROUND

Mobile communications such as long term evolution (LTE) are conventionally known (e.g., refer to 3GPP TS36.300 v12.5.0, March 2015; 3GPP TS36.211 v12.5.0, March 2015; 3GPP TS36.212 v12.4.0, March 2015; 3GPP TS36.213 v12.5.0, March 2015; 3GPP TS36.321 v12.5.0, March 2015; 3GPP TS36.322 v12.2.0, March 2015; 3GPP TS36.323 v12.3.0, March 2015; 3GPP TS36.331 v12.5.0, March 2015; 3GPP TS36.413 v12.5.0, March 2015; 3GPP TS36.423 v12.5.0, March 2015; 3GPP TS36.425 v12.1.0, March 2015; 3GPP TR36.842 v12.0.0, December 2013; 3GPP TR37.834 v12.0.0, December 2013). Under LTE, aggregation for communicative cooperation with a wireless local area network (WLAN) on a wireless access level is being studied (e.g., refer to 3GPP RWS-140027, June 2014 and 3GPP RP-140237, March 2014). Further, integration and interworking at the wireless level between LTE and WLANs is being studied (e.g., refer to 3GPP RP-150510, March 2015).

A technique of transferring data from the radio resource control (RRC) layer to the media access control (MAC) layer when a WLAN is used is also known (e.g., refer to International Publication No. 2012/121757). Another technique of sharing LTE packet data convergence protocol (PDCP) between LTE and a WLAN is also known (e.g., refer to International Publication No. 2013/068787). A further technique of performing data transmission control on the basis of quality of service (QoS) information in WLAN, etc. is also known.

SUMMARY

According to an aspect of an embodiment, a wireless communications system includes a first wireless communications apparatus configured to control by a controller configured to control a first wireless communication, a second wireless-communication different from the first wireless communication; a second wireless communications apparatus capable of performing the second wireless communication; and a third wireless communications apparatus capable of data transmission with the first wireless communications apparatus via the first wireless communication or the second wireless communication. The third wireless communications apparatus transmits to the first wireless communications apparatus a control message that includes an available address of the third wireless communications apparatus in the second wireless communication. In a case where data is transmitted from the first wireless communications apparatus to the third wireless communications apparatus by the second wireless communications apparatus via the second wireless communication, a processor, which is in the first wireless communication apparatus and for performing the first wireless communications, transfers the data to the second wireless communications apparatus through an adaptation sublayer and notifies the second wireless communications apparatus of the address acquired from the control message, wherein the data is already processed in a convergence layer for performing the first wireless communication. The second wireless communications apparatus sets the address notified from the first wireless communications apparatus as a destination address and transmits the data transferred from the first wireless communications apparatus to the third wireless communications apparatus via the second wireless communication.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram depicting an example of values of a ToS field included in an IP header of an IP packet transmitted in the wireless communications system according to the second embodiment;

FIG. 16 is a diagram depicting an example of mapping to QoS class ACs applicable to the wireless communications system according to the second embodiment;

DESCRIPTION OF THE INVENTION

Embodiments of a wireless communications system, a base station, a mobile station, and a processing method according to the present invention will be described in detail with reference to the accompanying drawings.

Figure 1:
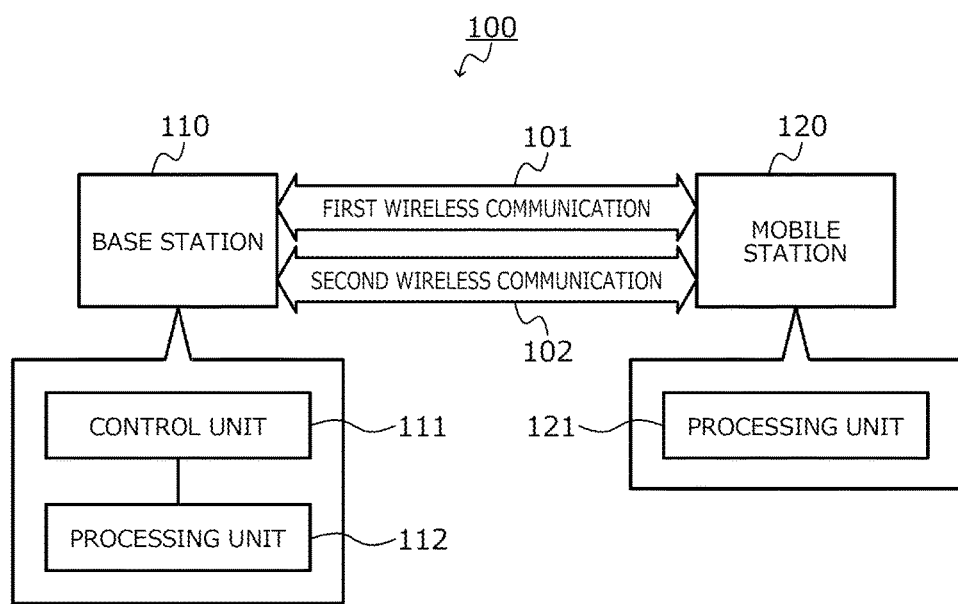
FIG. 1 is a diagram depicting an example of a wireless communications system according to a first embodiment.

FIG. 1 is a diagram depicting an example of a wireless communications system according to a first embodiment. As depicted in FIG. 1, a wireless communications system 100 according to the first embodiment includes a base station 110 and a mobile station 120. The wireless communications system 100 is capable of data transmission between the base station 110 and the mobile station 120 concurrently using a first wireless communication 101 and a second wireless communication 102.

The first wireless communication 101 and the second wireless communication 102 are different wireless communications (wireless communication schemes). For example, the first wireless communication 101 is a cellular communication such as LTE or LTE-A. For example, the second wireless communication 102 is a WLAN. Note that the first wireless communication 101 and the second wireless communication 102 can be various types of communications without limitation hereto. In the example depicted in FIG. 1, the base station 110 is a base station capable of the first wireless communication 101 and the second wireless communication 102 between the base station 110 and the mobile station 120, for example.

When transmitting data by concurrent use of the first wireless communication 101 and the first wireless communication 102, the base station 110 and the mobile station 120 configure therebetween a communication channel of the first wireless communication 101 for transmission of data of the first wireless communication 101. Further, the base station 110 and the mobile station 120 configure therebetween a communication channel of the wireless communication 102 for transmission of data of the first wireless communication 101. The base station 110 and the mobile station 120 transmit data by concurrently using the communication channels configured for the first wireless communication 101 and the second wireless communication 102.

A downlink for transmitting data from the base station 110 to the mobile station 120 will first be described. The base station 110 includes a control unit 111 and a processing unit 112. The control unit 111 provides control for the first wireless communication 101. The control unit 111 provides control for the second wireless communication 102. For example, the control unit 111 is a processing unit such as an RRC that performs wireless control between the base station 110 and the mobile station 120. It is to be noted that the control unit 111 is not limited to the RRC and can be any type of processing unit that provides control for the first wireless communication 101.

The processing unit 112 performs processing for performing the first wireless communication 101. For example, the processing unit 112 is a processing unit that processes data transmitted via the first wireless communication 101. For instance, the processing unit 112 is a processing unit for a data link layer, such as PDCP, radio link control (RLC), and MAC. It should be understood that the processing unit 112 is not limited to those above and can be any type of processing unit for performing the first wireless communication 101.

Processing of the processing unit 112 for performing the first wireless communication 101 is controlled by the control unit 111. When data is transmitted from the base station 110 to the mobile station 120 using wireless communication via the second wireless communication 102, the processing unit 112 establishes a convergence layer for performing the first wireless communication 101. This convergence layer includes processing for dividing between the first wireless communication 101 and the second wireless communication 102, data that is to be transmitted between the base station 110 and the mobile station 120.

For instance, the convergence layer is a PDCP layer. However, the convergence layer is not limited to a PDCP layer and can be any type of layer. The convergence layer may be designated as an end point, a branch point, a split function, or a routing function. Such a designation is not limiting provided it means a data scheduling point between the first wireless communication and the second wireless communication. Hereinafter, the convergence layer is used as one such general designation.

For data transmitted from the base station 110 to the mobile station 120 by using the second wireless communication 102, the processing unit 112 transmits to the mobile station 120 by tunneling, the data for which convergence layer processing has been performed. The processing unit 112 transmits the data as a Protocol Data Unit (PDU) whose header includes a sequence number (SN), etc. added by the convergence layer processing. As a result, data destined for the mobile station 120 can be transmitted by the second wireless communication 102 with the sequence number included as is. In other words, the PDU of the first wireless communication 101 can be transmitted transparently by the second wireless communication 102.

In contrast, the mobile station 120 can perform a reception process for the data transmitted from the base station 110 by the first wireless communication 101 and the data transmitted from the base station 110 by the second wireless communication 102, based on a process of the first wireless communication 10. For example, the mobile station 120 can perform sequence control based on the sequence number. As a result, data transmission that concurrently uses the first wireless communication 101 and the second wireless communication 102 becomes possible. Therefore, for example, the transmission rate of data can be improved.

Next, uplink for transmitting data from the mobile station 120 to the base station 110 will be described. The mobile station 120 includes a processing unit 121. The processing unit 121, similar to the processing unit 112 of the base station 110, is a processing unit for performing the first wireless communication 101. For example, the processing unit 121 is a processing unit for a data link layer, such as PDCP, RLC, and MAC. However, the processing unit 121 is not limited to those above and can be any type of processing unit for performing the first wireless communication 101.

Processing by the processing unit 121 for performing the first wireless communication 101 is controlled by the control unit 111 of the base station 110. The processing unit 121, when transmitting data from the mobile station 120 to the base station 110 by using wireless communication of the second wireless communication 102, establishes the convergence layer for performing the first wireless communication 101. The convergence layer, as described above, includes processing for dividing between the first wireless communication 101 and the second wireless communication 102, data that is to be transmitted between the base station 110 and the mobile station 120.

For data that is to be transmitted from the mobile station 120 to the base station 110 by using the second wireless communication 102, the processing unit 121 transmits to the base station 110 by tunneling, the data for which convergence layer processing has been performed. The processing unit 121 transmits the data as a PDU whose header includes a sequence number, etc. added by the convergence layer processing. As a result, the data destined for the base station 110 can be transmitted by the second wireless communication 102 with the sequence number included as is.

In contrast, the base station 110 can perform sequence control for the data transmitted from the mobile station 120 by the first wireless communication 101 and the data transmitted from the mobile station 120 by the second wireless communication 102, based on the sequence number. Therefore, data transmission that concurrently uses the first wireless communication 101 and the second wireless communication 102 becomes possible.

In this manner, for data that is to be transmitted by the second wireless communication 102, the transmitting station among the base station 110 and the mobile station 120 transmits by tunneling, a PDU whose header includes a sequence number added by convergence layer processing. As a result, at the receiving station, sequence control between data transmitted from the mobile station 120 by the first wireless communication 101 and data transmitted from the mobile station 120 by the second wireless communication 102 can be performed based on the sequence number. Therefore, data transmission that concurrently uses the first wireless communication 101 and the second wireless communication 102 becomes possible.

Figure 2:
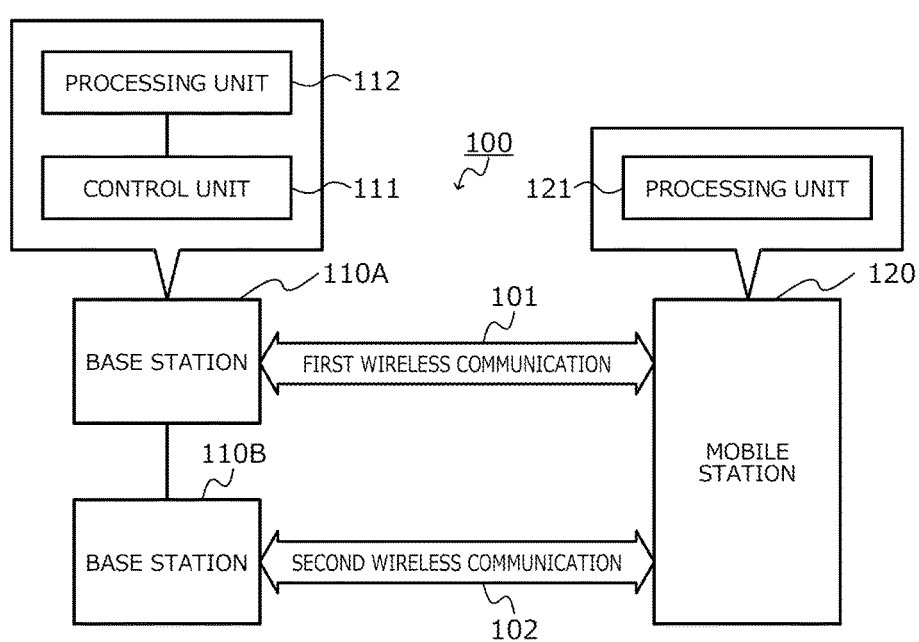
FIG. 2 is a diagram depicting another example of the wireless communications system according to the first embodiment.

FIG. 2 is a diagram depicting another example of the wireless communications system according to the first embodiment. In FIG. 2, parts identical to those depicted in FIG. 1 are designated by the same reference numerals used in FIG. 1 and explanations thereof will be omitted. In FIG. 1, although a case is described in which the base station 110 is a base station capable of performing the first wireless communication 101 and the second wireless communication 102 with the mobile station 120, as depicted in FIG. 2, instead of the base station 110, base stations 110A, 110b may be provided.

The base station 110A is a base station capable of performing the first wireless communication 101 with the mobile station 120. The base station 110b is a base station connected with the base station 110A and is a base station capable of performing the second wireless communication 102 with the mobile station 120.

In the example depicted in FIG. 2, the base station 110A performs data transmission with the mobile station 120 by using the second wireless communication 102, via the base station 110b. In this case, the control unit 111 and the processing unit 112 depicted in FIG. 1, for example, are provided in the base station 110A. Further, the control unit 111 performs control of the second wireless communication 102 with the mobile station 120 via the base station 110b.

First, downlink for transmitting data from the base station 110A to the mobile station 120 will be described. For data that is to be transmitted to the mobile station 120 by using the second wireless communication 102, the processing unit 112 of the base station 110A transmits to the base station 110b by tunneling, the data for which convergence layer processing has been performed. The processing unit 112 transmits the data as a PDU whose header includes a sequence number, etc. added by the convergence layer processing. As a result, the data can be transmitted to the mobile station 120 via the base stations 110A, 110b. The base station 110b transmits to the mobile station 120 by the second wireless communication 102, the data transferred from the base station 110A.

Next, uplink for transmitting data from the mobile station 120 to the base station 110A will be described. For data that is to be transmitted to the base station 110 by using the second wireless communication 102, the processing unit 121 of the mobile station 120 transmits to the base station 110B by tunneling, the data for which convergence layer processing has been performed. The processing unit 121 transmits the data as a PDU whose header includes a sequence number, etc. added by the convergence layer processing. The base station 110B transfers to the base station 110A, the data transmitted from the mobile station 120 by the second wireless communication 102. As a result, data destined for the base station 110A can be transmitted to the base station 110A by using the second wireless communication 102.

In this manner, according to the wireless communications system 100 according to the first embodiment, data transmission that concurrently uses the first wireless communication 101 and the second wireless communication 102 becomes possible between the base station 110 and the mobile station 120. Therefore, for example, the transmission rate of data can be improved.

Next, details of the wireless communications system 100 according to the first embodiment depicted in FIG. 1 will be described using second to fourth embodiments. The second to fourth embodiments can be regarded as examples embodying the first embodiment described above and therefore, can be implemented in combination with the first embodiment.

Figure 3:
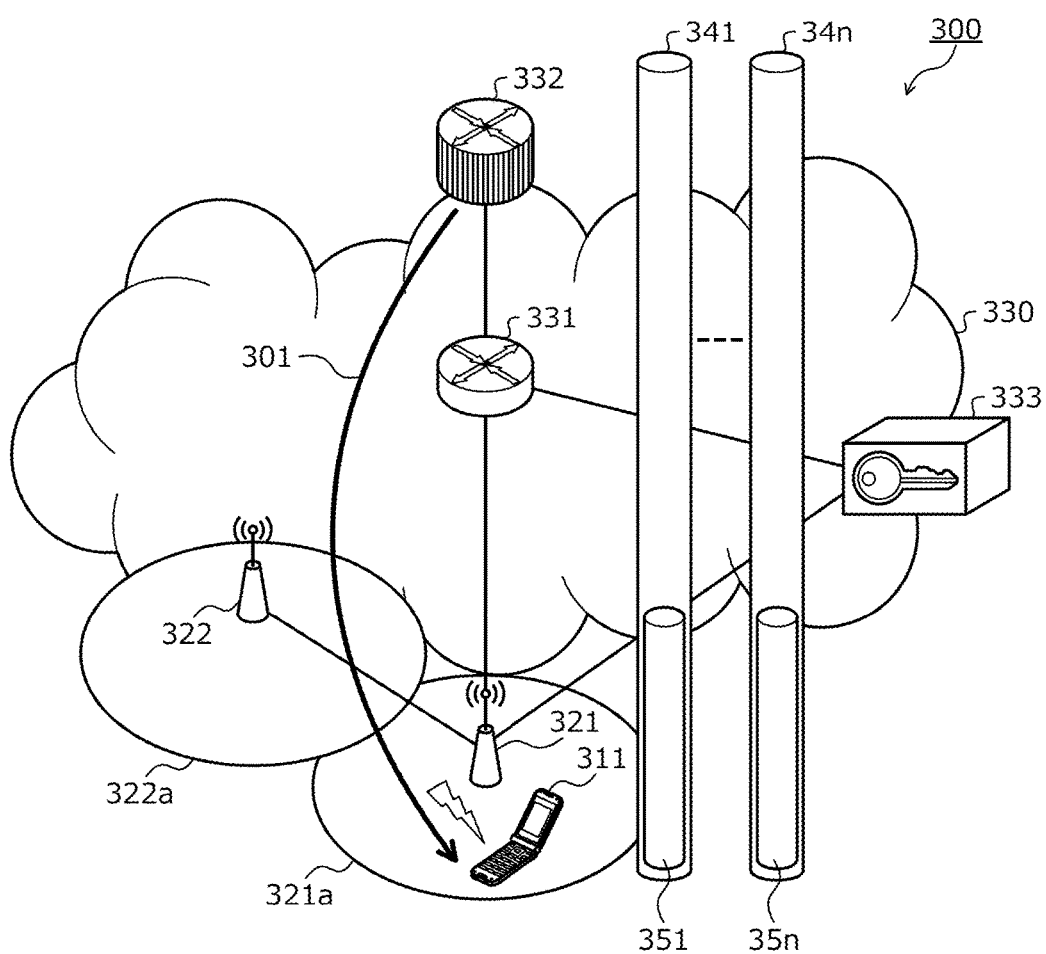
FIG. 3 is a diagram depicting an example of the wireless communications system according to a second embodiment.

FIG. 3 is a diagram depicting an example of the wireless communications system according to a second embodiment. As depicted in FIG. 3, a wireless communications system 300 according to the second embodiment includes a UE 311, eNBs 321, 322, and a packet core network 330. The wireless communications system 300 is a mobile communications system such as LTE-A defined by 3GPP, for example.

Nonetheless, the communication standard of the wireless communications system 300 is not limited hereto.

For example, the packet core network 330 is an evolved packet core (EPC) defined under 3GPP, but is not particularly limited hereto. Note that the core network defined by 3GPP may be called system architecture evolution (SAE). The packet core network 330 includes an SGW 331, a PGW 332, and an MME 333.

The UE 311 and the eNBs 321, 322 form a wireless access network by performing wireless communication. The wireless access network formed by the UE 311 and the eNBs 321, 322 is, for example, an evolved universal terrestrial radio access network (E-UTRAN) defined by 3GPP, but is not particularly limited hereto.

The UE 311 is a terminal located within a cell of the eNB 321 and performs wireless communication with the eNB 321. For example, the UE 311 performs communication with another communication device through the eNB 321, SGW 331 and the PGW 332. For example, another communication device performing communication with the UE 311 is a communication terminal different from the UE 311, or is a server, etc. Communication between the UE 311 and another communication device is, for example, data communication or audio communication, but is not particularly limited hereto. Audio communication is, for example, voice over LTE (VoLTE), but is not particularly limited hereto.

The eNB 321 is a base station forming a cell 321a and performing wireless communication with the UE 311 located within the cell 321a. The eNB 321 relays communication between the UE 311 and the SGW 331. The eNB 322 is a base station that forms a cell 322a and performs wireless communication with a UE located within the cell 322a. The eNB 322 relays communication between the UE located within the cell 322a and the SGW 331.

The eNB 321 and the eNB 322 may be connected to each other via a physical or logical interface between base stations, for example. The interface between base stations is, for example, an X2 interface, but is not particularly limited hereto. The eNB 321 and the SGW 331 are connected to each other via a physical or logical interface, for example. The interface between the eNB 321 and the SGW 331 is, for example, an S1-U interface, but is not particularly limited hereto.

The SGW 331 is a serving gateway accommodating the eNB 321 and performing user plane (U-plane) processing in communication via the eNB 321. For example, the SGW 331 performs the U-plane processing in communication of the UE 311. The U-plane is a function group performing user data (packet data) transmission. The SGW 331 may accommodate the eNB 322 and perform the U-plane processing in communication via the eNB 322.

The PGW 332 is a packet data network gateway for connection to an external network. The external network is the Internet, for example, but is not particularly limited hereto. For example, the PGW 332 relays user data between the SGW 331 and the external network. For example, to allow the UE 311 to transmit or receive an IP flow, the PGW 332 performs an IP address allocation 201 for allocating an IP address to the UE 311.

The SGW 331 and the PGW 332 are connected to each other via a physical or logical interface, for example. The interface between the SGW 331 and the PGW 332 is an S5 interface, for example, but is not particularly limited hereto.

The MME (mobility management entity) 233 accommodates the eNB 321 and performs control plane (C-plane) processing in communication via the eNB 321. For example, the MME 333 performs C-plane processing in communication of the UE 311 via the eNB 321. The C-plane is, for example, a function group for controlling a call or a network between devices. For example, the C-plane is used in connection of a packet call, configuration of a path for user data transmission, handover control, etc. The MME 333 may accommodate the eNB 322 and perform C-plane processing in communication via the eNB 322.

The MME 333 and the eNB 321 are connected to each other via a physical or logical interface, for example. The interface between the MME 333 and the eNB 321 is an S1-MME interface, for example, but is not particularly limited thereto. The MME 333 and the SGW 331 are connected to each other via a physical or logical interface, for example. The interface between the MME 333 and the SGW 331 is an S11 interface, for example, but is not particularly limited hereto.

In the wireless communications system 300, an IP flow transmitted from or received by the UE 311 is classified into (allocated to) EPS bearers 341 to 34n and is transmitted via the PGW 332 and the SGW 331. The EPS bearers 341 to 34n are the IP flow in an evolved packet system (EPS). The EPS bearers 341 to 34n are in the form of radio bearers 351 to 35n in the wireless access network formed by the UE 311 and the eNB 321, 322. Overall communication control such as configuration of the EPS bearers 341 to 34n, security configuration, and mobility management is provided by the MME 333.

The IP flow classified into the EPS bearers 341 to 34n is transmitted through a GPRS tunneling protocol (GTP) tunnel configured between nodes, for example, in an LTE network. The EPS bearers 341 to 34n are uniquely mapped to the radio bearers 351 to 35n, respectively, for wireless transmission that takes QoS into account.

In the communication between the UE 311 and the eNB 321 of the wireless communications system 300, an LTE-A and WLAN aggregation is carried out to transmit LTE-A traffic using LTE-A and a WLAN concurrently. This enables the traffic between the UE 311 and the eNB 321 to be distributed to LTE-A and WLAN concurrently, to achieve an improvement in throughput in the wireless communications system 300. The first wireless communication 101 depicted in FIG. 1 can be LTE-A wireless communication, for example. The second wireless communication 102 depicted in FIG. 1 can be WLAN wireless communication, for example. The LTE-A and WLAN aggregation will be described later.

It is to be understood that the designation of aggregation is merely an example and is often used to mean use of plural communication frequencies (carriers). Other than aggregation, integration is often used as a designation to mean different systems are integrated for plural use. Hereinafter, aggregation is used as a general designation.

The base stations 110, 110A, and 110B depicted in FIGS. 1 and 2 can be implemented by the eNBs 321, 322, for example. The mobile station 120 depicted in FIGS. 1 and 2 can be implemented by the UE 311, for example.

Figure 4:
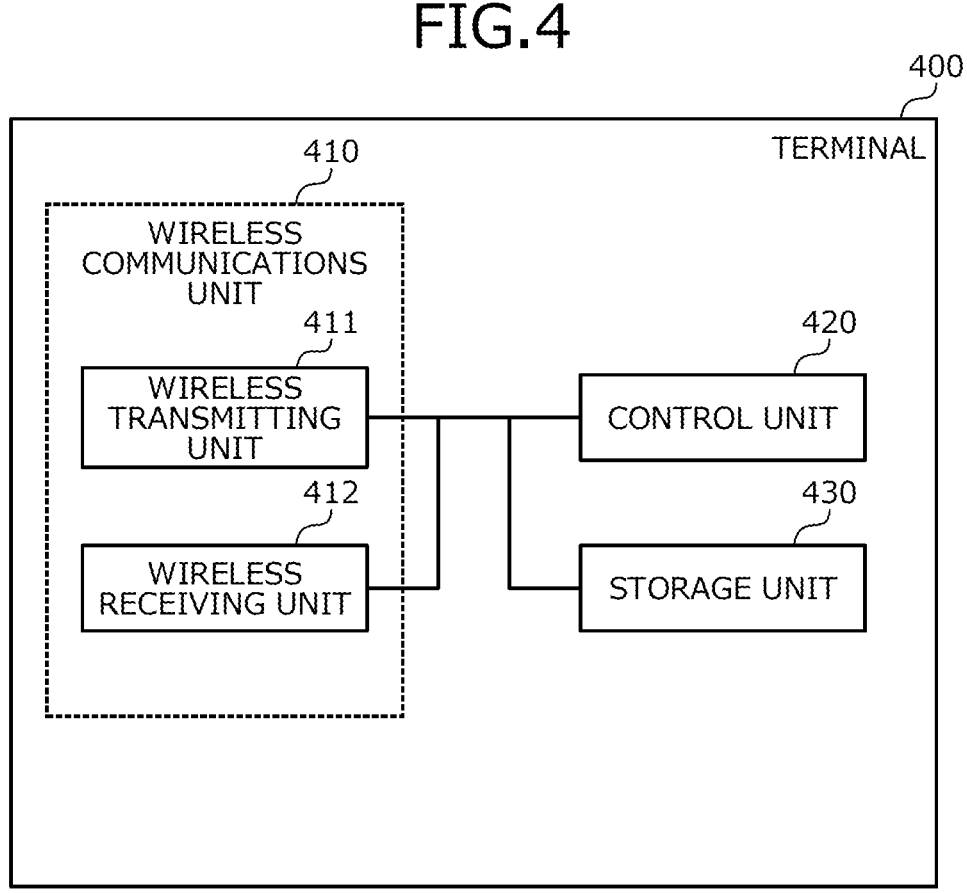
FIG. 4 is a diagram depicting an example of a terminal according to the second embodiment.

FIG. 4 is a diagram depicting an example of the terminal according to the second embodiment. The UE 211 depicted in FIG. 3 can be implemented by a terminal 400 depicted in FIG. 4, for example. The terminal 400 includes a wireless communications unit 410, a control unit 420, and a storage unit 430. The wireless communications unit 410 includes a wireless transmitting unit 411 and a wireless receiving unit 412. These units are connected with one another so as to enable unidirectional or bidirectional input or output of signals or data. The wireless communications unit 410 is capable of, for example, LTE-A wireless communication (the first wireless communication 101) and WLAN wireless communication (the second wireless communication 102).

The wireless transmitting unit 411 transmits user data or a control signal through wireless communication via an antenna. A wireless signal transmitted from the wireless transmitting unit 411 can include arbitrary user data, control information, etc. (that has been encoded, modulated, etc.). The wireless receiving unit 412 receives user data or a control signal through wireless communication via an antenna. A wireless signal received by the wireless receiving unit 412 can include arbitrary user data, control information, etc. (that has been encoded, modulated, etc.). A common antenna may be used for transmitting and receiving.

The control unit 420 outputs to the wireless transmitting unit 411, user data, a control signal, etc. to be transmitted to another wireless station. The control unit 420 acquires user data, a control signal, etc. received by the wireless receiving unit 412. The control unit 420 inputs/outputs user data, control information, a program, etc. from/to the storage unit 430 described later. The control unit 420 inputs from/outputs to the communications unit 410, user data, a control signal, etc. transmitted to or received from another communication device, etc. In addition to the above, the control unit 420 provides various types of control in the terminal 400. The storage unit 430 stores various types of information such as user data, control information, and a program.

The processing unit 121 of the mobile station 120 depicted in FIG. 1 can be implemented by the control unit 420, for example.

Figure 5:
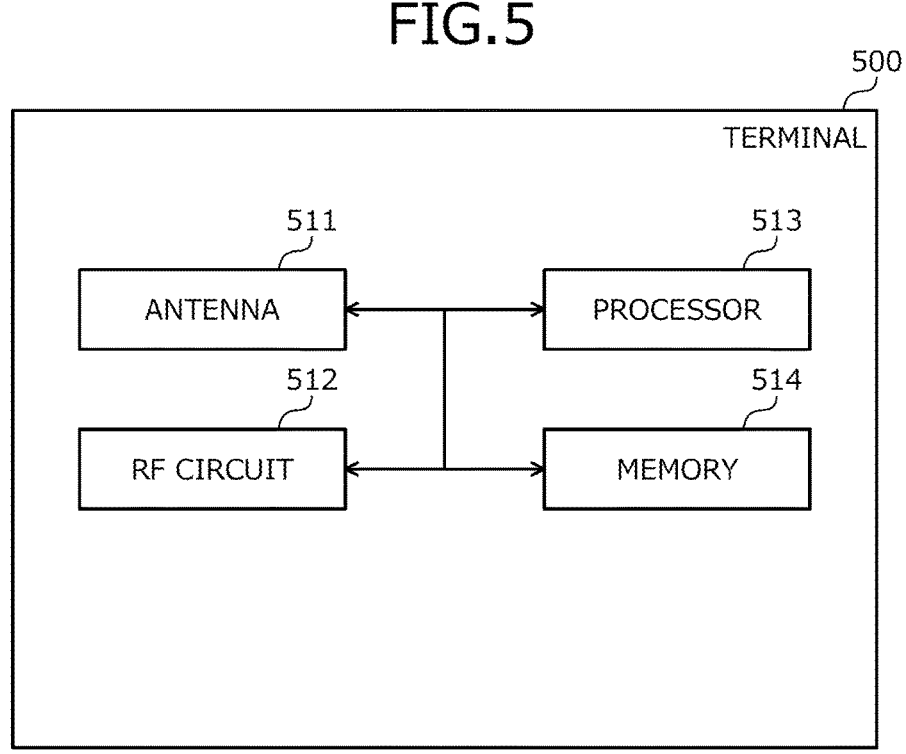
FIG. 5 is a diagram depicting an example of a hardware configuration of the terminal according to the second embodiment.

FIG. 5 is a diagram depicting an example of a hardware configuration of the terminal according to the second embodiment. The terminal 400 depicted in FIG. 4 can be implemented by a terminal 500 depicted in FIG. 5, for example. The terminal 500 includes, for example, an antenna 511, an RF circuit 512, a processor 513, and a memory 514. These components are connected with one another so as to enable input/output of various signals or data via a bus, for example.

The antenna 511 includes a transmitting antenna that transmits a wireless signal and a receiving antenna that receives a wireless signal. The antenna 511 may be a common antenna that sends and receives a wireless signal. The RF circuit 512 performs radio frequency (RF) processing for a signal received by or sent from the antenna 511. The RF processing includes, for example, frequency conversion between a baseband and a RF band.

The processor 513 is, for example, a central processing unit (CPU) or a digital signal processor (DSP). The processor 513 may be implemented by a digital electronic circuit such as an application specific integrated circuit (ASIC), a field programmable gate array (FPGA), and a large scale integration (LSI).

The memory 514 can be implemented, for example, by a random access memory (RAM) such as a synchronous dynamic random access memory (SDRAM), a read only memory (ROM), or a flash memory. The memory 514 stores user data, control information, a program, etc., for example.

The wireless communications unit 410 depicted in FIG. 4 can be implemented by the antenna 511 and the RF circuit 512, for example. The control unit 420 depicted in FIG. 4 can be implemented by the processor 513, for example. The storage unit 430 depicted in FIG. 4 can be implemented by the memory 514, for example.

Figure 6:
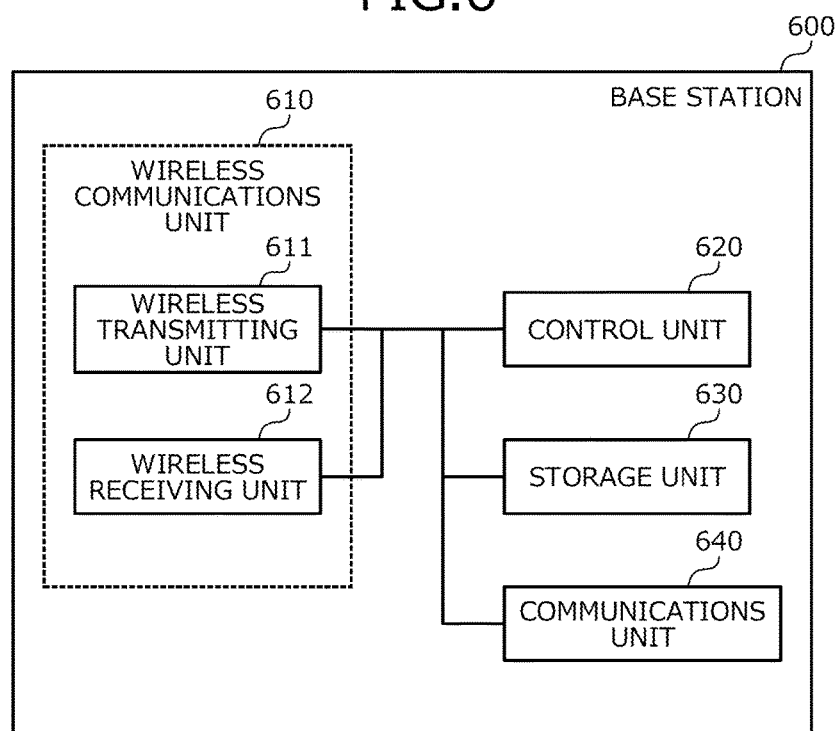
FIG. 6 is a diagram depicting an example of the base station according to the second embodiment.

FIG. 6 is a diagram depicting an example of the base station according to the second embodiment. The eNBs 321, 322 depicted in FIG. 3 can each be implemented by a base station 600 depicted in FIG. 6, for example. As depicted in FIG. 6, the base station 600 includes, for example, a wireless communications unit 610, a control unit 620, a storage unit 630, and a communications unit 640. The wireless communications unit 610 includes a wireless transmitting unit 611 and a wireless receiving unit 612. These units are connected with one another so as to enable a unidirectional or bidirectional input or output of signals or data. The wireless communications unit 610 is capable of, for example, LTE-A wireless communication (the first wireless communication 101) and WLAN wireless communication (the second wireless communication 102).

The wireless transmitting unit 611 transmits user data, a control signal, etc. through wireless communication via an antenna. A wireless signal transmitted from the wireless transmitting unit 611 can include arbitrary user data, control information, etc. (that has been encoded, modulated, etc.). The wireless receiving unit 612 receives user data, a control signal, etc. through wireless communication via an antenna. A wireless signal received by the wireless receiving unit 612 can include arbitrary user data, control information, etc. (that has been encoded, modulated, etc.). A common antenna may be used for transmitting and receiving.

The control unit 620 outputs to the wireless transmitting unit 611, user data, a control signal, etc. to be transmitted to another wireless station. The control unit 320 acquires user data, a control signal, etc. received by the wireless receiving unit 612. The control unit 620 inputs/outputs user data, control information, a program, etc. from/to the storage unit 630 described later. The control unit 620 inputs from/outputs to the communications unit 640 described later, user data, a control signal, etc. transmitted to or received from another communication device, etc. In addition to the above, the control unit 620 provides various types of control in the base station 600.

The storage unit 630 stores various types of information such as user data, control information, and a program. With respect to another communication device, the communications unit 640 transmits/receives user data, a control signal, etc. by a wired signal, for example.

The control unit 111 and the processing unit 112 of the base station 110 depicted in FIG. 1 can be implemented by the control unit 620, for example.

Figure 7:
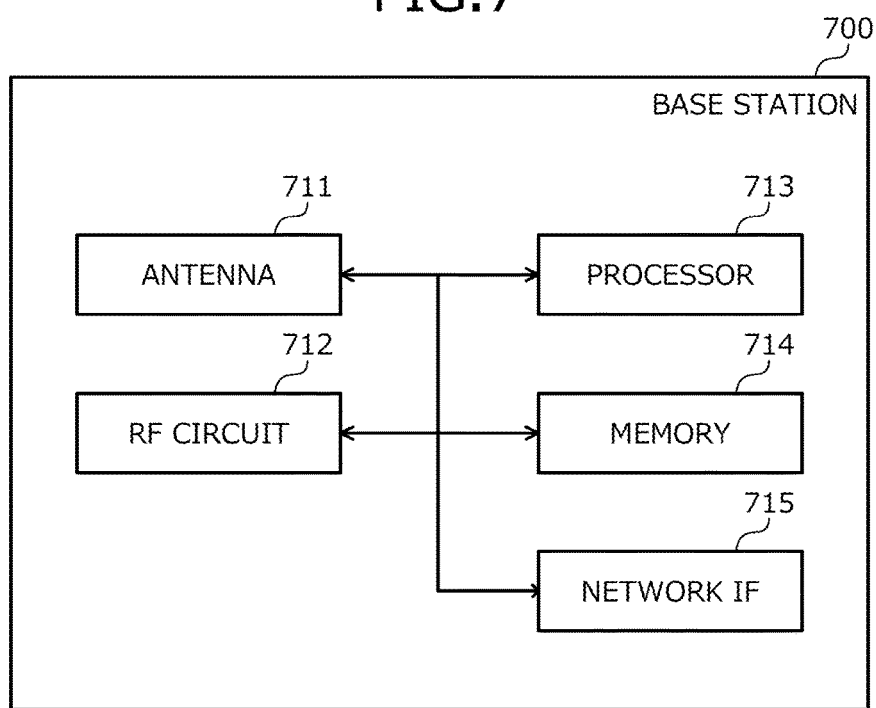
FIG. 7 is a diagram depicting an example of a hardware configuration of the base station according to the second embodiment.

FIG. 7 is a diagram depicting an example of a hardware configuration of the base station according to the second embodiment. The base station 600 depicted in FIG. 6 may be implemented by a base station 700 depicted in FIG. 7, for example. The base station 700 includes an antenna 711, an RF circuit 712, a processor 713, a memory 714, and a network IF 715. These components are connected to one another so as to enable input/output of various signals, data, etc. via a bus, for example.

The antenna 711 includes a transmitting antenna that transmits a wireless signal and a receiving antenna that receives a wireless signal. The antenna 711 may be a common antenna that transmits and receives wireless signals. The RF circuit 712 performs RF processing for a signal received by or transmitted from the antenna 711. The RF processing includes, for example, frequency conversion between a baseband and a RF band.

The processor 713 is, for example, a CPU or a DSP. The processor 713 may be implemented by a digital electronic circuit such as ASIC, FPGA, and LSI.

The memory 714 can be implemented by, for example, RAM such as SDRAM, ROM, or the flash memory. The memory 714 stores user data, control information, a program, etc., for example.

The network IF 715 is, for example, a communication interface performing wired communication with a network. The network IF 715 may include an Xn interface for performing wired communication with a base station, for example.

The wireless communications unit 610 depicted in FIG. 6 can be implemented by the antenna 711 and the RF circuit 712, for example. The control unit 620 depicted in FIG. 6 can be implemented by the processor 713, for example. The storage unit 630 depicted in FIG. 6 can be implemented by the memory 714, for example. The communications unit 640 depicted in FIG. 6 can be implemented by the network IF 715, for example.

Figure 8:
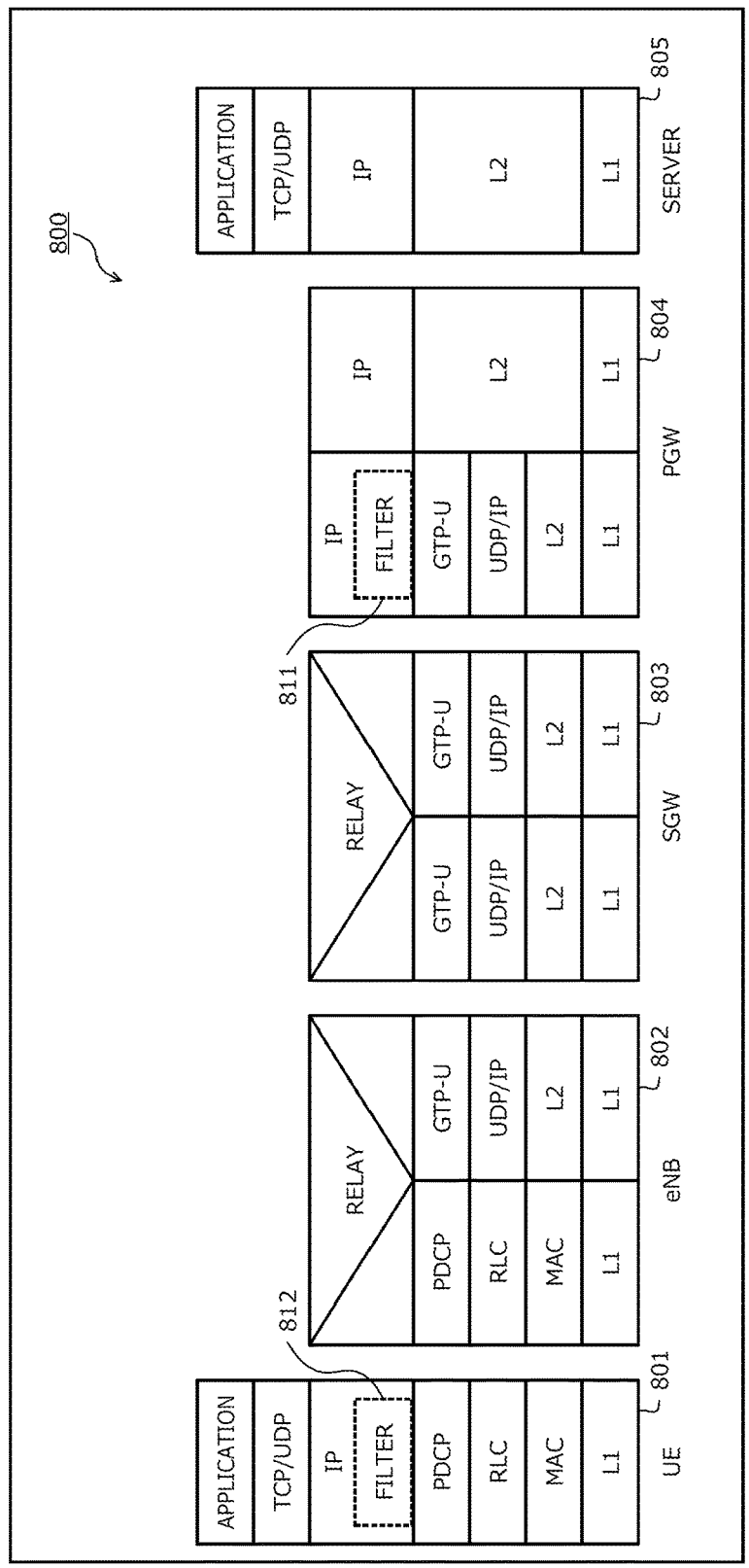
FIG. 8 is a diagram depicting an example of a protocol stack in the wireless communications system according to the second embodiment.

FIG. 8 is a diagram depicting an example of a protocol stack in the wireless communications system according to the second embodiment. A protocol stack 800 depicted in FIG. 8, for example, can be applied to the wireless communications system 300 according to the second embodiment. The protocol stack 800 is an LTE-A protocol stack defined under 3GPP. Layer groups 801 to 805 are layer groups showing respective processes at the UE 311, eNB 321, SGW 331, PGW 332, and an external network server, respectively.

In the case of transmitting an IP flow in the wireless communications system 300, IP flow filtering is carried out to handle each IP flow in accordance with the QoS class. For example, for a downlink where the UE 311 receives an IP flow, the PGW 332 performs packet filtering with respect to the IP flow and classifies the IP flow into the EPS bearers 341 to 34n.

For an uplink where the UE 311 transmits an IP flow, the PGW 332 notifies the UE 311 of a packet filtering rule. On the basis of the filtering rule notified from the PGW 332, the UE 311 applies packet filtering to the IP flow and classifies the IP flow into the EPS bearers 341 to 34n.

For example, in the uplink, the PGW 332 performs IP flow filtering by a filter layer (Filter) 811 included in an IP layer (IP) among a layer group 804 of the PGW 332. In the downlink, the UE 311 performs IP flow filtering by a filter layer (Filter) 812 included in an IP layer (IP) among a layer group 801 of the UE 311.

To perform QoS control (QoS management) by a router in the LTE network, the PGW 332 (case of downlink) or the UE 311 (case of uplink) configures a QoS value in a Type of Service (ToS) field of an IP packet header.

The packet filtering by the PGW 332 or the UE 311 is performed utilizing, e.g., a 5-tuple (source/destination IP addresses, source/destination port numbers, and protocol type). The filtering rule in the packet filtering is called a traffic flow template (TFT), for example. Some of the EPS bearers 341 to 34n may not have a TFT configured therefor.

When the IP flow filtering is carried out using TFT, the IP flow can be classified into at most 11 different EPS bearers. One bearer among the EPS bearers 341 to 34n is called default bearer. The default bearer is generated when the PGW 332 allocates an IP address to the UE 311, and continually exists until the IP address allocated to the UE 311 is released. Bearers other than the default bearer among the EPS bearers 341 to 34n are called dedicated bearers. The dedicated bearers can be suitably generated and released depending on the situation of transmitted user data.

Figure 9:
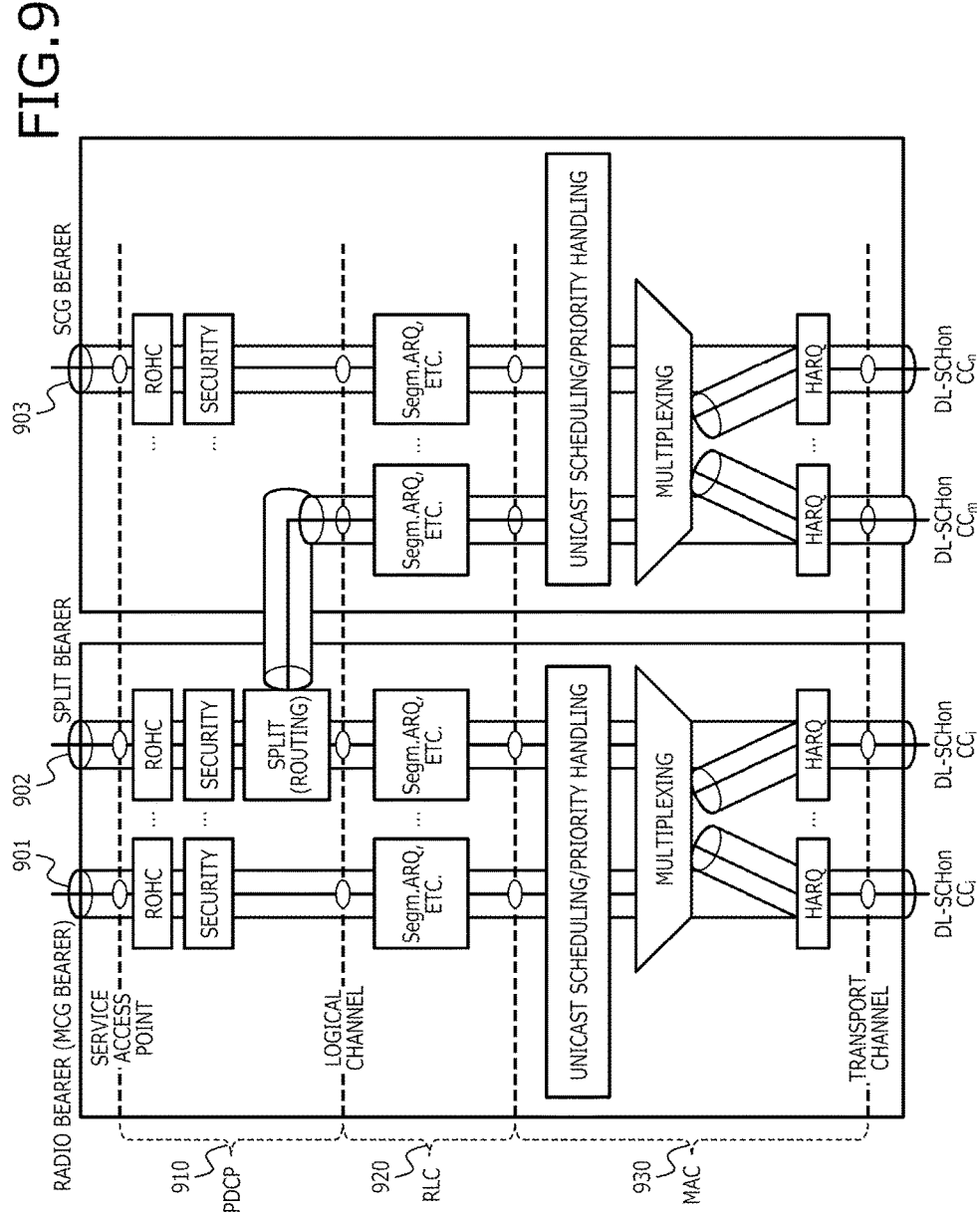
FIG. 9 is a diagram depicting an example of a layer 2 in the wireless communications system according to the second embodiment.

FIG. 9 is a diagram depicting an example of a layer 2 in the wireless communications system according to the second embodiment. In the wireless communications system 300 according to the second embodiment, e.g., processing depicted in FIG. 9 can be applied as the processing of the layer 2. The processing depicted in FIG. 9 is processing of an LTE-A layer 2 defined by 3GPP. As depicted in FIG. 9, the LTE-A layer 2 includes a PDCP 910, an RLC 920, and a MAC 930.

The PDCP 910 includes robust header compression (ROHC) for header compression of inflow IP datagram or processing related to security. The security-related processing includes ciphering and integrity protection, for example. In normal LTE-A communication, these processes of the PDCP 910 are performed on user data and the user data is forwarded to a lower layer (e.g., a layer 1).

In the case of carrying out dual connectivity, for example, the UE 311 is capable of simultaneous communication with at most two base stations (e.g., eNBs 321, 322). A master cell group (MCG) bearer 901 is a radio bearer of a main base station.

The MCG bearer 901 can be accompanied by a split bearer 902 and a secondary cell group (SCG) bearer 903. In the case of using the split bearer 902, when user data is forwarded from the layer 2 to a lower layer (e.g. layer 1), it is possible to select whether the user data is to be forwarded to only one base station or to two base stations.

The RLC 920 includes primary processing prior to wireless transmission of user data. For example, the RLC 920 includes user data segmentation (segm.) for adjusting the user data to a size that depends on radio quality. The RLC 920 may include, e.g., an automatic repeat request (ARQ) for retransmission of user data failing in error correction at a lower layer. When the user data is forwarded to the lower layer, the EPS bearers are mapped to corresponding logical channels and wirelessly transmitted.

The MAC 930 includes wireless transmission control. For example, the MAC 930 includes processing of performing packet scheduling and carrying out a hybrid automatic repeat request (HARQ) of transmitted data. HARQ is carried out for each carrier to be aggregated in carrier aggregation.

In the MAC 930, the sender applies a logical channel identifier (LCID) to a MAC service data unit (SDU) that is user data, for transmission. In the MAC 930, the receiver converts radio bearers into EPS bearers using the LCID applied by the sender.

Figure 10:
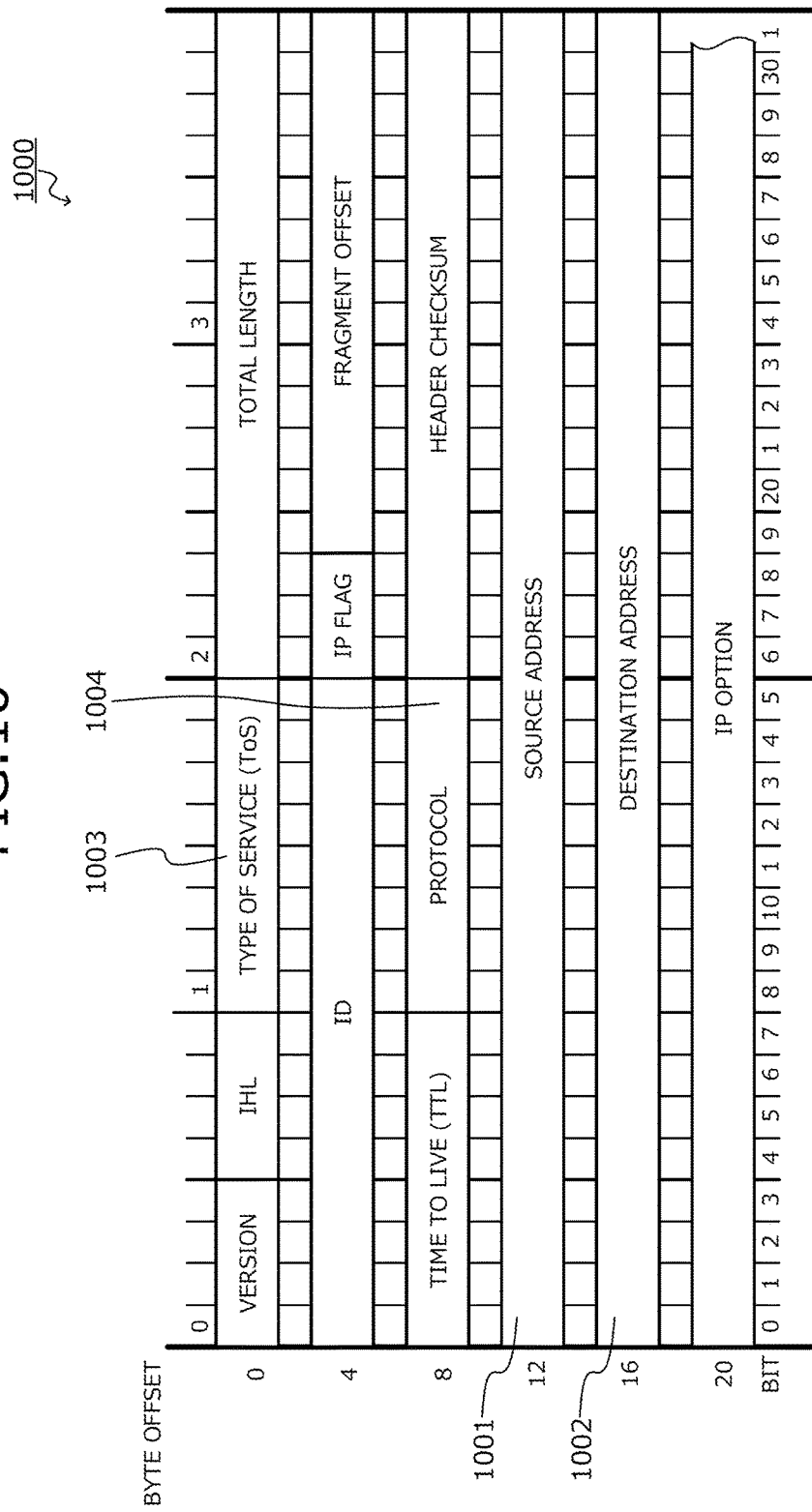
FIG. 10 is a diagram depicting an example of an IP header of an IP packet that is transmitted in the wireless communications system according to the second embodiment.

FIG. 10 is a diagram depicting an example of an IP header of an IP packet that is transmitted in the wireless communications system according to the second embodiment. In the wireless communications system 300 according to the second embodiment, an IP packet having an IP header 1000 depicted in FIG. 10, for example, is transmitted. The IP header 1000 includes, for example, a source address 1001 indicating a source and a destination address 1002 indicating a destination.

The IP header 1000 includes a ToS field 1003 for performing QoS. The above-described QoS control is performed on the basis of values of the ToS field 1003, for example. Further, the IP header 1000 includes a protocol field 1004 storing a protocol number of a transport layer corresponding to an upper layer.

FIG. 11 is a diagram depicting an example of the values of the ToS field included in the IP header of the IP packet that is transmitted in the wireless communications system according to the second embodiment. "First 3 bits" in a table 1100 depicted in FIG. 11 shows an IP precedence corresponding to the first 3 bits in the ToS field 1003 depicted in FIG. 9, allowing 2^3=8 different patterns. In the table 1100, the 8 different patterns show that upper patterns have higher priorities.

For example, "111" having a highest priority in the IP precedence of the ToS field 1003 shows that the IP packet corresponds to network control, and is reserved for control such as routing. "110" having a second highest priority in the IP precedence of the ToS field 1003 shows that the IP packet corresponds to internet control, and is reserved for control such as routing.

In the example of FIG. 11, although a case has been described where the IP precedence of the ToS field 1003 is used as the QoS priority information, the QoS priority information is not limited hereto and a differentiated service code point (DSCP) field, for example, may be used. DSCP is a field corresponding to first 6 bits in the ToS field 1003.

Figure 12:
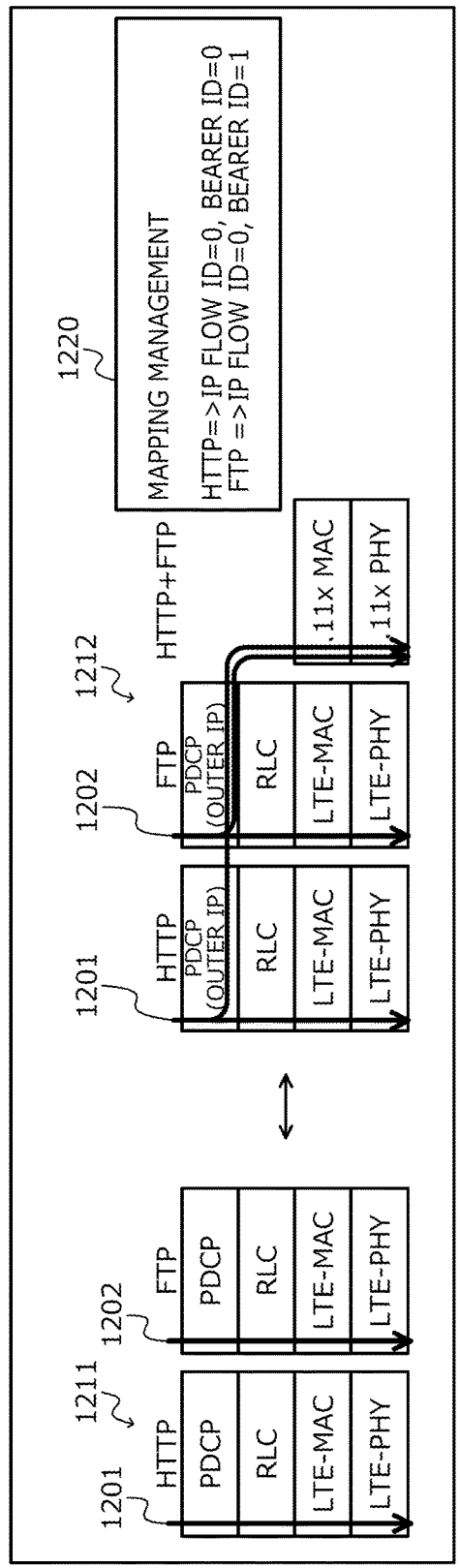
FIG. 12 is a diagram depicting an example of aggregation by LTE-A and WLAN in the wireless communications system according to the second embodiment.

FIG. 12 is a diagram depicting an example of aggregation by LTE-A and WLAN in the wireless communications system according to the second embodiment. Layer 2 processing in the LTE-A and WLAN aggregation is based on, for example, the above-described dual connectivity processing, taking into account LTE-A backward compatibility.

An IP flow 1201 is an IP flow by a hypertext transfer protocol (HTTP) between the UE 311 and the eNB 321. An IP flow 1202 is an IP flow by a file transfer protocol (FTP) between the UE 311 and eNB 321.

Non-aggregation processing 1211 shows processing in a case of transmitting the IP flows 1201, 1202 by LTE-A without offloading to a WLAN. This non-aggregation processing 1211 corresponds to data transmission that uses wireless communication by the first wireless communication 101 depicted in FIG. 1. In the non-aggregation processing 1211, each of the IP flows 1201, 1202 undergoes PDCP, RLC, LTE-MAC, and LTE-PHY processing in the mentioned sequence. These PDCP, RLC, LTE-MAC are, for example, PDCP 910, RLC 920, and MAC 930, respectively, depicted in FIG. 9. The LTE-PHY is a physical layer under LTE-A.

Aggregation processing 1212 depicts processing in a case in which the IP flows 1201, 1202 are transmitted using LTE-A and WLAN concurrently. The aggregation processing 1212 corresponds to the transmission of data using wireless communication by the first wireless communication 101 and the second wireless communication 102 depicted in FIG. 1.

In the aggregation processing 1212, the IP flow 1201 is divided by PDCP into packets to be transmitted by LTE-A and packets to be transmitted by WLAN. RLC, LTE-MAC, and LTE-PHY processes for the packets to be transmitted by LTE-A of the IP flow 1201 are sequentially performed.

Further, after the PDCP process, tunneling is performed by transmitting to the WLAN side, the packets that are to be transmitted by WLAN of the IP flow 1201 with an outer IP header by an outer IP layer. The outer IP header, for example, is a copy of the IP header added by the upper IP layer of the PDCP and is an IP header that is not ciphered by PDCP. For packets transferred to the WLAN side and having an outer IP header of the IP flow 1201, .11x MAC and .11x PHY processes are sequentially performed; .11x MAC and .11x PHY are a MAC layer and a PHY in WLAN(802.11x), respectively.

The outer IP layer can also be provided on a secondary base station (e.g., a secondary eNB 323) side. In other words, to add the outer IP header, information to be communicated (parameters, etc.) may be notified from a master base station (e.g., the eNB 321) to the secondary base station. A detailed example of a parameter will be described. In a second wireless communications system (e.g., WLAN), a telecommunications carrier (operator) is assumed to build a private IP network and since the IP header version can be independently determined, notification is not required. The header length is the PDU length of a first wireless communications system (e.g., LTE-A) and therefore, notification is not required. Regarding TOS, QoS information of the first wireless communications system has to be taken over and therefore, notification is desirable. Therefore, for the QoS information used by the first wireless communications system, for example, a QCI value is notified. At the second wireless communications system, reconversion from the QCI value into a TOS value is performed and the acquired value is set into the TOS field of the outer IP header. A fragmentation related ID, IP flag, and offset field are determined by the second wireless communications system alone and therefore, notification is not required. The protocol number can be independently determined by the second wireless communications system as described hereinafter and therefore, notification is not required. The header checksum is a value calculated based on the contents of the header and therefore, notification is not required.

In this manner, notification of a ToS value related to QoS control from the first wireless communications system to the second wireless communications system is desirable. Further, since scheduling according to QoS class is performed, the maximum communication rate (Aggregated Maximum Bit Rate (AMBR) supported by the mobile station, the Time to Wait (TTW) for controlling the delay time, and a guaranteed band (Guaranteed Bit Rate (GBR)), etc. may be notified. In this manner, at the secondary base station, cases of an IP header need not be a copy of an inner IP header.

Further, in the aggregation processing 1212, the IP flow 1202, similar to the IP flow 1201, is divided by PDCP into packets to be transmitted by LTE-A and packets to be transmitted by WLAN. RLC, LTE-MAC, and LTE-PHY processes are sequentially performed for the packets to be transmitted by LTE-A of the IP flow 1202.

Further, after the PDCP process, tunneling is performed by transmitting to the WLAN side, the packets that are to be transmitted by WLAN of the IP flow 1202 with an outer IP header by the outer IP layer. The outer IP header, for example, is a copy of the IP header added by the upper IP layer of the PDCP and is an IP header that is not ciphered by PDCP. For packets transferred to the WLAN side and having an outer IP header of the IP flow 1202, .11x MAC and .11x PHY processes are sequentially performed.

Under LTE-A, the IP flow is classified into bearers and is managed as bearers. On the contrary, in 802.11x of the institute of electrical and electronics engineers (IEEE), in one type of WLAN, for example, the IP flow is managed to be as the IP flow itself, not as bearers. This requires, for example, mapping management 1220 that manages mapping of which bearer belongs to which L2 layer, to thereby perform the non-aggregation processing 1211 and the aggregation processing 1212 at a high speed.

The mapping management 1220 is performed by the RRC that provides wireless control between the UE 311 and the eNB 321, for example. The RRC manages the radio bearers to thereby support, on a radio bearer level, the non-aggregation processing 1211 that uses LTE-A wireless communication and the aggregation processing 1212 that uses WLAN wireless communication. In the example depicted in FIG. 12, the IP flow 1201 with IP flow ID=0 in HTTP is managed as a bearer with bearer ID=0, whereas the IP flow 1202 with IP flow ID=0 in FTP is managed as a bearer with bearer ID=1.

The wireless communications system 300 according to the second embodiment adds an outer IP header to packets that are to be transferred to a WLAN. As a result, transmission of LTE-A traffic in the WLAN becomes possible. Further, in the WLAN, the ToS fields included in the transferred IP flows 1201, 1202 can be referred to.

For example, in the QoS under IEEE 802.11e, the ToS field of the IP header is referred to whereby the IP flow is aggregated into 4 types of access categories (ACs) and QoS is managed. In the wireless communications system 300, in the WLAN, the ToS fields included in the transferred IP flows 1201, 1202 are referred to and QoS processing based on the ToS fields can be performed. Therefore, in the aggregation processing 1212, support of the QoS in the WLAN becomes possible.

In this manner, when performing aggregation using LTE-A and WLAN concurrently, the source eNB 321 adds to data after processing by PDCP for transmission using WLAN, an outer IP header that includes service quality information prior to the PDCP processing.

The service quality information, for example, is QoS information indicating transmission priority levels of a service class of data, etc. For example, although the service quality information can be the ToS field described above, the service quality information is not limited hereto and can be various types of information indicating the transmission priority level of dat. For example, in a virtual local area network (VLAN), a field specifying the QoS is provided in a VLAN tag. More generally, the QoS information is 5-tuple information. 5-tuple refers to source IP address and port number, destination IP address and port number, and protocol type.

For example, when LTE data is transferred to a WLAN under LTE wireless control and processing such as ciphering of the header of the data is performed by PDCP, etc., the QoS information included in the data cannot be referred to in the WLAN. Therefore, in the WLAN, there are cases in which transmission control of the data cannot be performed based in the QoS information and the communication quality decreases when aggregation is performed using LTE-A and WLAN concurrently.

In contrast, since an outer IP header including service quality information is added to the data that is to be transferred to the WLAN, in the WLAN processing, transmission control based on the service quality information becomes possible. Transmission control based on the service quality information, for example, is QoS control of controlling the priority level according to the service quality information. Nonetheless, transmission control based on the service quality information is not limited hereto and can be various types of control.

Note that in the aggregation processing 1212, for example, ciphering processing in a WLAN is performed on user data transferred to the WLAN. Therefore, even if the user data is transferred to a WLAN without PDCP ciphering processing, the user data can be prevented from being transmitted between the eNB 321 and the UE 211 without being ciphered.

For WLAN ciphering, for example, advanced encryption standard (AES), temporal key integrity protocol (TKIP), wired equivalent privacy (WEP), etc. can be used.

In the example of FIG. 11, although a case has been described where, when performing the aggregation processing 1212, the IP flows 1201, 1202 do not pass through RLC and LTE-MAC with PDCP as a convergence layer (branch point), such processing is not limited hereto. For example, the processing may be such that, when performing the aggregation processing 1212, the IP flows 1201, 1202 pass through not only PDCP but also through RLC and LTE-MAC, with RLC or LTE-MAC that is a lower layer of PDCP being the convergence layer (branch point). In this manner, the processing unit that establishes the convergence point (branch point) when transferring to WLAN may be a processing unit of RLC or LTE-MAC without being limited to the processing of PDCP.

The data link layer (layer 2) of PDCP, RLC, LTE-MAC, etc. can grasp the communication congestion state in a wireless section between the UE 311 and the eNB 321. Thus, by establishing the convergence layer in the data link layer for transferring to a WLAN, it can be determined, for example, whether to execute the aggregation processing 1212, depending on the communication congestion in the wireless section between the UE 311 and the eNB 321.

In the aggregation processing 1212, the outer IP layer adding the outer IP header to the packets, for example, is provided as a part of the PDCP layer. However, as described hereinafter, the outer IP layer may be provided as a lower layer of the PDCP.

Figure 13:
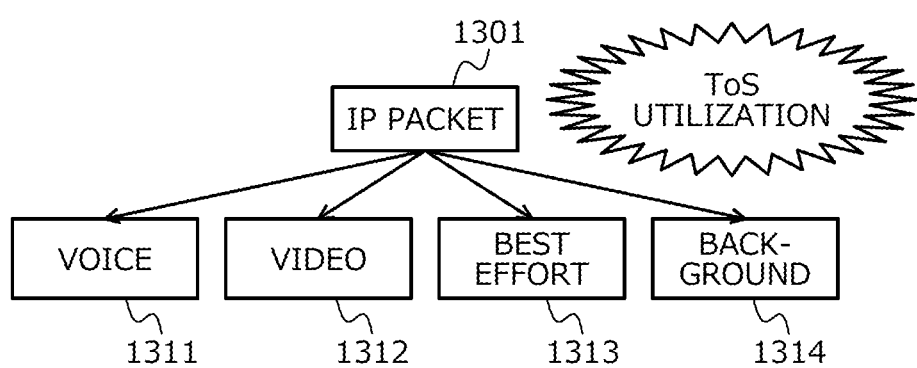
FIG. 13 is a diagram depicting an example of QoS control based on the ToS field in the wireless communications system according to the second embodiment.

FIG. 13 is a diagram depicting an example of QoS control based on the ToS field in the wireless communications system according to the second embodiment. As an example, case will be described where the eNB 321 has a WLAN communication function and an IP packet 1301 is transmitted from the eNB 321 to the UE 311. Based on the ToS field in the IP header of the IP packet 1301, the eNB 321 classifies the IP packet 1301 into ACs 1311 to 1314 of voice, video, best effort, and background, respectively.

In the wireless communications system 300, when aggregation is performed using LTE-A and a WLAN concurrently, an outer IP header is added to a packet (PDCP packet) processed by the PDCP layer and transferred to the WLAN. Therefore, in the WLAN processing, the eNB 321 can refer to the ToS field included in the outer IP header of the IP packet 1301 and perform AC classification based on the ToS 7 field.

Although a case has been described where the eNB 321 has the WLAN communication function, the same applies to a case where the eNB 321 transmits an IP flow to a WLAN access point to thereby perform aggregation using LTE-A and the WLAN concurrently. Although a case (downlink) has also been described where the packet 1301 is transmitted from the eNB 321 to the UE 311, the same applies to a case (uplink) where the IP packet 1301 is transmitted from the UE 311 to the eNB 321.

Figure 14:
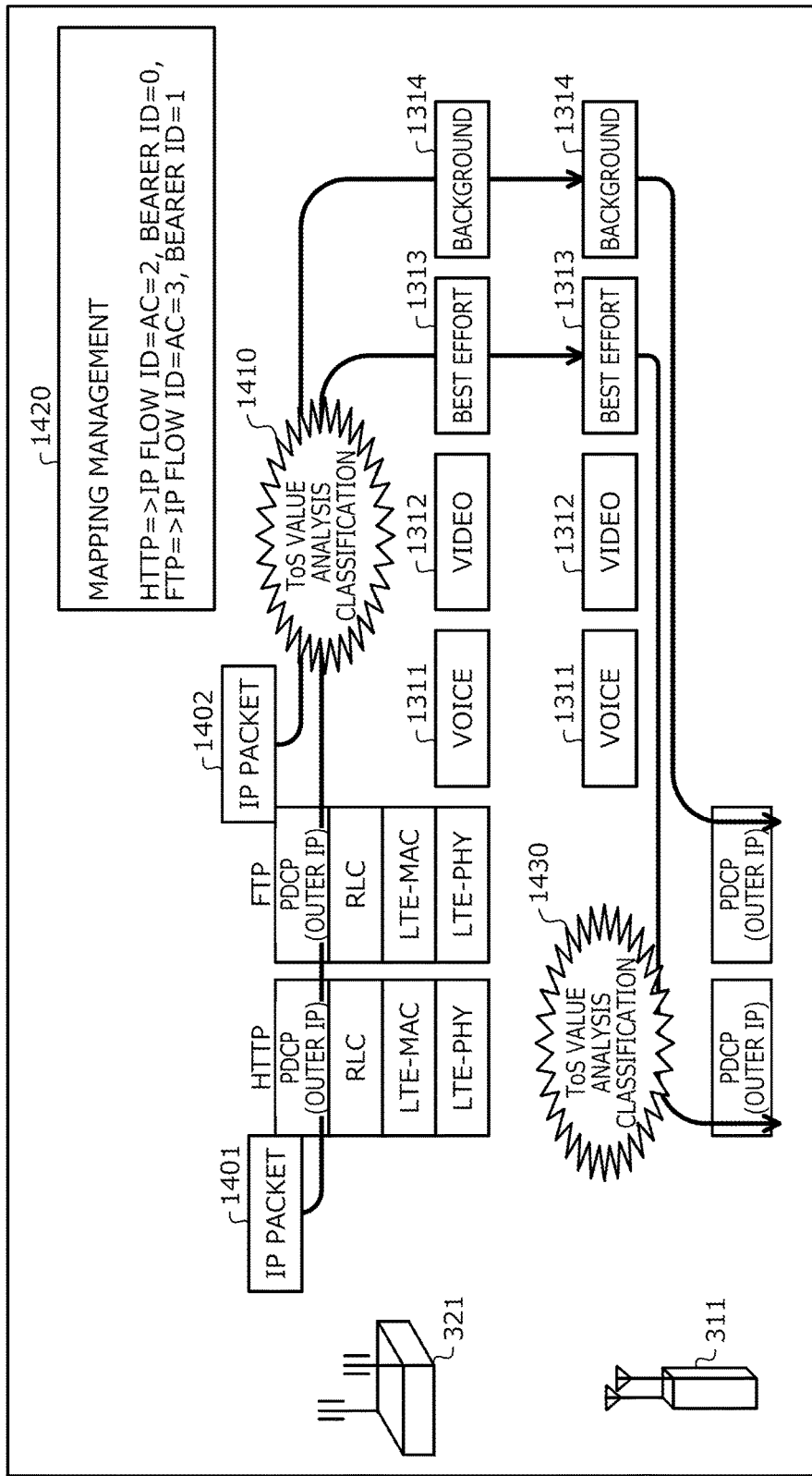
FIG. 14 is a diagram depicting an example of AC classification in the wireless communications system according to the second embodiment.

FIG. 14 is a diagram depicting an example of the AC classification in the wireless communications system according to the second embodiment. In FIG. 14, parts identical to those depicted in FIG. 13 are designated by the same reference numerals used in FIG. 13 and will not again be described.

In FIG. 14, a case is described in which the eNB 321 has a WLAN communications function. IP packets 1401, 1402 are packets transmitted by the eNB 321 to a WLAN in the aggregation using LTE-A and the WLAN concurrently. The IP packets 1401, 1402 are an HTTP IP packet and a FTP IP packet, respectively.

The eNB 321 performs ToS value analysis classification 1410 by which the IP packets 1401, 1402 are classified into any one of the ACs 1211 to 1214, based on the values of the ToS field included the IP header. In the example of FIG. 14, the eNB 321 classifies the IP packet 1401 into the AC 1413 (best effort) and classifies the IP packet 1402 into the AC 1414 (background). The eNB 321 then transmits to the UE 311 through a WLAN, the IP packets 1401, 1402 for which the ToS value analysis classification 1410 has been performed.

In mapping management 1420 by RRC between the eNB 321 and UE 311, the IP packet 1401 of HTTP is managed as IP flow ID=AC=2, bearer ID=0. AC=2 represents AC 1213 (best effort). In the mapping management 1420, the IP packet 1402 of FTP is managed as IP flow ID=AC=3, bearer ID=1. AC=3 represents AC 1214 (background).

The UE 311 performs ToS value analysis classification 1330 (declassification) corresponding to the ToS value analysis classification 1410 (classification) on the eNB 321 side, to thereby terminate the IP packets 1401, 1402 by PDCP.

Although a case (downlink) has been described where the packets 1401, 1402 are sent from the eNB 321 to the UE 311, the same applies to a case (uplink) where the IP packets 1401, 1402 are sent from the UE 311 to the eNB 321.

Figure 15:
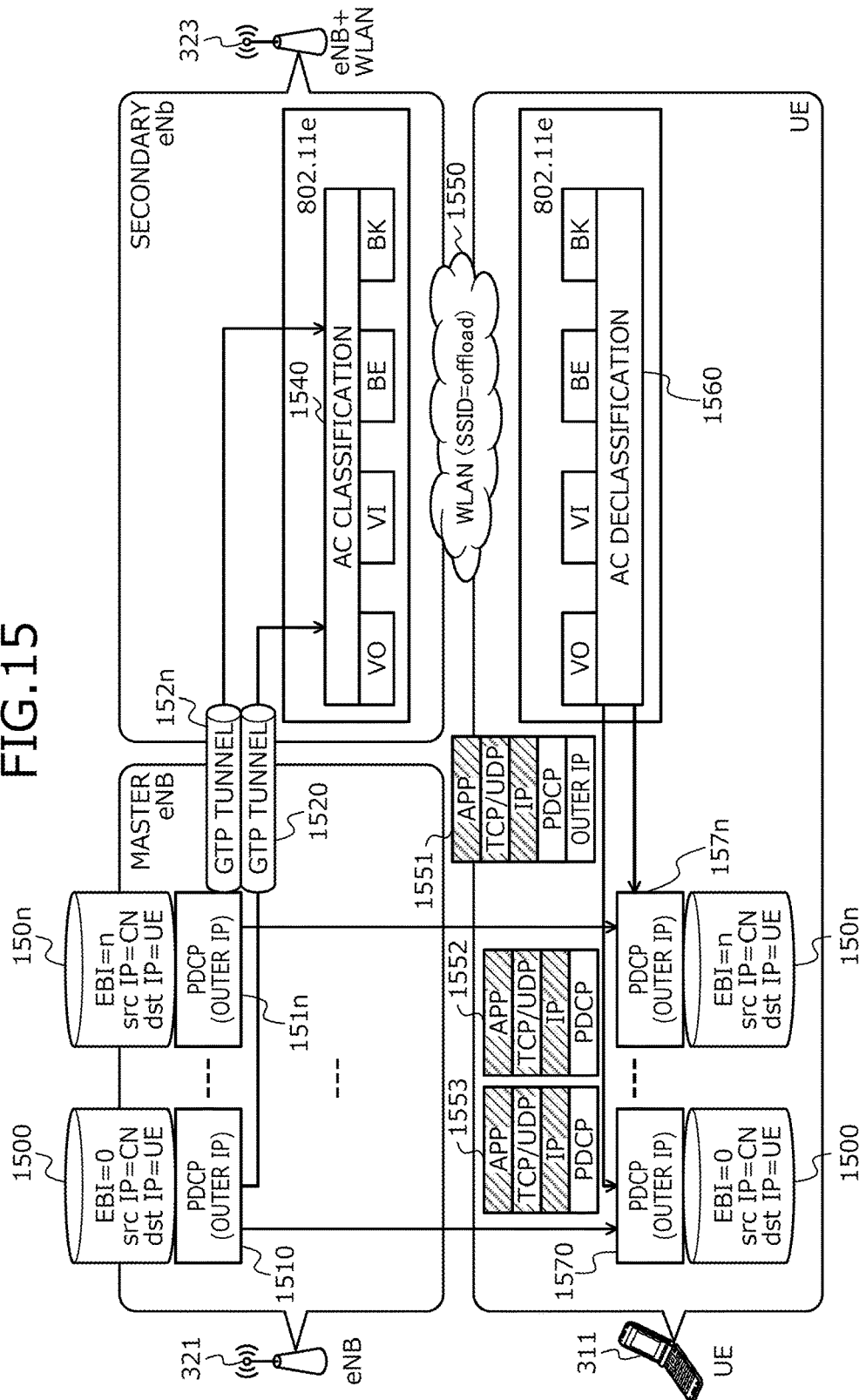
FIG. 15 is a diagram depicting an example of aggregation in the wireless communications system according to the second embodiment.

FIG. 15 is a diagram depicting an example of aggregation in the wireless communications system according to the second embodiment. In FIG. 15, a case of downlink will be described where aggregation using LTE-A and a WLAN concurrently is performed in a WLAN standalone configuration using a secondary eNB 323 having eNB and WLAN communication functions (eNB+WLAN), and the eNB 321 acts as a master eNB.

This aggregation is data transmission concurrently using the first wireless communication 101 and the second wireless communication 102 depicted in FIG. 1. The secondary eNB 323, for example, is a base station capable of communication with the eNB 321 via the interface between base stations such as an X2 interface for example and capable of WLAN communication with the UE 311.

In the example depicted in FIG. 15, a case will be described where n (e.g., n=10) EPS bearers 1500 to 150n are configured for communication between the eNB 321 and the UE 311, the EPS bearers 1500 to 150n being divided to LTE-A and the WLAN and transmitted. Only some of the EPS bearers 1500 to 150n may be divided to LTE-A and the WLAN and transmitted. In the example depicted in FIG. 15, the EPS bearers 1500 to 150n are downlink direction bearers from the eNB 321 toward the UE 311. Although in FIG. 15, a case will be described where n EPS bearers 1500 to 150n are configured, the number of the EPS bearers to be configured is arbitrary.

The EPS bearers 1500 to 150n are n+1 EPS bearers having EPS bearer IDs (EBIs) of 0 to n, respectively. A source (src IP) of all the EPS bearers 1500 to 150n is a core network (CN). A destination (dst IP) of the EPS bearers 1500 to 150n is the UE 311 (UE).

In the case of transferring packets of the EPS bearers 1500 to 150n to a WLAN, the eNB 321 transfers the packets to the secondary eNB 323, via PDCP layers 1410 to 141n, respectively. That is, the eNB 321 controls the transfer to the WLAN of the EPS bearers 1500 to 150n by the layer 2 (PDCP in the example depicted in FIG. 15) of LTE-A.

At this time, the eNB 321 adds an outer IP header to the packets that are in each of the EPS bearers 1500 to 150n and that are to be transferred to the WLAN. As a result, the EPS bearers 1500 to 150n transfer the packets to the secondary eNB 323 as IP packets. In other words, the EPS bearers 1500 to 150n transfer to the WLAN, the packets in a state in which the ToS field (QoS information) is included and the outer IP header is not ciphered.

Further, the value of a protocol field (e.g., the protocol field 1004 depicted in FIG. 10) in the outer IP header can be, for example, "99" (any private encryption scheme). However, the value of the protocol field in the outer IP header is not limited to "99", "and may be "61" (any host internal protocol), "63" (any local network), "114" (any 0-hop protocol), etc.

Transfer of the EPS bearers 1500 to 150n from the eNB 321 to the secondary eNB 323, for example, can be performed the same as a LTE-A handover. For example, the transfer of the EPS bearers 1500 to 150n from the eNB 321 to the secondary eNB 323 can be performed using GTP tunnels 1520 to 152n between the eNB 321 and the secondary eNB 323. The GTP tunnels 1520 to 152n are GTP tunnels configured for each of the EPS bearers between the eNB 321 and the secondary eNB 323. However, this transfer is not limited to GTP tunnels and can be performed by various methods such as Ethernet (registered trademark), etc.

For packets that are in each of the EPS bearers 1500 to 150n and that are to be transmitted by LTE-A, the eNB 321 sequentially performs RLC, MAC, and PHY processing and wirelessly transmits the packets to the UE 311 by LTE-A without adding an outer IP header. The UE 311 receives the packets transmitted from the eNB 321 by LTE-A by performing processing by PHY, MAC, RLC, and PDCP (the PDCP layers 1570 to 157n).

The secondary eNB 323 receives the EPS bearers 1500 to 150n transferred from the eNB 321 via the GTP tunnels 1520 to 152n, respectively. The secondary eNB 323 performs AC classification 1540 for the IP packets corresponding to the received EPS bearers 1500 to 150n, based on the ToS field included in the IP header of each of the IP packets.

The AC classification 1540 is processing by a WLAN (802.11e) function in the secondary eNB 323. By the AC classification 1540, for example, as depicted in FIG. 13, the IP packets are classified into an AC of voice (VO), video (VI), best effort (BE), and background (BK).

The secondary eNB 323 transmits the IP packets classified by the AC classification 1540 to the UE 311, via the WLAN 1550. In this case, a Service Set Identifier (SSID) in the WLAN 1550 can be, for example, "offload".

The UE 311 performs the AC declassification 1560 of the IP packets received via the WLAN 1550, based on the ToS field included in the outer IP header of the IP packets. The AC declassification 1560 is processing by the WLAN (802.11e) function in the UE 311.

The UE 311 reclassifies the IP packets received by the AC declassification 1560 into the EPS bearers 1500 to 150n based on classified ACs. The UE 311 processes and receives the reclassified EPS bearers 1500 to 150n by the PDCP layers 1570 to 157n.

A layer group 1551 indicates protocols of the IP packet received by the UE 311 by the PDCP layers 1570 to 157n. As indicated by the layer group 1551, data transmitted by the WLAN is data processed by an application layer (APP), a TCP/UDP layer, the IP layer (inner layer), the PDCP layer, and the outer IP layer. The data (hatched portion) by the application layer, the TCP/UDP layer, and the IP layer is encrypted by PDCP layer processing and transmitted.

The UE 311 removes the outer IP header added to the received IP packets. A layer group 1552 indicates protocols of PDCP packets acquired by removing the outer IP header from the IP packets received by the UE 311. The PDCP packets from the eNB 321 are transmitted using tunneling by the outer IP layer whereby, as indicated by the layer group 1552, the UE 311 can receive, as PDCP packets, data transmitted by the WLAN.

A layer group 1553 indicates protocols of the PDCP packets received from the eNB 321 by LTE-A by the UE 311. As indicated by the layer group 1553, the eNB 321 transmits to the UE 311, the PDCP packets as is without adding an outer IP header to the PDCP packets.

The UE 311 performs sequence control between the PDCP packets received by the WLAN and the PDCP packets received by LTE-A, based on the sequence numbers included in the headers of the PDCP packets. The sequence numbers included in the headers of the PDCP packets are the sequence numbers included in the headers added to the data by processing by the PDCP layer.

As a result, the UE 311 can correctly arrange the PDCP packets received by the WLAN and the PDCP packets received by LTE-A in sequence and the eNB 321 can receive the data divided into LTE-A and the WLAN and transmitted.

In this manner, in the wireless communications system 300, when the EPS bearers 1500 to 150n are divided into LTE-A and a WLAN and transmitted, the PDCP packet transmitted by the WLAN can be transmitted by tunneling by an outer IP. As a result, at the receiver, the data transmitted by the WLAN can be received as PDCP packets and the PDCP sequence numbers can be used to perform sequence control between the packets received by LTE-A and the packets received by the WLAN. Therefore, data transmission concurrently using LTE-A and a WLAN becomes possible.

Further, by adding an outer IP header that is a copy of the inner IP header to the PDCP packets transmitted by the WLAN and performing tunneling, at the secondary eNB 323, it becomes possible to refer to the ToS fields of the outer IP headers of the IP packets. Therefore, for the data transmitted by the WLAN 1550, the AC classification 1540 can be performed based on the ToS field and QoS control can be performed according to the nature of the traffic.

At the WLAN 1550, a priority value in a VLAN tag defined by IEEE 802.1q can referred to and AC classification can be performed. The VLAN tag is the identifier of the VLAN.

In FIG. 15, a case is described in which the eNB 321 becomes the master eNB and aggregation is performed using LTE-A and a WLAN concurrently in a WLAN standalone configuration using the secondary eNB 323 having eNB and WLAN communication functions (eNB+WLAN). However, the aggregation is not limited hereto and, for example, the eNB 321 may perform the aggregation in a configuration also having a WLAN communication function (eNB+WLAN). In this case, communication with the UE 311 by the WLAN is also performed by the eNB 321 and the secondary eNB 323 need not be used.

FIG. 16 is a diagram depicting an example of mapping to QoS class ACs applicable to the wireless communications system according to the second embodiment. The WLAN sender (e.g. the secondary eNB 323) classifies into ACs, EPS bearers that are to be transmitted, as in a table 1600 of FIG. 16, for example. The QoS classes of the EPS bearers are identified by QoS class identifiers (QCIs).

The QCIs are classified into four ACs, i.e. voice (VO), video (VI), best effort (BE), and background (BK). The WLAN receiver (e.g., the UE 311) performs conversion from ACs to the QoS classes. To that end, the eNB 321 configures, in advance, EPS bearers to be transferred to the UE 311. On the contrary, in the downlink, for example, the UE 311 can specify an EPS bearer on the basis of the EPS bearer configured by the eNB 321. In the uplink, the UE 311 can perform the AC classification on the basis of the EPS bearer configured by the eNB 321.

Figure 17:
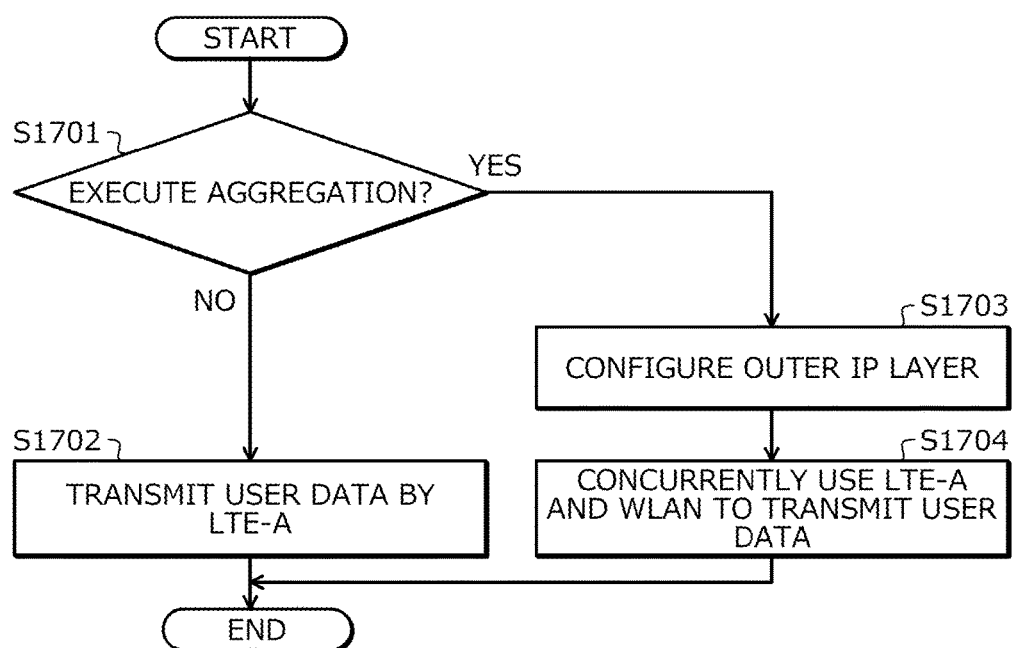
FIG. 17 is a flowchart depicting an example of processing by a transmitter apparatus in the wireless communications system according to the second embodiment.

FIG. 17 is a flowchart depicting an example of processing by a transmitter apparatus in the wireless communications system according to the second embodiment. In FIG. 17, a downlink case will be described where user data is transmitted from the eNB 321 to the UE 311.

First, the eNB 321 determines whether to execute aggregation using LTE-A and a WLAN concurrently with respect to user data to the UE 311 (step S1701). A method of the determination at step S1701 will be described later.

At step S1701, in a case of determining that aggregation is not to be executed (step S1701: NO), the eNB 321 transmits the user data destined to the UE 311 by LTE-A (step S1702), and ends a series of operations. At step S1702, PDCP ciphering and header compression, etc. is performed for the user data and subsequently the user data is transmitted. In contrast, the UE 311 performs processing such as decoding for the ciphering and header decompression for the header compression at the PDCP layer whereby the user data transmitted from the eNB 321 can be received.

At step S1701, in a case of determining that aggregation is to be executed (step S1701: YES), the eNB 321 configures an outer IP layer for performing processing of the data to be transferred to the WLAN (step S1703). As step S1703, the eNB 321 may control the UE 311 to configure an outer IP layer of the UE 311 matching that of the eNB 321.

Next, the eNB 321 concurrently uses LTE-A and WLAN and transmits the user data to the UE 311 (step S1704), and ends a series of operations. At step S1704, the eNB 321 adds the outer IP header to the user data by the outer IP layer configured at step S1703 and thereby transmits by tunneling, the user data to be transmitted by the WLAN.

At step S1704, in a case where the eNB 321 has the WLAN communication function, the eNB 321 transmits the user data to the UE 311 by the LTE-A communication and WLAN communication functions thereof. On the other hand, in a case where the eNB 321 does not have the WLAN communication function, for user data that is to be transmitted by the WLAN, the eNB 321 transfers the user data destined for the UE 311 to the secondary eNB 323 that is connected with the eNB 321 and has the WLAN communication function.

Since data transferred to the WLAN by the outer IP layer configured at step S1703 has an outer IP header, in the WLAN, QoS control based on the ToS field included in the outer IP header becomes possible.

The determination at step S1701, for example, can be performed based on whether aggregation for the user data of the UE 311 has been instructed from the UE 311 or the network side (e.g., the PGW 332). Alternatively, the determination at step S1701, for example, can be performed based on whether the amount of the user data to the UE 311 exceeds a threshold. The amount of the user data may be the amount per time, a total amount of a series of the user data of the UE 311, etc. Alternatively, the determination at step S1701, for example, can be performed based on a delay time of communication between the eNB 321 and the UE 311 by LTE-A, a delay period of communication between the eNB 321 and the UE 311 by the WLAN, etc.

In FIG. 17, in a case where aggregation is not performed, an instance is described in which only LTE-A is used to transmit user data. However, in a case where the eNB 321 does not perform aggregation, only the WLAN may be used to transmit user data. In a case where aggregation is not performed, determination of whether LTE-A or the WLAN is to be used, for example, can be performed based on an instruction from the UE 311 or the network side (e.g., the PGW 332). Alternatively, the determination, for example, can be performed based on whether the amount of user data to the UE 311 has exceeded a threshold. The amount of user data may be the amount per time, or the total amount of a series of user data of the UE 311. Alternatively, the determination, for example, can be performed based on a delay time of communication by LTE-A between the eNB 321 and the UE 311, or a delay time of communication by the WLAN between the eNB 321 and the UE 311.

In FIG. 17, although processing by the eNB 321 in a case of downlink transmitting user data from the eNB 321 to the UE 311 is described, processing by the UE 311 in a case of uplink transmitting user data from the UE 311 to the eNB 321 is the same. However, the operation at step S1704 differs depending on whether the eNB 321 has a WLAN communication function. In a case in which the eNB 321 has a WLAN communication, the UE 311 directly transmits to the eNB 321, user data destined for the eNB 321 and to be transmitted by the WLAN. On the other hand, in a case in which the eNB 321 does not have a WLAN communication, the UE 311 transfers user data destined for the eNB 321 and to be transmitted by the WLAN, to the secondary eNB 323 connected to the eNB 321 and having a WLAN communication function. As a result, user data destined for the eNB 321 can be transmitted via the secondary eNB 323.

Figure 18:
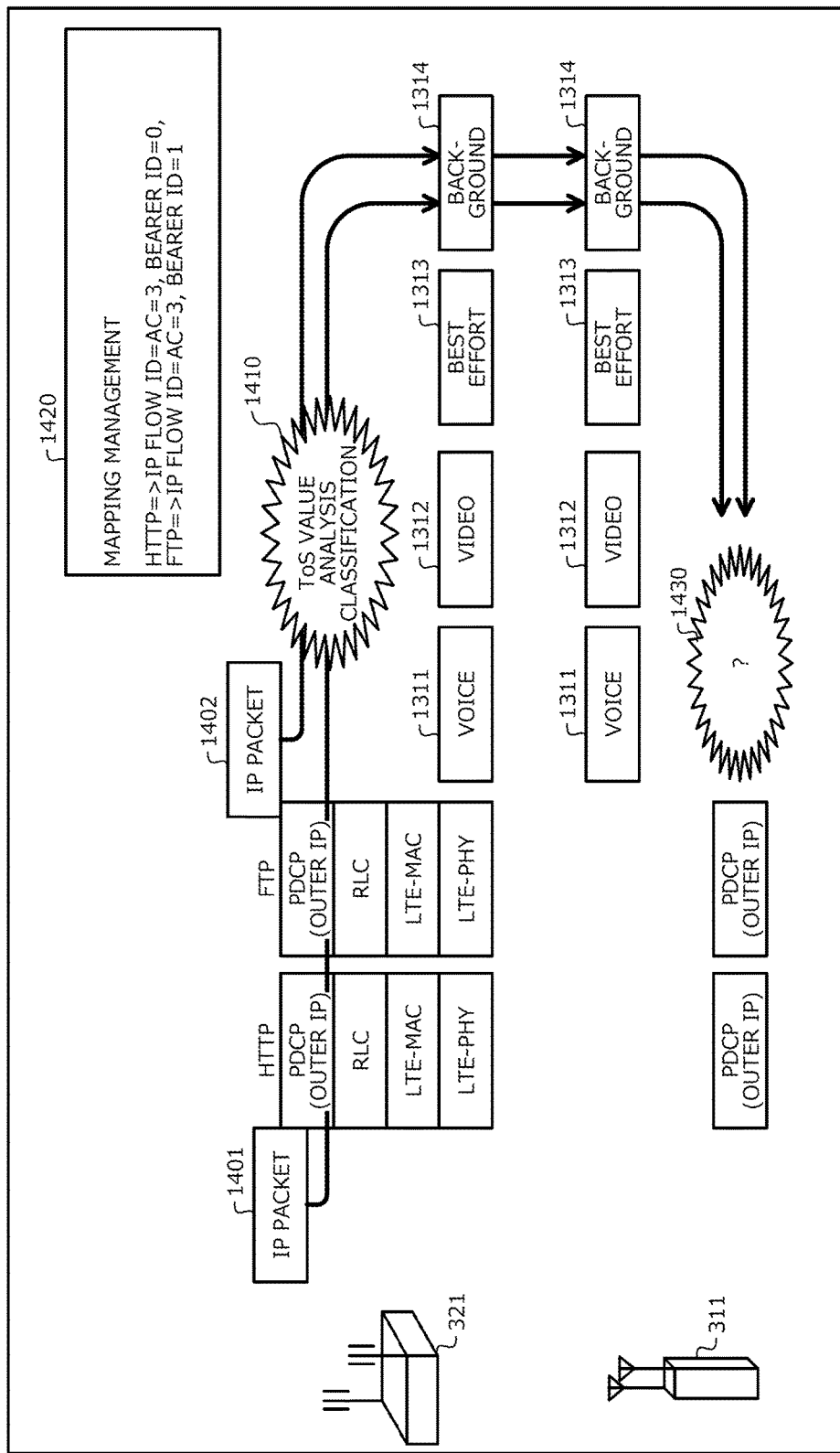
FIG. 18 is a diagram depicting an example of a case where plural EPS bearers have a same QoS class in the wireless communications system according to the second embodiment.

FIG. 18 is a diagram depicting an example of a case where plural EPS bearers have the same QoS class in the wireless communications system according to the second embodiment. In FIG. 18, parts similar to those depicted in FIG. 14 are designated by the same reference numerals used in FIG. 14 and explanations of similar parts will be omitted. For example, when both the IP packets 1401, 1402 are background IP packets, the IP packets 1401, 1402 are both classified into the AC 1314 (background) in the ToS value analysis classification 1410.

In this case, the IP packet 1401 of HTTP is managed as IP flow ID=AC=3, bearer ID=0 in the mapping management 1320 in RRC between the UE 311 and the eNB 321. In the mapping management 1320, the IP packet 1402 of FTP is managed as IP flow ID=AC=3, bearer ID=1.

In this case, even though the UE 311 performs the ToS value analysis classification 1430 corresponding to the ToS value analysis classification 1410, the UE 311 cannot determine based on AC which IP packet 1401, 1402 received is which EPS bearer having bearer ID=0, 1.

In the case of transmitting user data through a WLAN, the LCID cannot be applied to the IP datagram (PDCP SDU). For this reason, the eNB 321 cannot determine based on LCID which IP packet 1401, 1402 received is which EPS bearer having bearer ID=0, 1.

In this manner, in the case that plural EPS bearers have the same QoS class, the receiver (the UE 311 in the example depicted in FIG. 18) may not be able to uniquely identify the EPS bearers. This means that the receiver may not be able to convert the received radio bearers to EPS bearers. In the uplink in particular, IP flows between the eNB 321 and the PGW 232 are managed as EPS bearers and hence, IP flow transmission from the eNB 321 to the PGW 232 becomes difficult if the eNB 321 cannot convert the radio bearers to EPS bearers.

On the contrary, in the wireless communications system 300 according to the second embodiment, for example, the sender among the UE 311 and the eNB 321 does not concurrently perform aggregation for the EPS bearers having the same QoS class.

For example, in a case of transmitting plural EPS bearers having the same QoS class to the UE 311, the sender performs aggregation for only one of the plural EPS bearers to a WLAN and sends the remaining EPS bearers to the UE 211 by LTE-A without performing aggregation. Alternatively, in a case of transmitting plural EPS bearers having the same QoS class to the UE 211, the sender performs transmission through LTE-A without performing aggregation. As a result, plural EPS bearers having the same QoS class are not concurrently transferred to a WLAN whereby the UE 211 can uniquely specify an EPS bearer on the basis of the AC, for each user data transferred to the WLAN.

Alternatively, in a case of sending plural bearers having the same QoS class to the UE 311, the sender among the UE 311 and the eNB 321 may perform a process of aggregating the plural EPS bearers into one bearer. The process of aggregating plural EPS bearers into one bearer can use "UE requested bearer resource modification procedure" defined in TS23.401 of 3GPP, for example. As a result plural EPS bearers having the same QoS class are not transferred to the WLAN whereby the UE 211 can uniquely specify an EPS bearer on the basis of the AC, for each user data transferred to a WLAN.

Further, for example, as described hereinafter (e.g., refer to FIGS. 22 to 24), it is conceivable that the outer IP layer is acquired by separately providing a new tunneling layer and by the tunneling layer, a tunneling header that includes identification information for each bearer is added to the data. In this case, regarding the user data transferred to the WLAN, the UE 311 can use the identification information to uniquely specify an EPS bearer.

Figure 19:
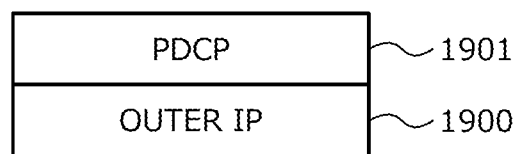
FIG. 19 is a diagram depicting an example of implementation of an outer IP layer using a 3GPP protocol in the second embodiment.

FIG. 19 is a diagram depicting an example of implementation of the outer IP layer using a 3GPP protocol in the second embodiment. In the examples depicted in FIG. 15, etc., a case in which the outer IP layer is provided as a part of the PDCP layer has been described. However, like a protocol stack depicted in FIG. 19, an outer IP layer 1900 may be provided as a lower layer of a PDCP layer 1901.

In this case, for example, the PDCP layer 1901 transfers to the outer IP layer 1900, PDCP packets for which ciphering processing, etc. are performed by the PDCP and to which a PDCP header is added, and IP headers added to packets before the ciphering processing, etc. were performed by the PDCP. The PDCP header, for example, is a 2-byte header.

The outer IP layer 1900 adds, as an outer IP header to a PDCP packet transferred from a PDCP layer 1901, the IP header transferred from the PDCP layer 1901. As a result, PDCP packet can be transmitted through the WLAN by tunneling. The outer IP header, for example, is a 20-byte header like the inner IP header.

Figure 20:
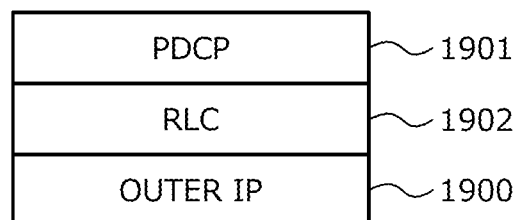
FIG. 20 is a diagram depicting another example of implementation of the outer IP layer using a 3GPP protocol in the second embodiment.

FIG. 20 is a diagram depicting another example of implementation of the outer IP layer using a 3GPP protocol in the second embodiment. In FIG. 20, parts identical to those depicted in FIG. 19 are designated by the same reference numerals used in FIG. 19 and explanations thereof will be omitted. Like a protocol stack depicted in FIG. 20, the outer IP layer 1900 may be provided as a lower layer of a RLC layer 1902 and the PDCP layer 1901.

In this case, for example, the PDCP layer 1901 transfers to the RLC layer 1902, PDCP packets for which ciphering processing, etc. are performed by the PDCP and to which a PDCP header is added, and IP headers (inner IP headers) added to packets before the ciphering processing, etc. were performed by the PDCP.

The RLC layer 1902 adds to PDCP packets transferred from the PDCP layer 1901 an RLC header and transfers to the outer IP layer 1900, RLC packets to which a RLC header has been added and the IP headers transferred from the PDCP layer 1901. The RLC header, for example, is a variable length header.

The outer IP layer 1900 adds as an outer IP header to the RLC packets transferred from the RLC layer 1902, the IP headers transferred from the RLC layer 1902. As a result, the RLC packets can be transmitted through the WLAN by tunneling. Therefore, retransmission control by, for example, RLC becomes possible for data transferred by tunneling through the WLAN.

Figure 21:
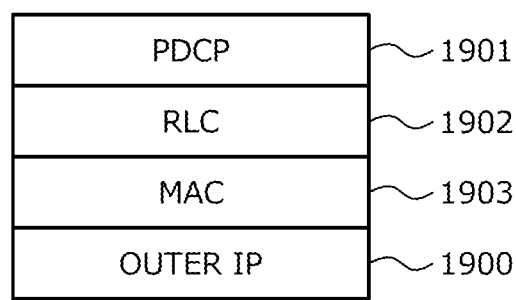
FIG. 21 is a diagram depicting another example of implementation of the outer IP layer using a 3GPP protocol in the second embodiment.

FIG. 21 is a diagram depicting another example of implementation of the outer IP layer using a 3GPP protocol in the second embodiment. In FIG. 21, parts identical to those depicted in FIG. 20 are designated by the same reference numerals used in FIG. 20 and explanations thereof will be omitted. Like a protocol stack depicted in FIG. 21, the outer IP layer 1900 may be provided as a lower layer of a MAC layer 1903, the RLC layer 1902, and the PDCP layer 1901.

In this case, the RLC layer 1902 transfers to the MAC layer 1903, RLC packets to which an RLC header is added, and IP headers transferred from the PDCP layer 1901. The MAC layer 1903 adds a MAC header to the PDCP packets transferred from the RLC layer 1902 and transfers to the outer IP layer 1900, MAC frames to which a MAC header has been added and the IP headers transferred from the RLC layer 1902. The MAC header, for example, is a variable length header.

The outer IP layer 1900 adds as an outer IP header to the MAC frames transferred from the MAC layer 1903, the IP headers transferred from the MAC layer 1903. As a result, the MAC frames can be transmitted through the WLAN by tunneling. Therefore, retransmission control by, for example, HARQ tunneling becomes possible for data transferred by tunneling through the WLAN.

Figure 22:
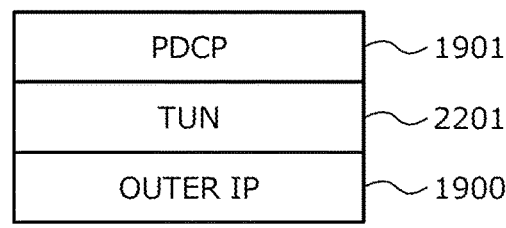
FIG. 22 is a diagram depicting an example of implementation of the outer IP layer using a new tunnel protocol in the second embodiment.

FIG. 22 is a diagram depicting an example of implementation of the outer IP layer using a new tunnel protocol in the second embodiment. In FIG. 22, parts identical to those depicted in FIG. 19 are designated by the same reference numerals used in FIG. 19 and explanations thereof will be omitted. As depicted in FIG. 22, a tunneling layer 2201 (TUN), which is a new tunneling protocol, may be provided between the PDCP layer 1901 and the outer IP layer 1900.

The tunneling layer 2201 adds a tunneling header to PDCP packets to which a PDCP header has been added by the PDCP layer 1901. Further, for example, the tunneling layer 2201 may add to the PDCP packets, a tunneling header that includes bearer identification information. The outer IP layer 1900 adds an outer IP header to the packets to which a tunneling header has been added by the tunneling layer 2201. The bearer identification information, for example, is a bearer ID. The receiver station refers to the bearer ID whereby the receiver station can specify the EPS bearer.

Figure 23:
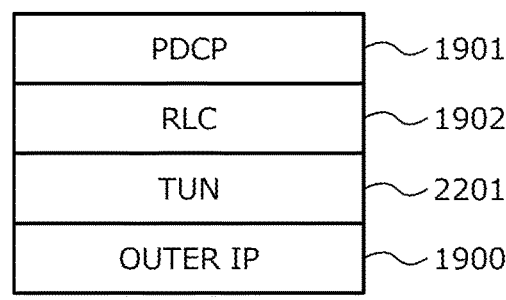
FIG. 23 is a diagram depicting another example of implementation of the outer IP layer using a new tunnel protocol in the second embodiment.

FIG. 23 is a diagram depicting another example of implementation of the outer IP layer using a new tunnel protocol in the second embodiment. In FIG. 23, parts identical to those depicted in FIG. 20 or FIG. 22 are designated by the same reference numerals used in FIG. 20 and FIG. 22, and explanations thereof will be omitted. As depicted in FIG. 23, the tunneling layer 2201 maybe provided between the RLC layer 1902 and the outer IP layer 1900. The tunneling layer 2201 adds a tunneling header to RLC packets to which an RLC header has been added by the RLC layer 1902.

Figure 24:
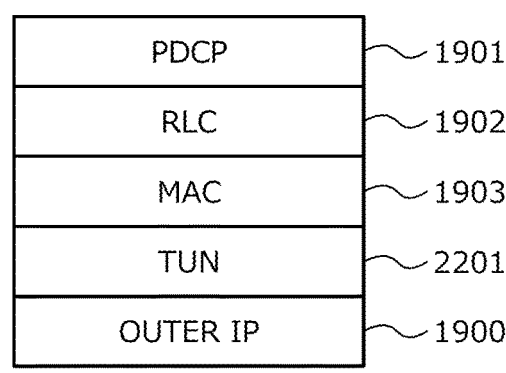
FIG. 24 is a diagram depicting an example of implementation of the outer IP layer using a new tunnel protocol in the second embodiment.

FIG. 24 is a diagram depicting an example of implementation of the outer IP layer using a new tunnel protocol in the second embodiment. In FIG. 24, parts identical to those depicted in FIG. 21 or FIG. 23 are designated by the same reference numerals used in FIG. 21 and FIG. 23, and explanations thereof will be omitted. As depicted in FIG. 24, the tunneling layer 2201 may be provided between the MAC layer 1903 and the outer IP layer 1900. The tunneling layer 2201 adds a tunneling header to MAC frames to which a MAC header has been added by the MAC layer 1903.

As depicted in FIGS. 19 to 24, the position where the outer IP layer 1900 is provided is not limited to the PDCP layer 1901 and, for example, can be positions lower than the PDCP layer 1901. Further, for example, although a case has been described in which the outer IP layer 1900 is provided separately from the RLC layer 1902 and the MAC layer 1903, a part of the RLC layer 1902 or the MAC layer 1903 may be provided as the outer IP layer 1900.

In this manner, according to the second embodiment, in a case where the transmitting station among the eNB 321 and the UE 311 performs aggregation concurrently using LTE-A and a WLAN, PDCP packets to be transmitted by the WLAN can be transmitted by tunneling by the outer IP. As a result, at the receiving station, the data transmitted through the WLAN are received as PDCP packets and the PDCP sequence numbers can be used to perform sequence control between the packets received by LTE-A and the packets received by the WLAN. Therefore, data transmission that concurrently uses LTE-A and a WLAN becomes possible.

Data transmission that concurrently uses LTE-A and a WLAN becomes possible whereby the transmission rate of data can be improved. For example, the maximum transmission rate in a case in which only one of LTE-A and a WLAN is used is the maximum transmission rate for LTE-A when LTE-A is used and is the maximum transmission rate for a WLAN when the WLAN is used. In contrast, the maximum transmission rate in a case in which LTE-A and a WLAN are used concurrently is a sum of the maximum transmission rate for LTE-A and the maximum transmission rate for the WLAN.

Further, the transmitting station among the eNB 321 and the UE 311 can perform tunneling by adding to PDCP packets transmitted by the WLAN, an outer IP header that is a copy of the inner IP header. As a result, in the WLAN, the ToS field included in the outer IP header of the IP packets can be referred to. Therefore, for data transmitted by the WLAN, AC classification based on the ToS field can be performed and QoS control can be performed according to the nature of the traffic.

In a third embodiment, a method will be described that is capable of increasing the amount of user data that can be aggregated, by eliminating the restriction that EPS bearers having the same QoS class are not aggregated at the same time. The third embodiment can be regarded as an example obtained by embodying the above first embodiment and hence, can naturally be carried out in combination with the first embodiment. The third embodiment can naturally be carried out in combination with parts common to the second embodiment.

Figure 25:
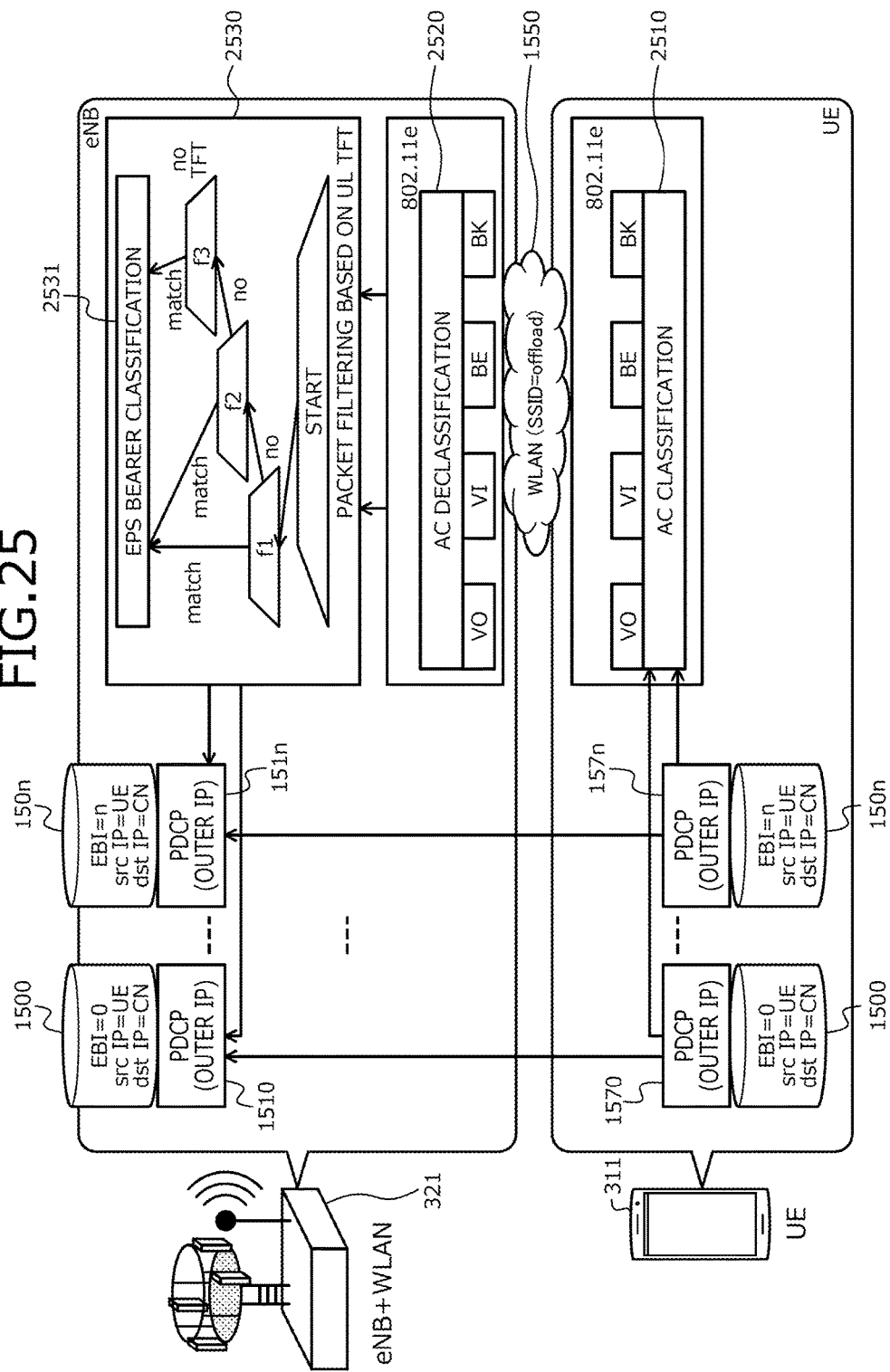
FIG. 25 is a diagram depicting an example of a method of identifying EPS bearers using UL TFT in a wireless communications system according to a third embodiment.

FIG. 25 is a diagram depicting an example of a method of identifying EPS bearers using UL TFT in a wireless communications system according to the third embodiment. In FIG. 25, parts similar to those depicted in FIG. 15 are designated by the same reference numerals used in FIG. 15 and will not again be described.

In FIG. 25, the uplink will be described for a case of performing aggregation using LTE-A and a WLAN concurrently in a configuration where the eNB 321 has a WLAN communication function (eNB+WLAN). In the example depicted in FIG. 25, EPS bearers 1500 to 150*n* are uplink direction bearers from the UE 311 to the eNB 321. In other words, the source (src IP) of all the EPS bearers 1500 to 150*n* is the UE 311 (UE). The destination (dst IP) of all the EPS bearers 1500 to 150*n* is the core network (CN).

The UE 311, in a case of performing aggregation using LTE-A and a WLAN concurrently for the EPS bearers 1500 to 150*n*, passes the EPS bearers 1500 to 150*n* through the PDCP layers 1570 to 157*n*. At this time, the UE 311 performs PDCP packet tunneling by adding an outer IP header to PDCP packets transmitted by the WLAN. As a result, the PDCP packets transmitted by the WLAN become IP packets.

The UE 311 performs for the IP packets corresponding to EPS bearers 1500 to 150*n* going through the PDCP layers 1570 to 157*n*, AC classification 2510 based on the ToS field included the outer IP header of each IP packet. The AC classification 2510 is processing by a WLAN function (802.11e) at the UE 311.

The IP packets classified by the AC classification 2510 are transmitted via the WLAN 1550 to the eNB 321. The eNB 321 performs for the IP packets received via the WLAN 1550, AC declassification 2520 based on the ToS field included in the IP header of each IP packet. The AC declassification 2520 is processing by a WLAN function (802.11e) at the eNB 321.

Further, for packets transmitted by LTE-A in the respective EPS bearers 1500 to 150*n*, the UE 311 sequentially performs processing for RLC, MAC, and PHY wirelessly transmits the packets by LTE-A to the eNB 321 without adding an outer IP header. The eNB 321 performs processing by PHY, MAC, RLC, PDCP (the PDCP layers 1570 to 157*n*) and thereby receives the packets transmitted from the UE 311 by LTE-A.

The eNB 321 applies packet filtering 2530 based on uplink (UL) TFT, to each of the IP packets received through the AC declassification 2520. In the packet filtering 2530, the IP packets are filtered depending on whether conditions (f1 to f3) corresponding to TFT are fulfilled (match/no). Then, in accordance with the results of this filtering, EPS bearer classification 2531 identifying the EPS bearers is carried out. As a result, EPS bearers corresponding to the IP packets transferred to the WLAN are identified. A method of acquiring the UL TFT at the eNB 321 will be described later (e.g., refer to FIG. 27).

On the basis of the results of identification by the EPS bearer classification 2531, the eNB 321 transfers the IP packets to PDCP layers corresponding to EPS bearers of the IP packets among the PDCP layers 1510 to 151*n*. Thus, the IP packets (IP flow) transferred to the WLAN are converted into corresponding EPS bearers and transferred to the PDCP layers 1510 to 151*n*.

The eNB 321 acquires PDCP packets by removing the outer IP header added to the IP packets received by the WLAN. The eNB 321 performs sequence control between the PDCP packets received by the WLAN and the PDCP packets received by LTE-A, based on the sequence numbers included in the headers of the PDCP packets. As a result, the eNB 321 correctly arranges, in sequence, the PDCP packets received by the WLAN and the PDCP packets received by LTE-A and thus, the eNB 321 can receive data that has been divided between and transmitted by LTE-A and a WLAN.

In this manner, the eNB 321 performs the packet filtering 2530 based on UL TFT with respect to the IP packets transferred to the WLAN and is thereby able to identify the EPS bearers of the IP packets transferred to the WLAN. Therefore, the wireless communications system 300 makes aggregation possible even without a restriction that multiple RPS bearers having the same QoS class are not to be aggregated at the same time and the wireless communications system 300 can facilitate increases in the amount of user data that can be transmitted.

Figure 26:
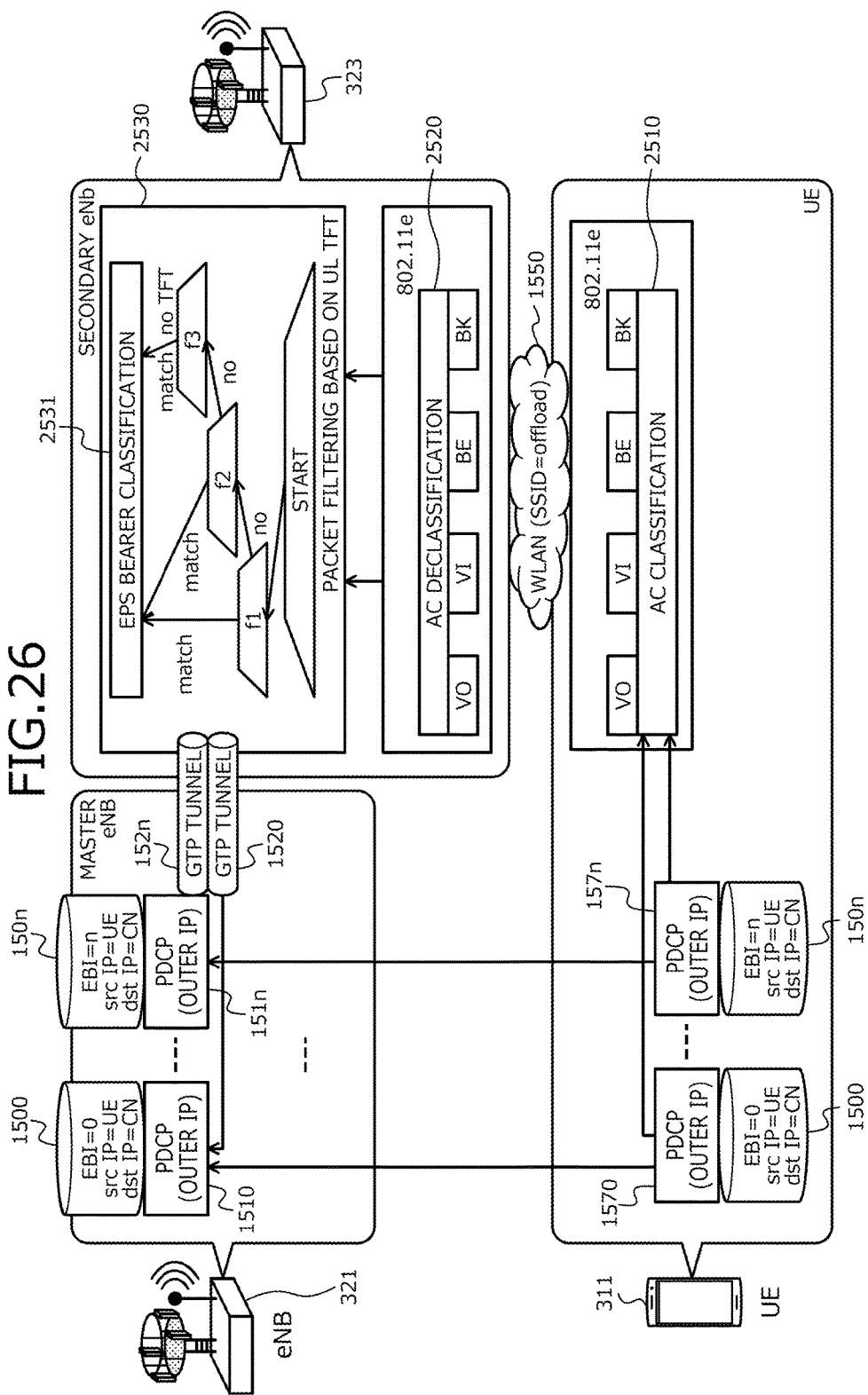
FIG. 26 is a diagram depicting another example of a method of identifying EPS bearers using UL TFT in the wireless communications system according to the third embodiment.

FIG. 26 is a diagram depicting another example of a method of identifying EPS bearers using UL TFT in the wireless communications system according to the third embodiment. In FIG. 26, parts similar to those depicted in FIG. 15 or 25 are designated by the same reference numerals and explanations thereof will be omitted.

In FIG. 26, a case of the uplink will be described where aggregation is performed concurrently using LTE-A and a WLAN in the WLAN standalone configuration using the secondary eNB 323 having the eNB and WLAN communication functions, with the eNB 321 serving as a master eNB. In this case, the GTP tunnels 1520 to 152n are provided for each of the EPS bearers between the eNB 321 and the secondary eNB 323.

The secondary eNB 323 receives the IP packets transmitted via the WLAN 1550 from the UE 311. The secondary eNB 323 performs the AC declassification 2520 and the packet filtering 2530 similar to those in the example depicted in FIG. 25, for each of the received IP packets. This allows the EPS bearer classification 2531 in the packet filtering 2530 to be performed for each IP packet so that an EPS bearer corresponding to each IP packet is identified.

Based on the result of identification by the EPS bearer classification 2531, the secondary eNB 323 transfers each IP packet to a GTP tunnel corresponding to the EPS bearer of the each IP packet, among the GTP tunnels 1520 to 152n. As a result, the IP packets are transferred to corresponding PDCP layers among the PDCP layers 1510 to 151n of the eNB 321.

In this manner, the secondary eNB 323 performs the packet filtering 2530 based on UL TFT for the IP packets transferred to the WLAN, so as to be able to identify the EPS bearers of the IP packets transferred to the WLAN. Depending on the results of identification of the EPS bearers, the secondary eNB 323 then transfers the IP packets through the GTP tunnels 1520 to 152n, whereby the eNB 321 can receive the IP packets transferred to the WLAN, as EPS bearers.

Thus, without configuring the restriction that EPS bearers having the same QoS class are not to be aggregated at the same time, the wireless communications system 300 makes aggregation possible and can facilitate an increase in the amount of user data that can be transferred.

Figure 27:
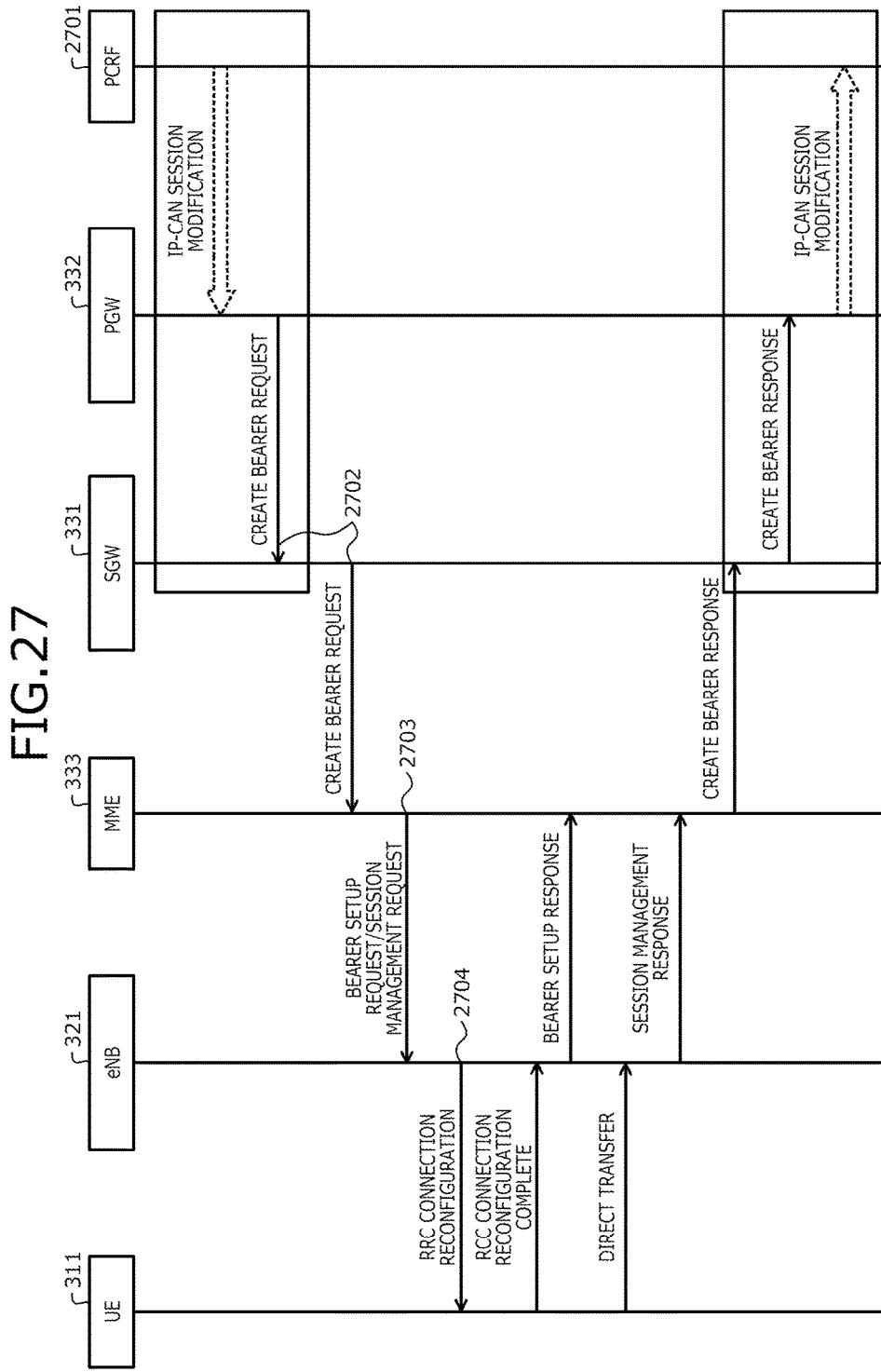
FIG. 27 is a diagram depicting an example of a TFT acquisition method in the wireless communications system according to the third embodiment.

FIG. 27 is a diagram depicting an example of a TFT acquisition method in the wireless communications system according to the third embodiment. Steps depicted in FIG. 27 are processes of a "Dedicated bearer activation procedure" defined in TS23.401 of 3GPP. A policy and charging rules function (PCRF) 2001 depicted in FIG. 27 is a processing unit for configuring service-dependent priority control and charging rules, connected to the packet core network 330.

For example, the PGW 332 configures UL and DL TFTs for the UE 311, stores the TFTs to a create bearer request 2702 depicted in FIG. 27, and transmits the create bearer request 2702 to the SGW 331. The SGW 331 transmits the create bearer request 2702 sent from the PGW 332, to the MME 333.

The MME 333 transmits to the eNB 321, a bearer setup request/session management request 2703 including the TFTs included in the create bearer request 2702 transmitted from the SGW 331. The TFTs are included in a session management request of the bearer setup request/session management request 2703, for example. This enables the eNB 321 to acquire the UL and DL TFTs.

The eNB 321 transmits to the UE 311, an RRC connection reconfiguration 2704 including a UL TFT among the TFTs included in the bearer setup request/session management request 2703 transmitted from the MME 333. This enables the UE 311 to acquire the UL TFT. Although the UL TFT can be defined in an RRC connection reconfiguration message, it is preferably defined in a non-access stratum (NAS) PDU transmitted in the message. The same will apply hereinafter.

In the example depicted in FIG. 25, for example, the eNB 321 can perform the packet filtering 2530 using the UL TFT acquired from the bearer setup request/session management request 2703. In the example depicted in FIG. 26, the eNB 321 transmits the UL TFT acquired from the bearer setup request/session management request 2703, to the secondary eNB 323. The secondary eNB 323 can perform the packet filtering 2530 on the basis of the UL TFT sent from the eNB 321.

Figure 28:
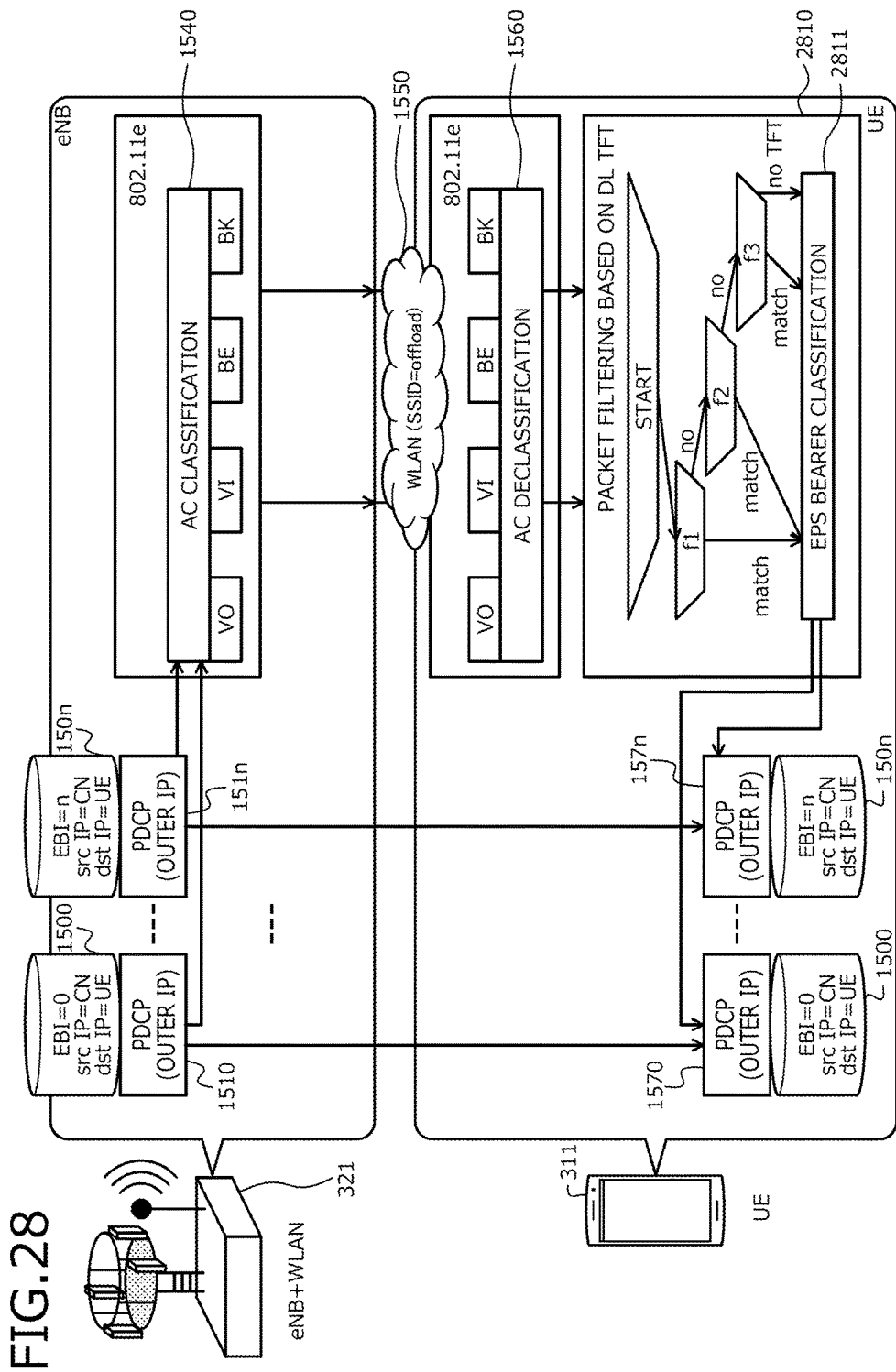
FIG. 28 is a diagram depicting an example of a method of identifying EPS bearers using DL TFT in the wireless communications system according to the third embodiment.

FIG. 28 is a diagram depicting an example of a method of identifying EPS bearers using DL TFT in the wireless communications system according to the third embodiment. In FIG. 28, parts similar to those depicted in FIG. 15 are designated by the same reference numerals used in FIG. 15 and explanations thereof will be omitted.

In FIG. 28, a downlink case will be described where aggregation is performed concurrently using LTE-A and a WLAN in a configuration in which the eNB 321 has a WLAN communication function (eNB+WLAN). In the example depicted in FIG. 28, the EPS bearers 1500 to 150n are downlink direction bearers from the eNB 321 to the UE 311.

The UE 311 performs a packet filtering 2810 based on downlink (DL) TFTs, for IP packets received by the AC declassification 1560. The packet filtering 2810 by the UE 311 is processing based on the DL TFTs and therefore, is processing similar to the packet filtering by the filter layer 811 in the PGW 332 depicted in FIG. 8, for example.

In the packet filtering 2810, filtering is performed depending on whether (match/no) the IP packets satisfy conditions (f1 to f3) corresponding to TFTs. An EPS bearer classification 2811 identifying EPS bearers is carried out according to the results of this filtering. This allows identification of EPS bearers corresponding to the IP packets transferred to the WLAN.

For example, the eNB 321 stores not only the UL TFTs but also DL TFTs into the RRC connection reconfiguration 2704 destined for the UE 311, depicted in FIG. 27. This enables the UE 311 to acquire a DL TFT from the RRC connection reconfiguration 2704, to thereby perform the packet filtering 2810 based on the acquired DL TFT.

Based on the results of identification by the EPS bearer classification 2811, the UE 311 transfers the IP packets to PDCP layers corresponding to the EPS bearers of the IP packets, among the PDCP layers 1570 to 157n. As a result, the IP packets (IP flow) transferred to the WLAN are converted into corresponding EPS bearers and transferred to the PDCP layers 1570 to 157n.

In this manner, by applying the packet filtering 2810 based on a DL TFT to the IP packets transferred to the WLAN, the UE 311 can identify EPS bearers of the IP packets transferred to the WLAN. Thus, without configuring the restriction that EPS bearers having the same QoS class are not to be aggregated at the same time, the wireless communications system 300 makes aggregation possible and can facilitate an increase in the amount of user data that can be transferred.

Figure 29:
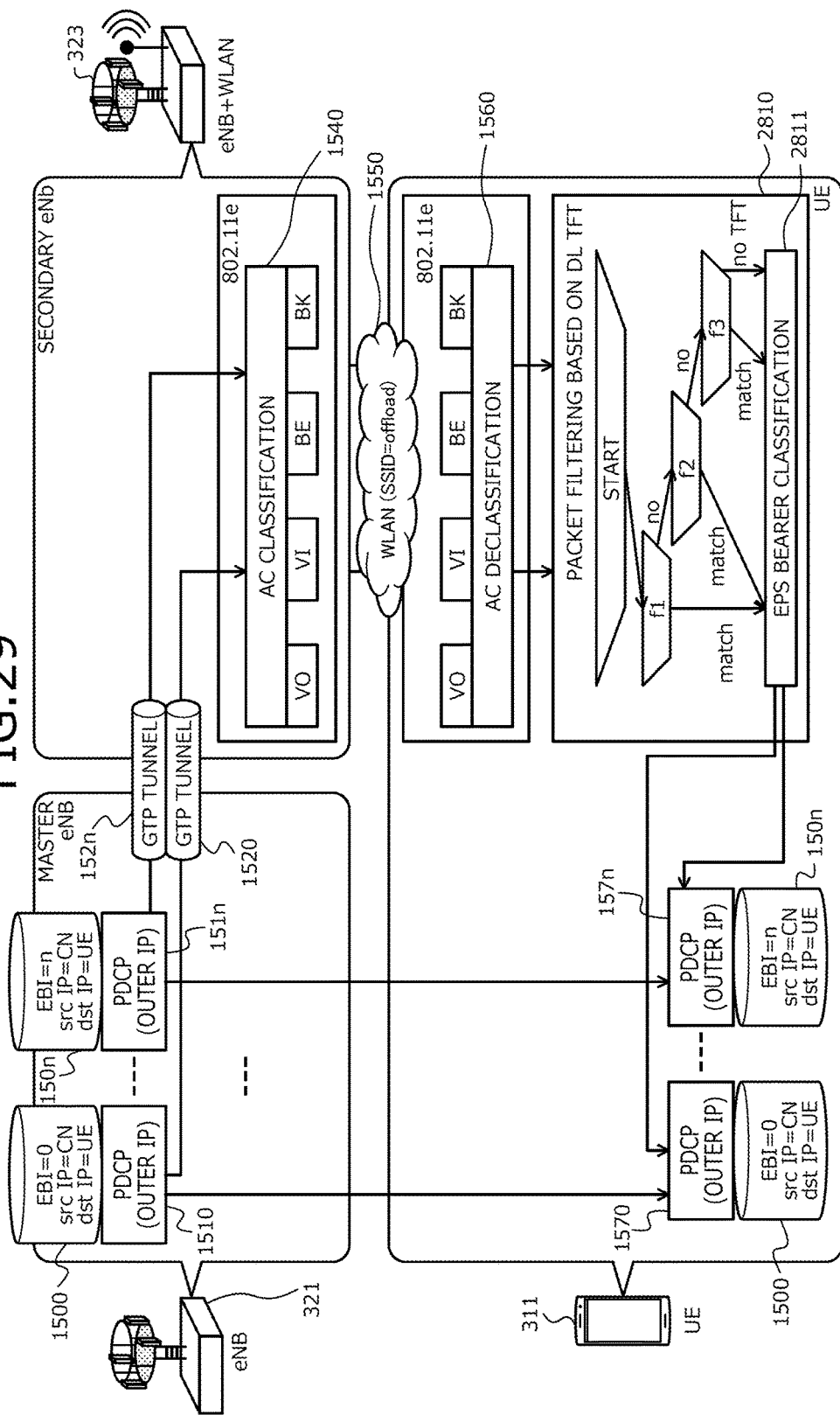
FIG. 29 is a diagram depicting another example of a method of identifying EPS bearers using DL TFTs in the wireless communications system according to the third embodiment.

FIG. 29 is a diagram depicting another example of a method of identifying EPS bearers using DL TFTs in the wireless communications system according to the third embodiment. In FIG. 29, parts similar to those depicted in FIG. 15 or 28 are designated by the same reference numerals used in FIGS. 15 and 28 and explanations thereof will be omitted.

In FIG. 29, a downlink case will be described where aggregation is performed concurrently using LTE-A and a WLAN in the WLAN standalone configuration using the secondary eNB 323 having eNB and WLAN communication functions, with the eNB 321 serving as a master eNB. In this case, the GTP tunnels 1520 to 152n are provided for each of the EPS bearers between the eNB 321 and the secondary eNB 323.

The secondary eNB 323 receives the IP packets transmitted via the WLAN 1550 from the UE 311. The secondary eNB 323 then transfers the received IP packets to the PDCP layers 1570 to 157n.

Thus, similar to the example depicted in FIG. 28, the UE 311 performs the packet filtering 2810 based on a DL TFT for the IP packets transferred to the WLAN, so as to be able to identify the EPS bearers of the IP packets transferred to the WLAN. Thus, without configuring the restriction that EPS bearers having the same QoS class are not to be aggregated at the same time, the wireless communications system 300 makes aggregation possible and can facilitate an increase in the amount of user data that can be transferred.

According to the method using the TFTs depicted in FIGS. 25 to 29, the EPS bearers can be identified without the number of EPS bearers transferrable to the WLAN being restricted by the bit number of the VLAN tag, as in the case of using the VLAN tag, for example. According to the method using the TFTs depicted in FIGS. 25 to 29, the EPS bearers can be identified without adding a header such as the VLAN tag to the user data transferred to the WLAN.

Figure 30:
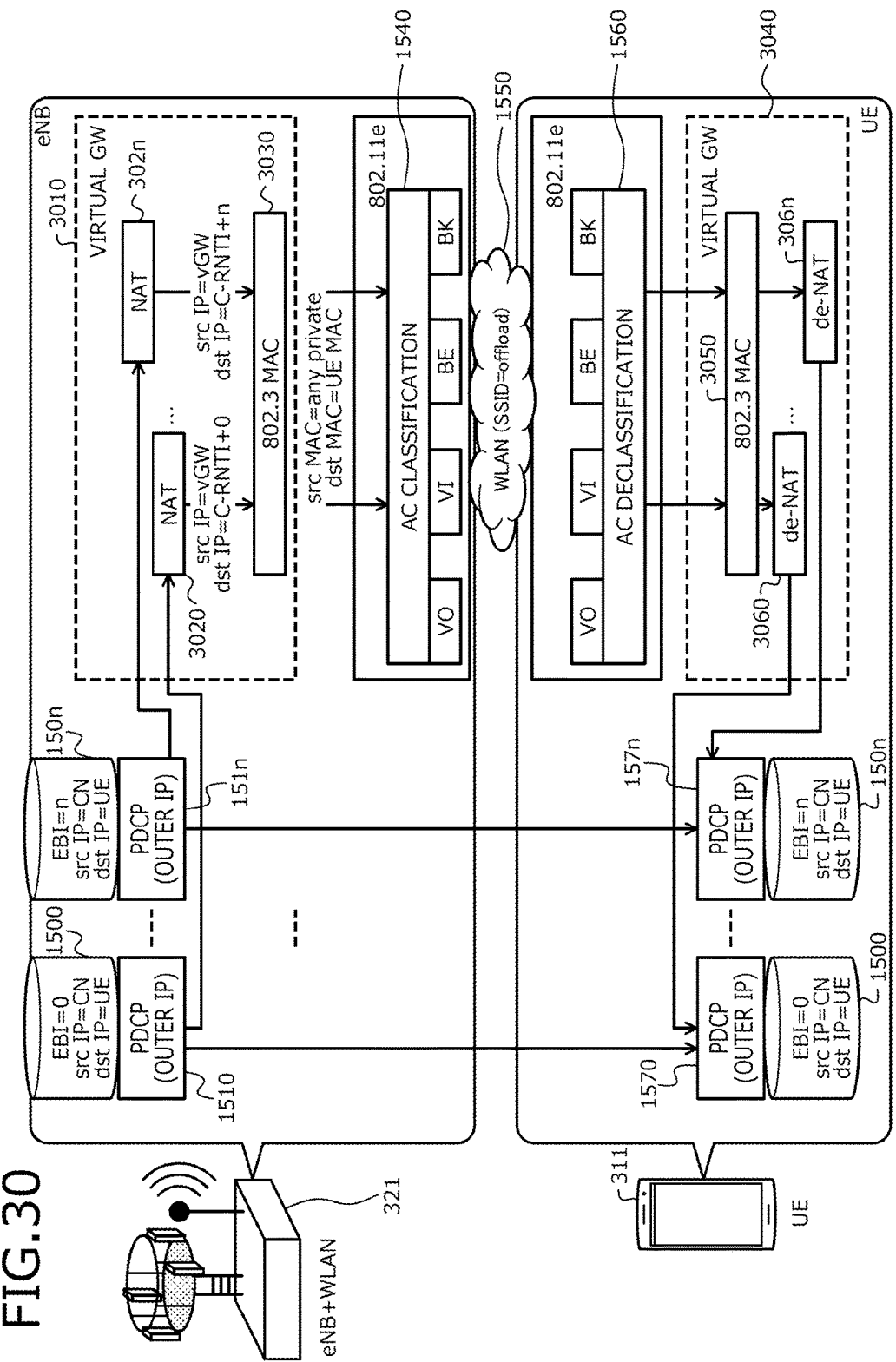
FIG. 30 is a diagram depicting an example of a method of identifying EPS bearers using a virtual IP flow in the wireless communications system according to the third embodiment.

FIG. 30 is a diagram depicting an example of a method of identifying EPS bearers using a virtual IP flow in the wireless communications system according to the third embodiment. In FIG. 30, parts similar to those depicted in FIG. 15 are designated by the same reference numerals used in FIG. 15 and explanations thereof will be omitted.

In FIG. 30, regarding downlink, a case will be described where aggregation is performed concurrently using LTE-A and a WLAN in a configuration in which the eNB 321 has a WLAN communication function (eNB+WLAN). In the example depicted in FIG. 30, the EPS bearers 1500 to 150n are downlink direction bearers from the eNB 321 to the UE 311.

In the example depicted in FIG. 30, a virtual GW 3010 is provided between the PDCP layers 1510 to 151n and the WLAN 1550 in the eNB 321. The virtual GW 3010 includes NAT processing units 3020 to 302n and a MAC processing unit 3030 (802.3 MAC). A virtual GW 3040 is provided between the WLAN 1550 and the PDCP layers 1570 to 157n in the UE 311. The virtual GW 3040 includes a MAC processing unit 3050 (802.3 MAC) and de-NAT processing units 3060 to 306n.

The EPS bearers 1500 to 150n passing through the PDCP layers 1510 to 151n are transferred to the NAT processing units 3020 to 302n of the virtual GW 3010. The NAT processing units 3020 to 302n perform network address translation (NAT) processes that classify the EPS bearers 1500 to 150n, respectively, by virtual destination IP addresses into virtual IP flows. The virtual IP flow is a local virtual data flow between the eNB 321 and the UE 311 for example. The virtual destination IP address is a destination address of the virtual IP flow. The NAT processing units 3020 to 302n transfer the classified IP flows to the MAC processing unit 3030.

For example, the NAT processing units 3020 to 302n perform one-to-one mapping between the EPS bearers 1500 to 150n and the virtual destination IP addresses. Virtual source IP addresses (src IP) of the virtual IP flows transferred from the NAT processing units 3020 to 302n can be a virtual GW 3010 (vGW) for example. Virtual destination IP addresses (dst IP) of the virtual IP flows transferred from the NAT processing units 3020 to 302n can be C-RNTI+0 to C-RNTI+n, respectively, for example.

Although the virtual destination IP addresses, for example, can be calculated from C-RNTI, the virtual destination IP addresses are not limited hereto. For example, at the time of call configuration or LTE-WLAN aggregation configuration, EPS bearer identifiers and IP addresses may be associated in advance by RRC signaling by the eNB 321 (the master eNB) and notified to the UE 311 (mobile station).

A cell-radio network temporary identifier (C-RNTI) is temporarily allocated to the UE 311 and is a unique identifier of the UE 311 within an LTE-A cell. For example, C-RNTI has a 16-bit value. As in the example depicted in FIG. 30, C-RNTI and the bearer identifiers (0 to n) are added together to generate virtual source IP addresses, whereby the virtual source IP addresses can be prevented from occurring in duplicate. For example, in the case of using class A IP addresses, EPS bearers of about 24 bits can be identified, sufficient for transmission by the WLAN. Although a case has been described herein of adding C-RNTI and bearer identifiers together to generate virtual source IP addresses, the method of generating the virtual source IP addresses is not limited hereto.

The MAC processing unit 3030 converts virtual IP flows transferred from the NAT processing units 3020 to 302n, into MAC frames of Ethernet, IEEE 802.3, etc. In this case, the source MAC addresses (src MAC) of MAC frames may be, for example, any private addresses in the virtual GWs 3010, 3040. For example, the MAC-frame source MAC addresses can be addresses with top octet of "xxxxxx10" (x represents an arbitrary value). Destination MAC addresses (dst MAC) of MAC frames can be MAC addresses (UE MAC) of the UE 311, for example.

The eNB 321 performs the AC classification 1540 for MAC frames converted by the MAC processing unit 3030 and transmits the MAC frames for which the AC classification 1540 has been performed, to the UE 311 via the WLAN 1550.

The UE 311 applies the AC declassification 1560 to the MAC frames received from the eNB 321 via the WLAN 1550. The MAC processing unit 3050 of the virtual GW 3040 receives the MAC frames for which the AC declassification 1560 has been performed, as virtual IP flows.

The de-NAT processing units 3060 to 306n convert the virtual IP flows received by the MAC processing unit 3050 into EPS bearers, by referring to virtual destination IP addresses (dst IP) of the virtual IP flows. At this time, the virtual destination IP addresses of the virtual IP flows are converted into the original IP addresses by de-NAT by the de-NAT processing units 3060 to 306n.

In this manner, by providing the virtual GWs 3010 and 3040 in the eNB 321 and the UE 311, respectively, and by utilizing NAT, the EPS bearers can be identified as virtual IP flows at the virtual GWs 3010, 3040. The IP addresses and the MAC addresses can be in the form of private space addresses. By building a virtual IP network between the virtual GWs 3010 and 3040 in this manner, EPS bearers of the IP packets transferred to the WLAN can be identified. Thus, without configuring the restriction that EPS bearers having the same QoS class are not to be aggregated at the same time, the wireless communications system 300 makes aggregation possible and can facilitate an increase in the amount of user data that can be transferred.

Although the downlink has been described in FIG. 30, a similar method is applicable to the uplink, for the identification of EPS bearers. That is, by building a virtual IP network between the virtual GWs 3010 and 3040 configured in the eNB 321 and UE 311, EPS bearers of IP packets transferred to the WLAN can be identified in the uplink.

Figure 31:
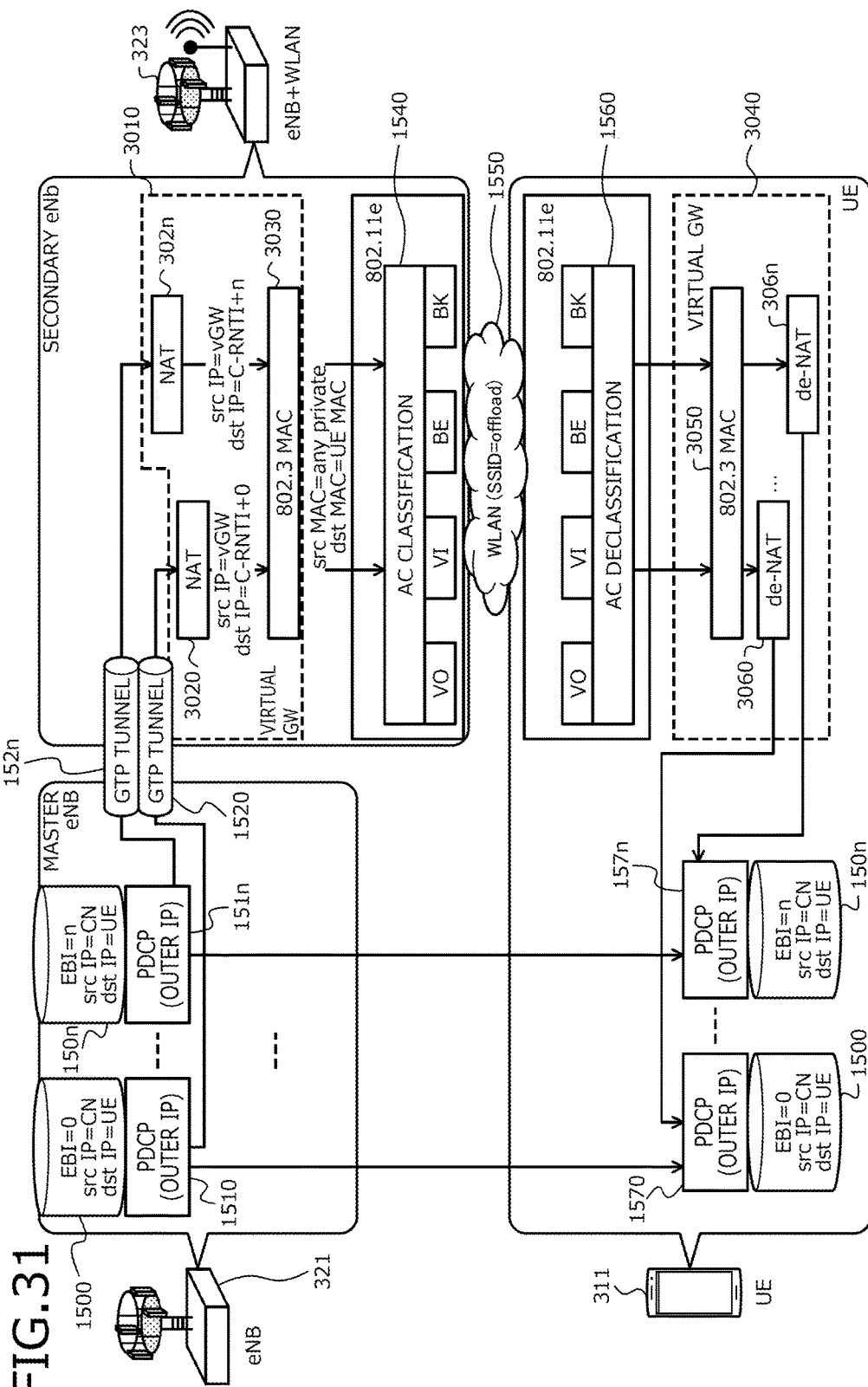
FIG. 31 is a diagram depicting another example of a method of identifying EPS bearers using virtual IP flow in the wireless communications system according to the third embodiment.

FIG. 31 is a diagram depicting another example of a method of identifying EPS bearers using virtual IP flow in the wireless communications system according to the third embodiment. In FIG. 31, parts similar to those depicted in FIG. 15 or 30 are designated by the same reference numerals used in FIGS. 15 and 30 and explanations thereof will be omitted.

In FIG. 31, regarding downlink, a case will be described where aggregation is performed concurrently using LTE-A and a WLAN in the WLAN standalone configuration using the secondary eNB 323 having eNB and WLAN communication functions, with the eNB 321 serving as a master eNB. In this case, the GTP tunnels 1520 to 152n are provided for each of the EPS bearers between the eNB 321 and the secondary eNB 323.

The NAT processing units 3020 to 302n depicted in FIG. 30 are established in the secondary eNB 323 in an example depicted in FIG. 31. The secondary eNB 323 receives IP packets transmitted from the UE 311 via the WLAN 1550. The secondary eNB 323 transfers the received IP packets to the NAT processing units 3020 to 302n of the virtual GW 3010.

Similar to the example depicted in FIG. 30, this enables the EPS bearers to be identified as virtual IP flows in the virtual GWs 3010, 3040. Thus, without configureing the restriction that EPS bearers having the same QoS class are not to be aggregated at the same time, the wireless communications system 300 makes aggregation possible and can facilitate an increase in the amount of user data that can be transferred.

Although the downlink has been described in FIG. 31, a similar method is applicable to the uplink, for identification of EPS bearers. That is, by building a virtual IP network between the virtual GWs 3010 and 3040 configured in the eNB 321 and UE 311, EPS bearers of IP packets transferred to the WLAN can be identified in the uplink.

According to the method using the virtual IP flows depicted in FIGS. 30 and 31, the EPS bearers may be identified without the number of EPS bearers transferrable to the WLAN being restricted by the bit number of the VLAN tag, as in the case of using the VLAN tag, for example. According to the method using the virtual IP flows depicted in FIGS. 30 and 31, connection between the eNB 321 and the secondary eNB 323 is possible by Ethernet, etc. and is not limited to the GTP tunnels.

According to the method using the virtual IP flows depicted in FIGS. 30 and 31, the EPS bearers can be identified without configuring a DL TFT in the UE 311 and without configuring a UL TFT in the eNB 321. According to the method using the virtual IP flows depicted in FIGS. 30 and 31, the EPS bearers can be identified without adding a header such as the VLAN tag to the user data transferred to the WLAN.

Figure 32:
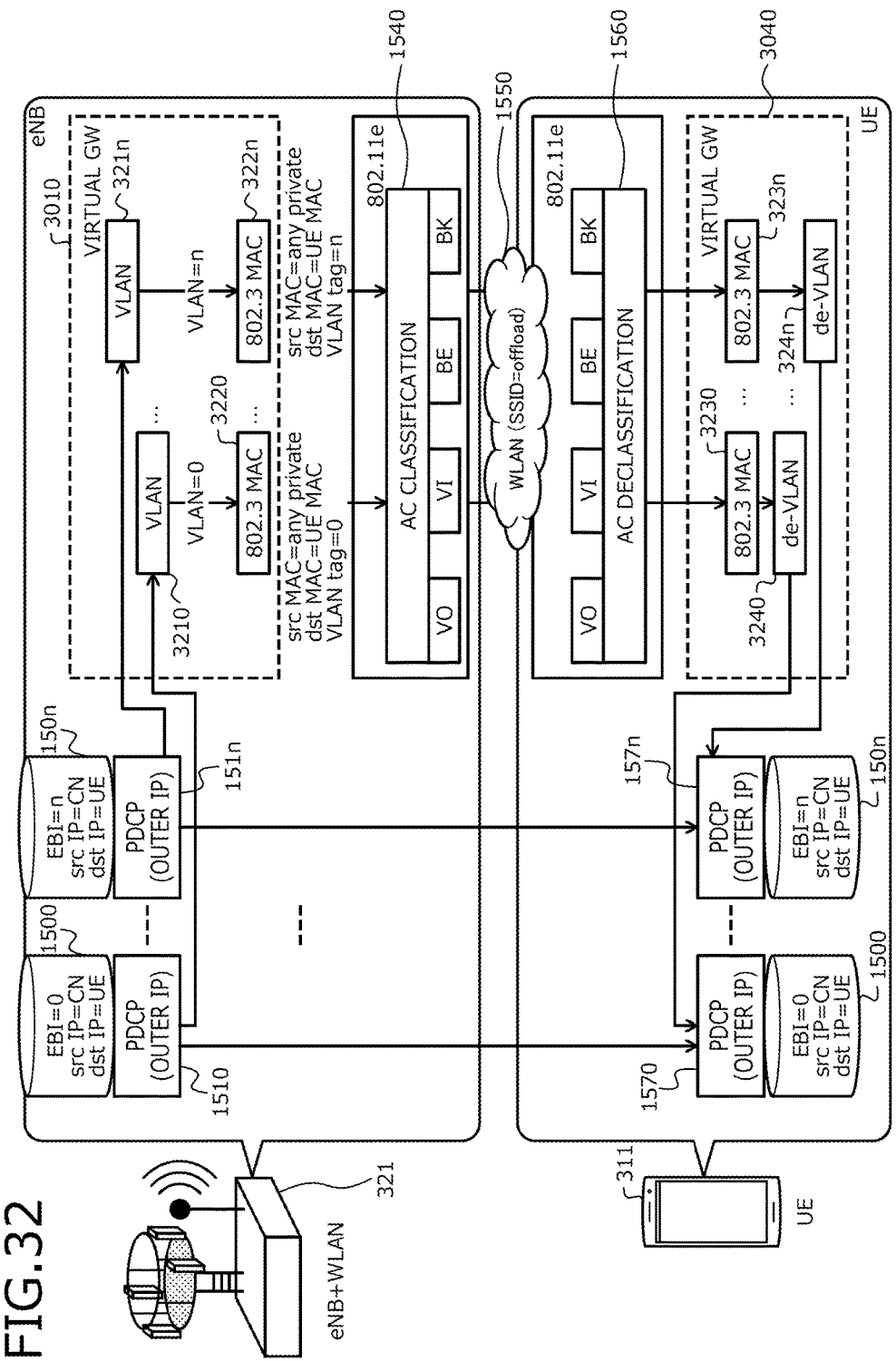
FIG. 32 is a diagram depicting an example of a method of identifying EPS bearers using VLAN in the wireless communications system according to the third embodiment.

FIG. 32 is a diagram depicting an example of a method of identifying EPS bearers using VLAN in the wireless communications system according to the third embodiment. In FIG. 32, parts similar to those depicted in FIG. 15 or 30 are designated by the same reference numerals used in FIGS. 15 and 30 and explanations thereof will be omitted. Although the method of identifying EPS bearers by building the virtual IP network has been described in FIG. 30, a method of identifying EPS bearers by VLAN virtualizing Ethernet will be described in FIG. 32.

In FIG. 32, regarding downlink, a case will be described where aggregation is performed concurrently using LTE-A and a WLAN in a configuration in which the eNB 321 has a WLAN communication function (eNB+WLAN). In this case, the EPS bearers 1500 to 150n are downlink direction bearers from the eNB 321 to the UE 311.

In the example depicted in FIG. 32, similar to the example depicted in FIG. 30, the virtual GWs 3010 and 3040 are established in the eNB 321 and the UE 311, respectively. It is to be noted that in the example depicted in FIG. 32, the virtual GW 3010 of the eNB 321 includes VLAN processing units 3210 to 321n and MAC processing units 3220 to 322n (802.3 MAC). The virtual GW 3040 of the UE 311 includes MAC processing units 3230 to 323n (802.3 MAC) and de-VLAN processing units 3240 to 324n.

The EPS bearers 1500 to 150n passing through the PDCP layers 1510 to 151n are transferred to the VLAN processing units 3210 to 321n of the virtual GW 3010. The VLAN processing units 3210 to 321n classify the EPS bearers 1500 to 150n, respectively, by VLAN into local IP flows between the eNB 321 and the UE 311, and transfer the classified IP flows to the MAC processing units 3220 to 322n.

For example, the VLAN processing units 3210 to 321n perform one-to-one mapping between the EPS bearers 1500 to 150n and the VLAN tags. VLAN identifiers of the IP flows transferred from the VLAN processing units 3210 to 321n can be 0 to n, respectively.

The MAC processing units 3220 to 322n convert the IP flows transferred from the VLAN processing units 3210 to 321n, respectively, into MAC frames of Ethernet, IEEE 802.3, etc. The source MAC addresses (src MAC) of MAC frames converted by the MAC processing units 3220 to 322n can be, for example, any private addresses in the virtual GWs 3010, 3040. For example, the MAC-frame source MAC addresses can be addresses with top octet of "xxxxxx10" (x represents an arbitrary value). The destination MAC addresses (dst MAC) of MAC frames converted by the MAC processing units 3220 to 322n can be MAC addresses (UE MAC) of the UE 311, for example.

The VLAN tags of MAC frames converted by the MAC processing units 3220 to 322n can be, for example, 0 to n corresponding to the respective EPS bearers. In this manner, a VLAN tag for each EPS bearer is applied to each of the MAC frames. The VLAN tag is a 12-bit tag, for example. Thus, a maximum of 4094 VLANs can be built between the virtual GWs 2210 and 3040. Assuming that the UEs including the UE 311 provide all the EPS bearers and that all the EPS bearers are transferred to the WLAN, about 472 UEs can be accommodated in the WLAN. Note that since the actual possibility that communication using all the EPS bearers is low, use of VLAN enables a sufficient number of EPS bearers to be transferred to the WLAN.

The eNB 321 performs the AC classification 1540 for MAC frames with VLAN tags converted by the MAC processing units 3220 to 322n. The eNB 321 transmits the MAC frames with VLAN tags for which the AC classification 1540 has been performed, to the UE 311 via the WLAN 1550.

The UE 311 applies the AC declassification 1560 to the MAC frames with VLAN tags received via the WLAN 1550 from the eNB 321. The MAC processing units 3230 to 323n of the virtual GW 3040 are MAC processing units corresponding to the EPS bearers 1500 to 150n, respectively. Each of the MAC processing units 3230 to 323n refers to the VLAN tag added to the MAC frame for which the AC declassification 1560 has been performed, and thereby receives a MAC frame of a corresponding EPS bearer as an IP flow.

The de-VLAN processing units 3240 to 324n convert the IP flows received by the MAC processing units 3230 to 323n, respectively, into EPS bearers 1500 to 150n. The PDCP layers 1570 to 157n process the EPS bearers 1500 to 150n converted by the de-VLAN processing units 3240 to 324n, respectively.

In this manner, by configuring the VLAN for each of the EPS bearers between the virtual GWs 3010 and 3040, EPS bearers of IP packets transferred to the WLAN can be identified. Thus, without configuring the restriction that EPS bearers having the same QoS class are not to be aggregated at the same time, the wireless communications system 300 makes aggregation possible and can facilitate an increase in the amount of user data that can be transferred.

Although the downlink has been described in FIG. 32, a similar method is applicable to the uplink, for identification of EPS bearers. That is, by configuring the VLAN for each of the EPS bearers between the virtual GWs 3010 and 3040 configured in the eNB 321 and the UE 311, EPS bearers of IP packets transferred to the WLAN can be identified.

Figure 33:
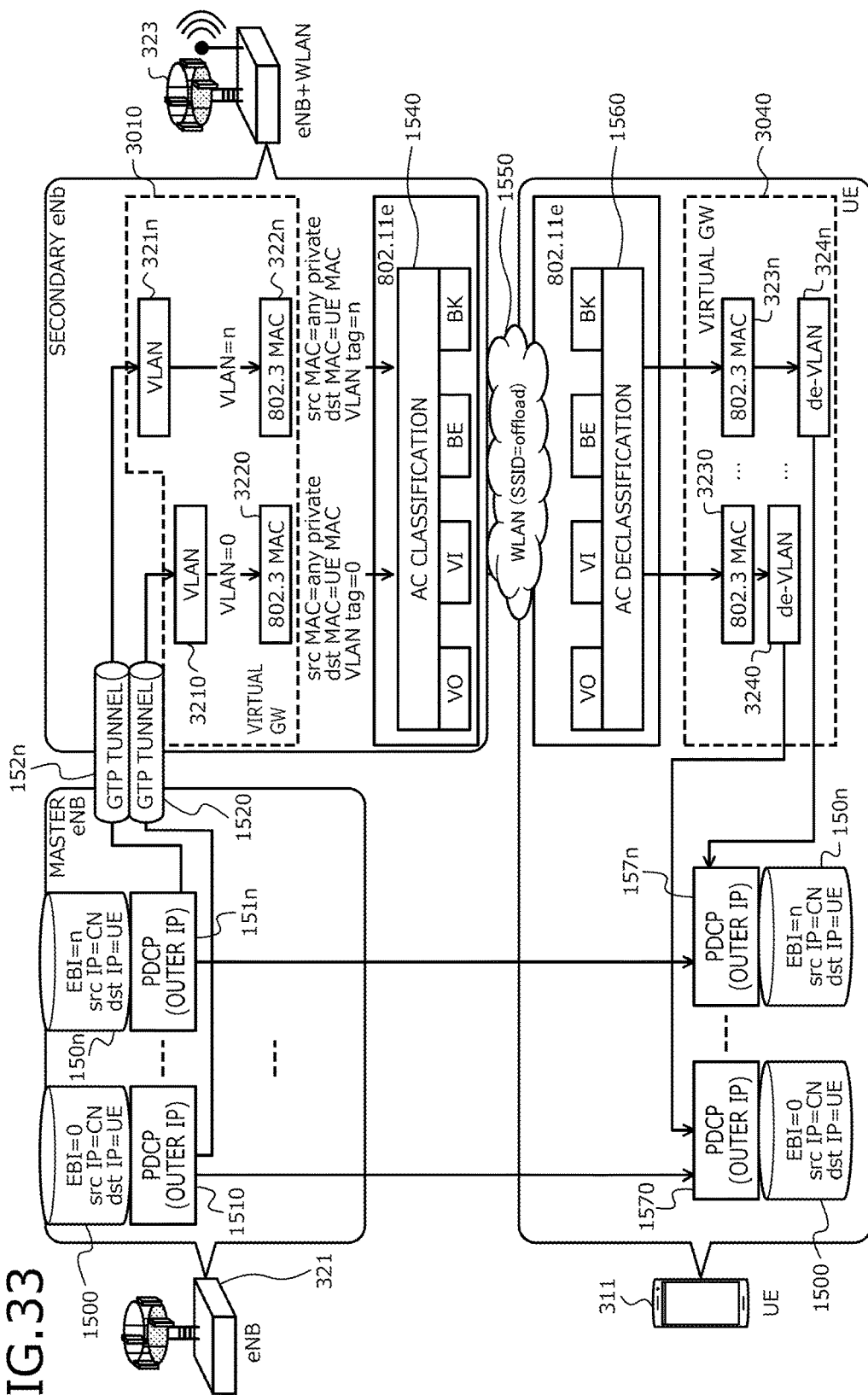
FIG. 33 is a diagram depicting another example of a method of identifying EPS bearers using VLAN in the wireless communications system according to the third embodiment.

FIG. 33 is a diagram depicting another example of a method of identifying EPS bearers using VLAN in the wireless communications system according to the third embodiment. In FIG. 33, parts similar to those depicted in FIG. 15 or 32 are designated by the same reference numerals used in FIGS. 15 and 32 and explanations thereof will be omitted.

In FIG. 33, regarding downlink, a case will be described where aggregation is performed concurrently using LTE-A and a WLAN in the WLAN standalone configuration using the secondary eNB 323 having eNB and WLAN communication functions, with the eNB 321 serving as a master eNB. In this case, the GTP tunnels 1520 to 152n are provided for each of the EPS bearers between the eNB 321 and the secondary eNB 323.

The VLAN processing units 3210 to 321n depicted in FIG. 32 are equipped in the secondary eNB 323 in an example depicted in FIG. 33. The secondary eNB 323 receives IP packets transmitted from the UE 311 via the WLAN 1550. The secondary eNB 323 then transfers the received IP packets to the VLAN processing units 3210 to 321n of the virtual GW 3010.

Similar to the example depicted in FIG. 32, this makes it possible for the EPS bearers to be identified as virtual IP flows in the virtual GWs 3010, 3040. Thus, without configuring the restriction that EPS bearers having the same QoS class are not to be aggregated at the same time, the wireless communications system 300 makes aggregation possible and can facilitate an increase in the amount of user data that can be transferred.

Although the downlink has been described in FIG. 33, a similar method is applicable to the uplink, for identification of EPS bearers. That is, by configuring a VLAN for each EPS bearer between the virtual GWs 3010 and 3040 configured in the eNB 321 and UE 311, EPS bearers of IP packets transferred to the WLAN can be identified.

According to the method using the VLAN depicted in FIGS. 32 and 33, connection between the eNB 321 and the secondary eNB 323 is possible by Ethernet, etc. and is not limited to the GTP tunnels. According to the method using the VLAN depicted in FIGS. 32 and 33, EPS bearers of IP packets can be identified by adding the VLAN tag without packet processing referring to the IP header in WLAN.

According to the method using the VLAN depicted in FIGS. 32 and 33, EPS bearers can be identified without configuring the DL TFT in the UE 311 and without configuring the UL TFT in the eNB 321.

Figure 34:
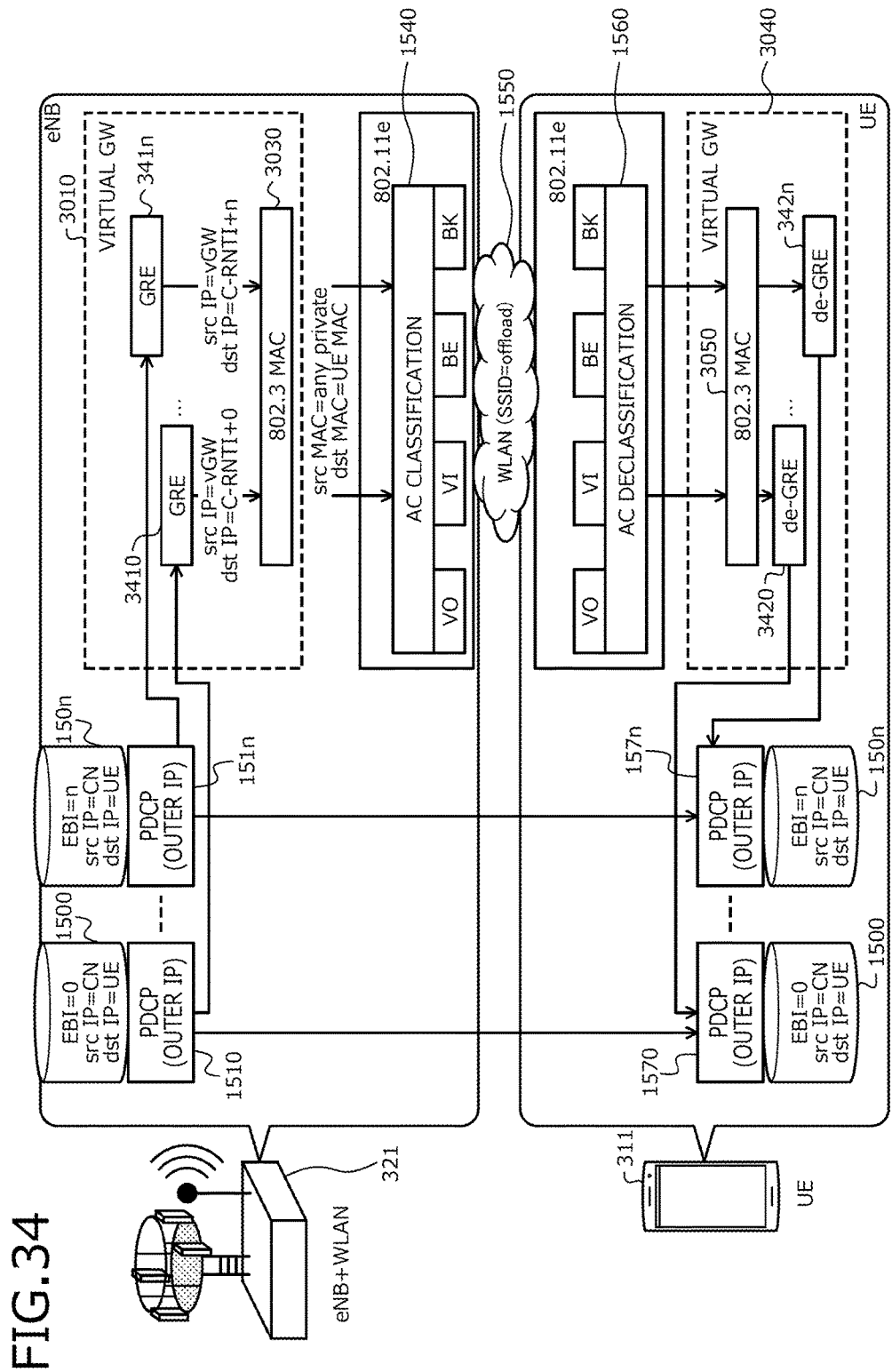
FIG. 34 is a diagram depicting an example of a method of identifying EPS bearers using GRE tunneling in the wireless communications system according to the third embodiment.

FIG. 34 is a diagram depicting an example of a method of identifying EPS bearers using GRE tunneling in the wireless communications system according to the third embodiment. In FIG. 34, parts similar to those depicted in FIG. 15 or 30 are designated by the same reference numerals used in FIGS. 15 and 30 and explanations thereof will be omitted.

In FIG. 34, regarding downlink, a case will be described where aggregation is performed concurrently using LTE-A and a WLAN in a configuration in which the eNB 321 has a WLAN communication function (eNB+WLAN). In the example depicted in FIG. 34, the EPS bearers 1500 to 150n are downlink direction bearers from the eNB 321 to the UE 311.

In the example depicted in FIG. 34, the virtual GW 3010 is provided between the PDCP layers 1510 to 151n and the WLAN 1550 in the eNB 321. The virtual GW 3010 includes GRE processing units 3410 to 341n and the MAC processing unit 3030 (802.3 MAC). The virtual GW 3040 is provided between the WLAN 1550 and the PDCP layers 1570 to 157n in the UE 311. The virtual GW 3040 includes the MAC processing unit 3050 (802.3 MAC) and de-GRE processing units 3420 to 342n.

The EPS bearers 1500 to 150n passing through the PDCP layers 1510 to 151n are transferred to the GRE processing units 3410 to 341n of the virtual GW 3010. The GRE processing units 3410 to 341n classify each of the EPS bearers 1500 to 150n, respectively, by applying generic routing encapsulation (GRE) tunneling to local IP flows between the eNB 321 and the UE 311, and transfer the classified IP flows to the MAC processing unit 3030.

For example, the GRE processing units 3410 to 341n add GRE headers and then IP headers to IP packets corresponding to the EPS bearers 1500 to 150n and transfer the IP packets as IP flows to the MAC processing unit 3030. The source IP addresses (src IP) of the IP flows transferred from the GRE processing units 3410 to 341n can be the virtual GW (vGW) 3010, for example. The destination IP addresses (dst IP) of the IP flows transferred from the GRE processing units 3410 to 341n can be for example C-RNTI+0 to C-RNTI+n, respectively.

Similar to the example depicted in FIG. 30 for example, the MAC processing unit 3030 converts the IP flows transferred from the GRE processing units 3410 to 341n, into MAC frames of Ethernet (IEEE 802.3).

The eNB 321 applies the AC classification 1540 to the MAC frames converted by the MAC processing unit 3030 and transmits the MAC frames for which the AC classification 1540 has been performed, to the UE 311 via the WLAN 1550. As a result, the eNB 321 can transmit user data through a GRE tunnel (encapsulated tunnel) of the WLAN provided between the eNB 321 and the UE 311.

The UE 311 applies the AC declassification 1560 to the MAC frames received from the eNB 321, via the WLAN 1550. Similar to the example depicted in FIG. 30 for example, the MAC processing unit 3050 of the virtual GW 3040 receives, as IP flows, the MAC frames for which the AC declassification 1560 has been performed.

The de-GRE processing units 3420 to 342n refer to destination IP addresses (dst IP) included in IP headers of the IP flows received by the MAC processing unit 3050 and thereby convert the IP flows into EPS bearers.

In this manner, by configuring the virtual GWs 3010 and 3040 in the eNB 321 and the UE 311, respectively, and by utilizing the GRE tunneling, the EPS bearers can be identified as IP flows at the virtual GWs 3010, 3040. The IP addresses and the MAC addresses can be in the form of private space addresses. By building the GRE tunnel between the virtual GWs 3010 and 3040 in this manner, EPS bearers of the IP packets transferred to the WLAN can be identified. Thus, without configuring the restriction that EPS bearers having the same QoS class are not to be aggregated at the same time, the wireless communications system 300 makes aggregation possible and can facilitate an increase in the amount of user data that can be transferred.

Although the downlink has been described in FIG. 34, a similar method is applicable to the uplink, for identification of EPS bearers. That is, by building the GRE tunnel between the virtual GWs 3010 and 3040, EPS bearers of IP packets transferred to the WLAN can be identified.

Figure 35:
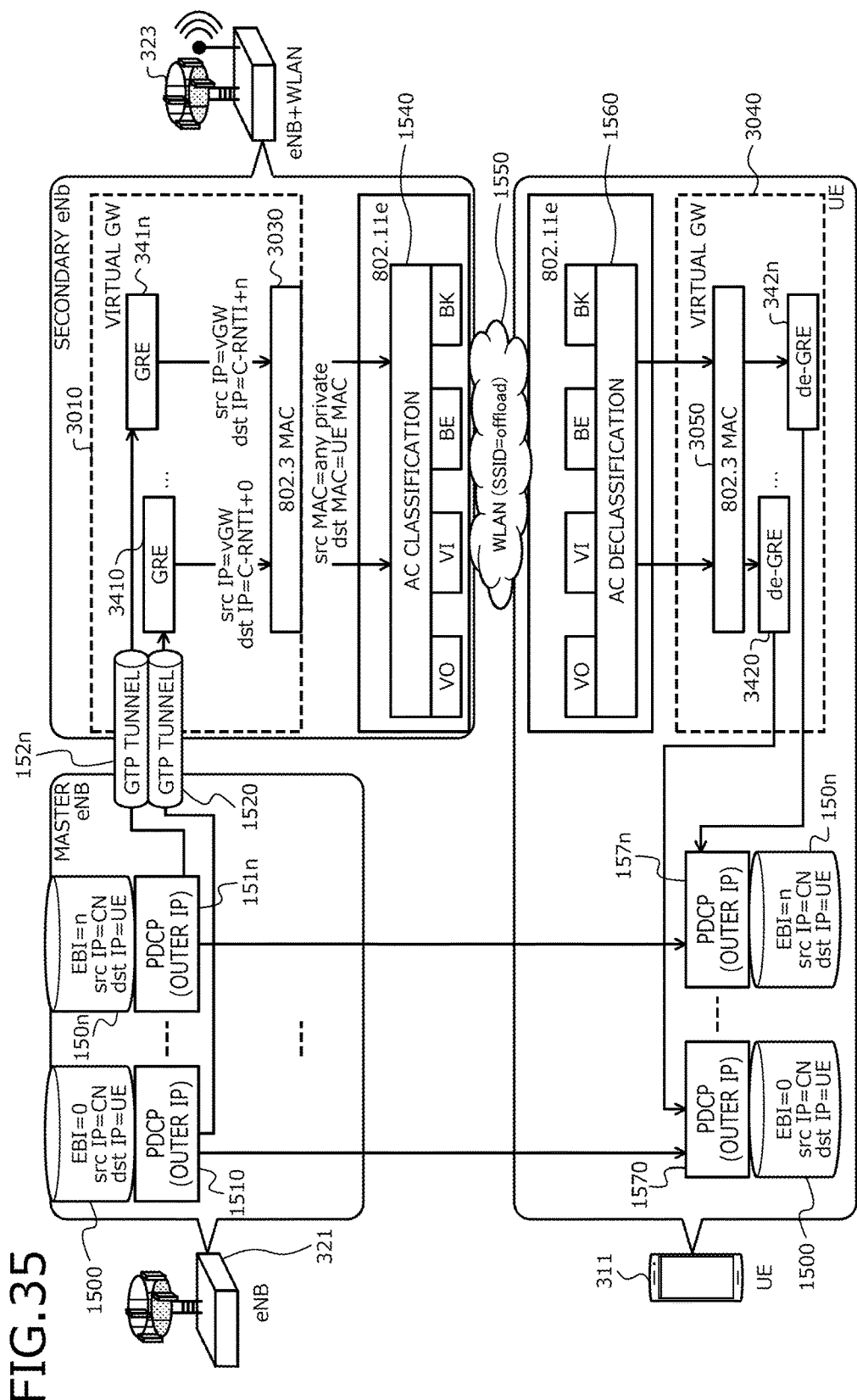
FIG. 35 is a diagram depicting another example of a method of identifying EPS bearers using GRE tunneling in the wireless communications system according to the third embodiment.

FIG. 35 is a diagram depicting another example of a method of identifying EPS bearers using GRE tunneling in the wireless communications system according to the third embodiment. In FIG. 35, parts similar to those depicted in FIG. 15 or 34 are designated by the same reference numerals used in FIGS. 15 and 34 and explanations thereof will be omitted.

In FIG. 35, regarding downlink, a case will be described where aggregation is performed concurrently using LTE-A and a WLAN in the WLAN standalone configuration using the secondary eNB 323 having eNB and WLAN communication functions, with the eNB 321 serving as a master eNB. In this case, the GTP tunnels 1520 to 152$n$ are provided for each of the EPS bearers between the eNB 321 and the secondary eNB 323.

The secondary eNB 323 receives IP packets transmitted from the UE 311 via the WLAN 1550. The secondary eNB 323 transfers the received IP packets to the GRE processing units 3410 to 341$n$.

As a result, similar to the example depicted in FIG. 34, the UE 311 can identify EPS bearers of the IP packets transferred to the WLAN by utilizing the GRE tunneling. Thus, without configuring the restriction that EPS bearers having the same QoS class are not to be aggregated at the same time, the wireless communications system 300 makes aggregation possible and can facilitate an increase in the amount of user data that can be transferred.

According to the method using the GRE tunneling depicted in FIGS. 34 and 35, the EPS bearers can be identified without the number of EPS bearers for transfer being restricted by the bit number of the VLAN tag, as in the case of using the VLAN tag, for example. According to the method using the GRE tunneling depicted in FIGS. 34 and 35, connection between the eNB 321 and the secondary eNB 323 is possible by Ethernet, etc. and is not limited to the GTP tunnels.

According to the method using GRE tunneling depicted in FIGS. 34 and 35, the EPS bearers can be identified without configuring a DL TFT in the UE 311 and without configuring a UL TFT in the eNB 321. According to the method using GRE tunneling depicted in FIGS. 34 and 35, the EPS bearers can be identified without adding a header such as the VLAN tag to the user data transferred to the WLAN.

Figure 36:
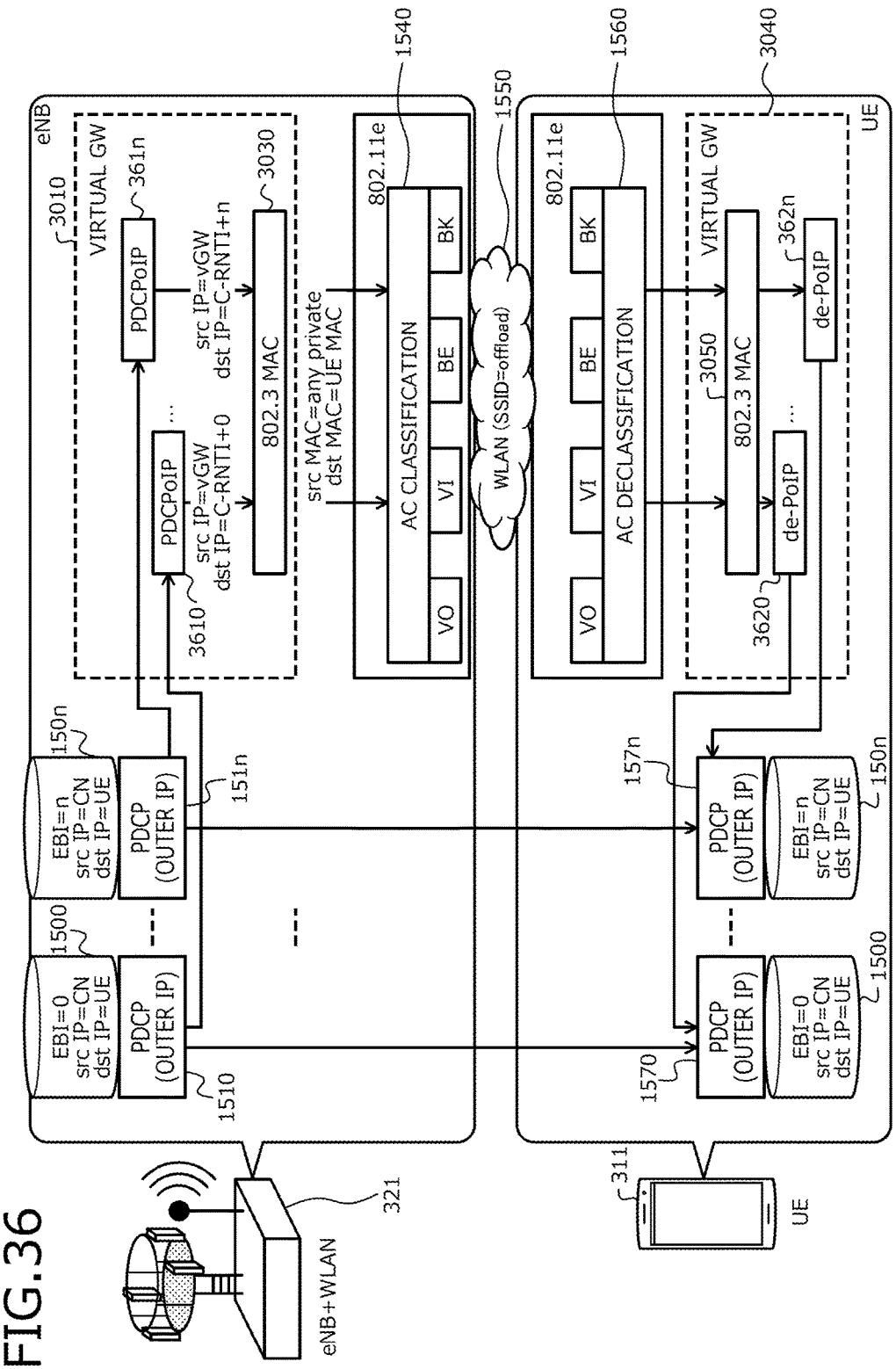
FIG. 36 is a diagram depicting an example of a method of identifying an EPS bearer by using PDCPoIP in the wireless communications system according to the third embodiment.

FIG. 36 is a diagram depicting an example of a method of identifying an EPS bearer by using PDCPoIP in the wireless communications system according to the third embodiment. In FIG. 36, parts identical to those depicted in FIG. 15 or FIG. 30 are designated by the same reference numerals used in FIG. 15 and FIG. 30 and explanations thereof will be omitted.

In FIG. 36, regarding downlink, a case will be described in which the eNB 321 is configured to have a WLAN communications function (eNB+WLAN) and performs aggregation using LTE-A and WLAN concurrently. In the example depicted in FIG. 36, the EPS bearers 1500 to 150$n$ are downlink direction bearers from the eNB 321 to the UE 311.

In the example depicted in FIG. 36, the virtual GW 3010 is configured between the WLAN 1550 and the PDCP layers 1510 to 151$n$ in the eNB 321. The virtual GW 3010 includes PDCPoIP processing units 3610 to 361$n$ and the MAC processing unit 3030 (802.3 MAC). Further, the virtual GW 3040 is configured between the PDCP layers 1570 to 157$n$ and the WLAN 1550 in the UE 311. The virtual GW 3040 includes the MAC processing unit 3050 (802.3 MAC) and de-PDCPoIP processing units 3620 to 362$n$ (de-PoIP).

The EPS bearers 1500 to 150$n$ passing through the PDCP layers 1510 to 151$n$ are transferred to the PDCPoIP processing units 3610 to 361$n$ of the virtual GW 3010. The PDCPoIP processing units 3610 to 361$n$ each converts the outer IP header addresses of the EPS bearers 1500 to 150$n$ into a virtual IP address and thereby performs a PDCPoIP (Packet Data Convergence Protocol on IP) process of classification into virtual IP flows. A virtual IP flow, for example, is local virtual data flow between the eNB 321 and the UE 311. A virtual destination IP address is a destination address of a virtual IP flow. The PDCPoIP processing units 3610 to 361$n$ transfer the classified virtual IP flows to the MAC processing unit 3030.

For example, the PDCPoIP processing units 3610 to 361$n$ map the EPS bearers 1500 to 150$n$ and the virtual destination IP addresses on a one-to-one basis. The virtual source IP addresses (src IPs) of the virtual IP flows transferred from the PDCPoIP processing units 3610 to 361$n$, for example, can be that of the virtual GW 3010 (vGW). Further, the virtual destination IP addresses (dst IP) of the virtual IP flows transferred from the PDCPoIP processing units 3610 to 361$n$, for example, can be C-RNTI+0~C-RNTI+n, respectively.

C-RNTI is a unique identifier of the UE 311 in the LTE-A cell and is temporarily allocated to the UE 311. For example, C-RNTI has a 16-bit value. As depicted in the example in FIG. 36, C-RNTI and bearer identifiers (0 to n) are added to generate virtual source IP addresses whereby generation of overlapping virtual source IP addresses can be avoided. For example, when a class A IP address is used, EPS bearers for about 24 bits sufficient for transmission by WLAN can be identified. Here, although a case is described in which C-RNTI and a bearer identifier are added to generate a virtual source IP address, the method of generating the virtual source IP address is not limited hereto.

The MAC processing unit 3030 converts the virtual IP flows transferred from the PDCPoIP processing units 3610 to 361$n$ into MAC frames for Ethernet, IEEE 802.3, etc. In this case, the source MAC address (src MAC) of the MAC frame, for example, can be an arbitrary address (any private address) in the virtual GWs 3010, 3040. For example, the source MAC address of the MAC frame can be an address starting with an octet of "xxxxxx10" (x is an arbitrary value). Further, a destination MAC address (dst MAC) of the MAC frame, for example, can be the MAC address (UE MAC) of the UE 311.

The eNB 321 performs the AC classification 1540 for the MAC frames converted by the MAC processing unit 3030 and transmits the MAC frames for which the AC classification 1540 was performed to the UE 311, via the WLAN 1550.

The UE 311 performs the AC declassification 1560 for the MAC frames received from the eNB 321, via the WLAN 1550. The MAC processing unit 3050 of the virtual GW 3040 receives, as virtual IP flows, the MAC frames for which the AC declassification 1560 was performed.

For the virtual IP flows received by the MAC processing unit 3050, the de-PDCPoIP processing units 3620 to 362*n* convert the virtual IP flow in EPS bearers by referring to the virtual destination IP addresses (dst IP) of the virtual IP flows. At this time, virtual destination IP addresses of the virtual IP flows are converted into the original IP addresses by de-PDCPoIP by the de-PDCPoIP processing units 3620 to 362*n*.

In this manner, by providing the virtual GWs 3010 and 3040 in the eNB 321 and the UE 3111, respectively, and by utilizing the address conversion by PDCPoIP, the EPS bearers can be identified as virtual IP flows at the virtual GWs 3010, 3040. The IP addresses and the MAC addresses can be in the form of private space addresses. By building the a virtual IP network between the virtual GWs 3010 and 3040 in this manner, EPS bearers of the IP packets transferred to the WLAN can be identified. Thus, without configuring the restriction that EPS bearers having the same QoS class are not to be aggregated at the same time, the wireless communications system 300 makes aggregation possible and can facilitate an increase in the amount of user data that can be transferred.

Although the downlink has been described in FIG. 36, a similar method is applicable to the uplink, for identification of EPS bearers. That is, by building a virtual IP network between the virtual GWs 3010 and 3040 configured in the eNB 321 and UE 311, EPS bearers of IP packets transferred to the WLAN can be identified in the uplink.

Figure 37:
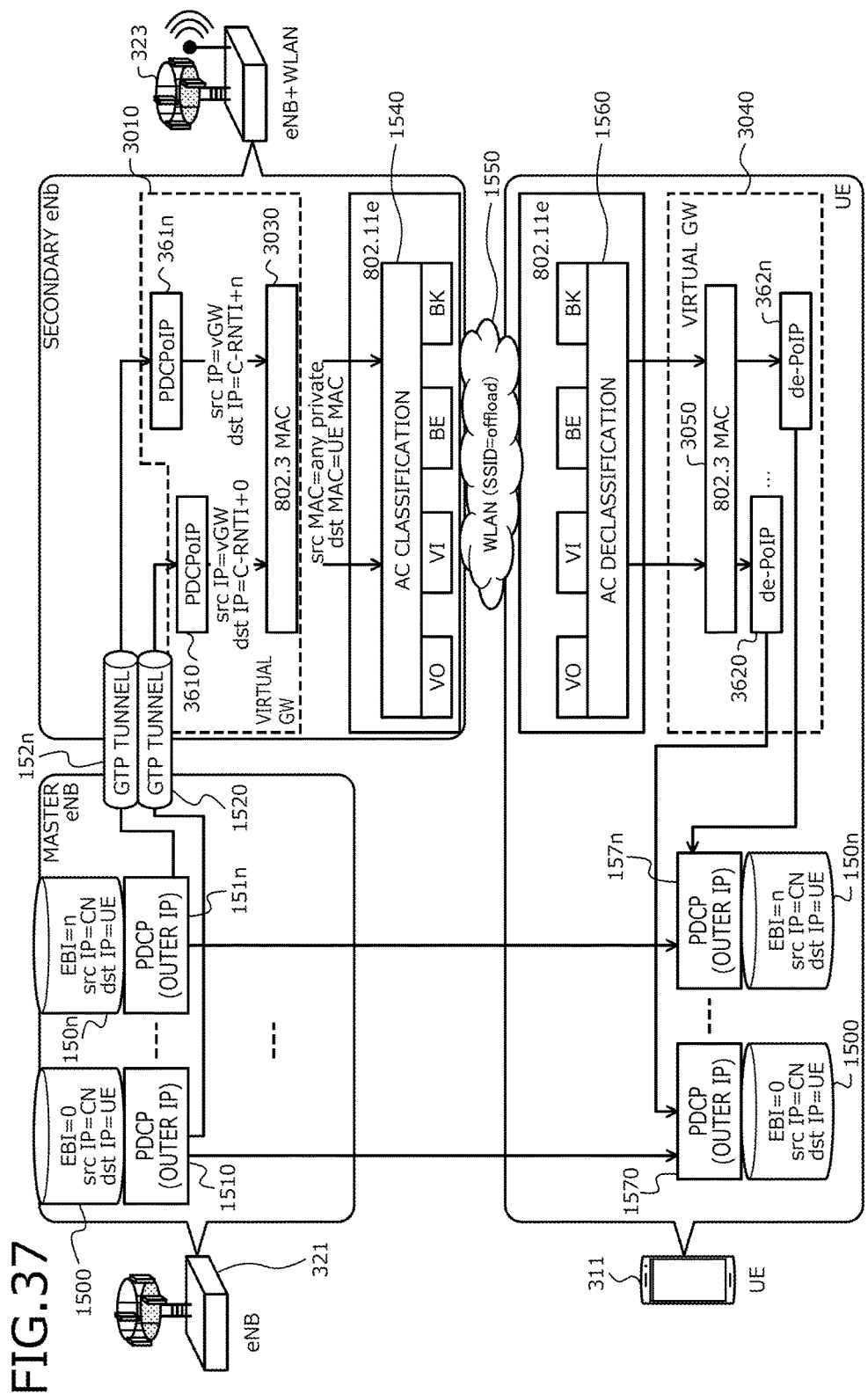
FIG. 37 is a diagram depicting another example of a method of identifying EPS bearers using PDCPoIP in the wireless communications system according to the third embodiment.

FIG. 37 is a diagram depicting another example of a method of identifying EPS bearers using PDCPoIP in the wireless communications system according to the third embodiment. In FIG. 37, parts identical to those depicted in FIG. 15 or FIG. 36 are designated by the same reference numerals used in FIGS. 15 and 36 and explanations thereof will be omitted.

In FIG. 37, regarding downlink, a case will be described in which aggregation is performed concurrently using LTE-A and a WLAN in the WLAN standalone configuration using the secondary eNB 323 having eNB and WLAN communication functions, with the eNB 321 serving as a master eNB. In this case, the GTP tunnels 1520 to 152*n* are provided for each of the EPS bearers between the eNB 321 and the secondary eNB 323.

The PDCPoIP processing units 3610 to 361*n* depicted in FIG. 3 are established in the secondary eNB 323 in an example depicted in FIG. 37. The secondary eNB 323 receives IP packets transmitted from the UE 311 via the WLAN 1550. The secondary eNB 323 transfer the received IP packets to the PDCPoIP processing units 3610 to 361*n* of the virtual GW 3010.

Similar to the example depicted in FIG. 36, this enables the EPS bearers to be identified as virtual IP flows in the virtual GWs 3010, 3040. Thus, without configuring the restriction that EPS bearers having the same QoS class are not to be aggregated at the same time, the wireless communications system 300 makes aggregation possible and can facilitate an increase in the amount of user data that can be transferred.

Although the downlink has been described in FIG. 37, a similar method is applicable to the uplink, for identification of EPS bearers. That is, by building a virtual IP network between the virtual GWs 3010 and 3040 configured in the eNB 321 and UE 311, EPS bearers of IP packets transferred to the WLAN can be identified in the uplink.

According to the method using the address conversion by PDCPoIP depicted in FIGS. 36 and 37, the EPS bearers may be identified without the number of EPS bearers transferrable to the WLAN being restricted by the bit number of the VLAN tag, as in the case of using the VLAN tag, for example. According to the method using the address conversion by PDCPoIP depicted in FIGS. 36 and 37, connection between the eNB 321 and the secondary eNB 323 is possible by Ethernet, etc. and is not limited to the GTP tunnels.

According to the method using the address conversion by PDCPoIP depicted in FIGS. 36 and 37, the EPS bearers can be identified without configuring a DL TFT in the UE 311 and without configuring a UL TFT in the eNB 321. According to the method using the address conversion by PDCPoIP depicted in FIGS. 36 and 37, the EPS bearers can be identified without adding a header such as the VLAN tag to the user data transferred to the WLAN.

In this manner, according to the third embodiment, aggregation concurrently using LTE-A and a WLAN becomes possible without configuring the restriction that EPS bearers having the same QoS class are not to be aggregated at the same time. Therefore, an increase in the amount of user data that can be transferred can be facilitated.

However, in the downlink from the eNB 321 to the UE 311, user data received as radio bearers by the UE 311 may be forwarded to an upper layer (e.g., application layer) without conversion to bearers. In such a case, even though plural EPS bearers have the same QoS class, aggregation concurrently using LTE-A and a WLAN can be performed without the UE 311 identifying the bearers.

Figure 38:
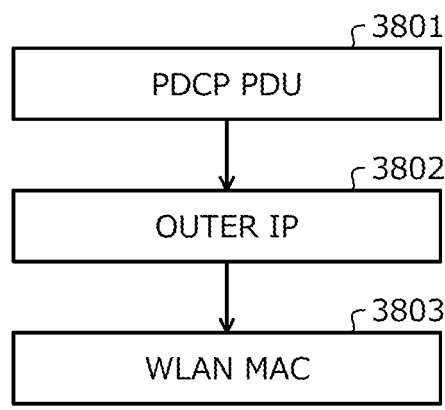
FIG. 38 is a diagram (part 1) describing processing for data transmitted by a WLAN in the wireless communications system according to a fourth embodiment.
Figure 39:
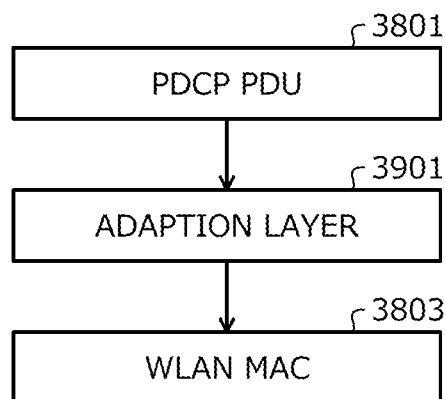
FIG. 39 is a diagram (part 2) describing processing for data transmitted by a WLAN in the wireless communications system according to the fourth embodiment.

FIGS. 38 and 39 are diagrams describing processing for data transmitted by a WLAN in the wireless communications system according to a fourth embodiment. A protocol stack depicted in FIG. 38, as in the second and third embodiments, depicts processing performed in the order of a PDCP layer 3801 (PDCP PDU), an outer IP layer 3802, and a WLAN MAC layer 3803 (WLAN MAC) with respect to the data transmitted by the WLAN.

In the embodiments described above, although the wording "outer IP" is used for the sake of convenience, the outer IP is technically, simply, IP (Internet Protocol), and similarly in the present embodiment.

The PDCP layer 3801 corresponds to, for example, the PDCP layer in the aggregation processing 1212 depicted in FIG. 12, the PDCP layer 1901 depicted in FIGS. 19 to 24, etc. The outer IP layer 3802 corresponds to, for example, the outer IP processing in the aggregation processing 1212 depicted in FIG. 12, the outer IP layer 1900 depicted in FIGS. 19 to 24, etc. The MAC layer 3803 corresponds to, for example, .11x MAC processing in the aggregation processing 1212 depicted in FIG. 12.

In the protocol stack depicted in FIG. 38, the MAC address of the destination of the data can be obtained from the IP address of the destination of the data by, for example, an Address Resolution Protocol (ARP) under IP when data is transmitted by the WLAN, by using the outer IP layer 3802. ARP, for example, is ARP defined by RFC826. In this case, a WLAN node (e.g., the eNB 321, the secondary eNB 323), for example, can operate by a mode like a router.

A protocol stack depicted in FIG. 39 depicts processing for data transmitted by a WLAN in the wireless communications system 300 according to the fourth embodiment. Like the protocol stack depicted in FIG. 39, in the wireless communications system 300 according to the fourth embodiment, processing of the PDCP layer 3801, processing of an adaption layer 3901 (Adaptation Layer), and processing of the WLAN MAC layer 3803 are performed for the data transmitted by the WLAN. In the processing depicted in FIG. 39, after the processing of the PDCP layer 3801, the adaption layer 3901 adds a predetermined header to packets transmitted by the WLAN and transfers the packets to the WLAN whereby the packets are transmitted by tunneling.

In this manner, configuration may be such that the processing of the adaption layer 3901 is performed for the data transmitted by the WLAN, instead of the processing of the outer IP layer 3802. Such processing as depicted in FIG. 39, for example, may be effective depending on LTE-WLAN architecture requirements and problems in the transmission of IP packets in the WLAN.

However, in the processing depicted in FIG. 39, the MAC address cannot be obtained from the IP address by using the ARP in IP. In contrast, for example, by providing processing of the ARP based on RFC826 in the adaption layer 3901, the MAC address can be obtained from the IP address by using the ARP in the adaption layer 3901. In this case, a WLAN node (e.g., the eNB 321, the secondary eNB 323), for example, operates by a mode like a bridge.

For example, in the ARP based on RFC826, an upper layer of the ARP is specified by "EtherType" of Ethernet. In the current 3GPP protocols, "EtherType" is not defined; however, in 3GPP protocols, in a case where a new "EtherType" is specified, ARP based on RFC826 can be applied to the adaption layer 3901.

However, it is conceivable that ARP based on RFC826 may be difficult to apply to the adaption layer 3901. In contrast, a method of independent address resolution may be used and not application of a RFC826-based ARP to the adaption layer 3901. In this case, a WLAN node (e.g., the eNB 321, the secondary eNB 323), for example, operates by a mode like a bridge. Hereinafter, architecture of this method of independent address resolution will be described.

Figure 40:
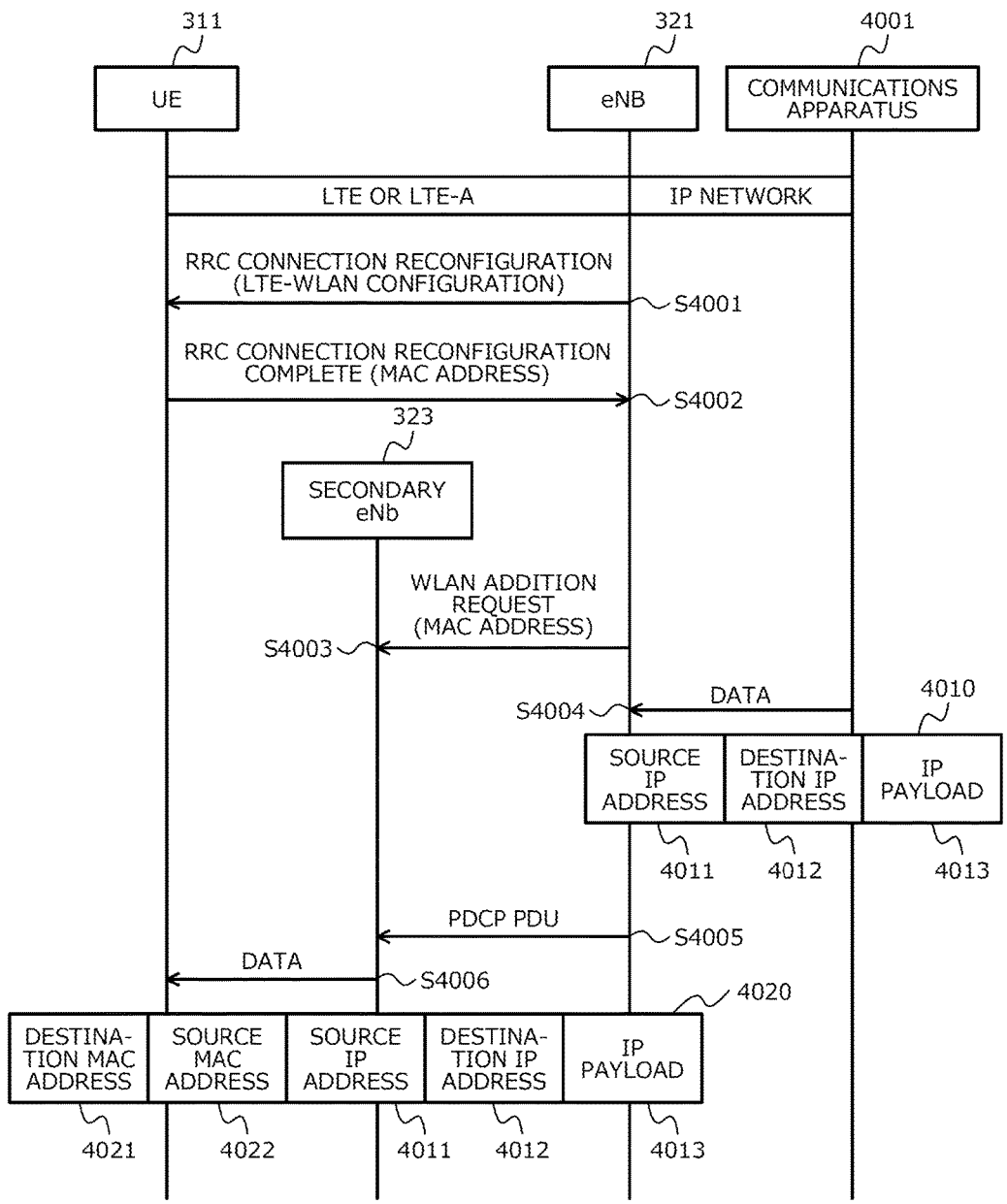
FIG. 40 is a sequence diagram depicting an example of processing in the wireless communications system according to the fourth embodiment.

FIG. 40 is a sequence diagram depicting an example of processing in the wireless communications system according to the fourth embodiment FIG. 21 is a diagram depicting another example of implementation of the outer IP layer using a 3GPP protocol in the second embodiment. In the wireless communications system 300 according to the fourth embodiment, for example, address resolution is implemented by an execution of the steps depicted in FIG. 40. A communications apparatus 4001 depicted in FIG. 40 is a source that transmits data to the UE 311, via the eNB 321. For example, the communications apparatus 4001 is the PGW 332, etc. of the packet core network 330.

In FIG. 40, data transmitted from the communications apparatus 4001 to the UE 311 via a WLAN is described. In this case, a transmission path between the communications apparatus 4001 and the eNB 321 is an IP network and a transmission path between the eNB 321 and the UE 311 is LTE-A. Further, in the example depicted in FIG. 40, a WLAN standalone configuration using the secondary eNB 323 having eNB and WLAN communication functions and in which the eNB 321 acts as a master eNB will be described.

First, the eNB 321 transmits to the UE 311, RRC connection reconfiguration that includes LTE-WLAN configuration for configuring LTE-WLAN aggregation (step S4001). Next, the UE 311 transmits to the eNB 321, RRC connection reconfiguration complete for the RRC connection reconfiguration (step S4002). Further, the UE 311 stores the MAC address of the UE 311 to the RRC connection reconfiguration complete transmitted at step S4002.

Next, the eNB 321 transmits to the secondary eNB 323 that is a WLAN node, WLAN addition request for WLAN configuration in the LTE-WLAN aggregation (step S4003). Further, the eNB 321 stores to the WLAN addition request transmitted at step S4003, configuration information that includes the MAC address of the UE 311 acquired from the RRC connection reconfiguration complete received at step S4002.

In response, the secondary eNB 323 associates and stores the MAC address of the UE 311 acquired from the WLAN addition request from the eNB 321, with the IP address of the UE 311.

Next, the communications apparatus 4001 is assumed to transmit to the eNB 321, data destined for the UE 311 (step S4004). Data 4010 is the data transmitted at step S4004. The data 4010 includes a source IP address 4011, a destination IP address 4012, and IP payload 4013. The source IP address 4011 is the IP address of the communications apparatus 4001 that is the source of the data 4010. The destination IP address 4012 is the IP address of the UE 311 that is destination of the data 4010. The IP payload 4013 is the payload (e.g., user data) of the data 4010. In actuality, since the IP packet is transmitted by a GTP tunnel, a GTP is added; however, description is omitted herein.

Next, the eNB 321 converts the data received at step S4004 into PDCP PDUs and transfers the PDCP PDUs to the secondary eNB 323 (step S4005). Next, the secondary eNB 323 transmits by the WLAN (IEEE MAC) to the UE 311, the data transmitted and converted to the PDCP PDUs at step S4005 (step S4006). Data 4020 is the data transmitted at step S4006.

The data 4020 is data to which a destination MAC address 4021 and a source MAC address 4022 are added as a header to the source IP address 4011, the destination IP address 4012 and the IP payload 4013 of the data 4010. The PDCP PDUs are included in the IP payload. The destination MAC address 4021 is the MAC address of the UE 311 stored by the secondary eNB 323 at step S4003. The source MAC address 4022 is the MAC address of the secondary eNB that is the source of the data 4020.

As depicted in FIG. 40, in the LTE-WLAN aggregation, when the eNB 321 transmits the RRC connection reconfiguration to the UE 311, the UE 311 stores the MAC address of the UE 311 to the response signal. As a result, the eNB 321 and the secondary eNB 323 become capable of acquiring the MAC address of the UE 311 without using ARP of IP. In this manner, for example, resolution of the MAC address can be performed using a RRC message.

Although configuration of a WLAN standalone configuration using the secondary eNB 323 having the eNB and WLAN communication functions, with the eNB 321 serving as a master eNB has been described, configuration may be such that the eNB 321 has the WLAN communication function and the secondary eNB 323 is not used. In this case, for example, step S4003 becomes unnecessary and the eNB 321 associates and stores the MAC address of the UE 311 with the IP address of the UE 311.

The eNB 321 transmits to the UE 311, the data 4020 that is obtained by adding the destination MAC address 4021 and the source MAC address 4022 to the data 4010 received from the communications apparatus 4001. The source MAC address 4022 in this case is the MAC address of the eNB 321, which is the source of the data 4020.

Further, although downlink data transmitted from the communications apparatus 4001 to the UE 311 has been described, similarly for uplink data from the UE 311 to the communications apparatus 4001, the resolution of the MAC address can be performed using a RRC message. For example, the eNB 321 stores to the RRC connection reconfiguration transmitted by the communications apparatus 4001, the MAC address of the secondary eNB 323. The MAC address of the secondary eNB 323 may be stored by the eNB 321 when the eNB 321 and the secondary eNB 323 connect with each other, or may be acquired by the eNB 321 as a result of the eNB 321 making an inquiry to the secondary eNB 323.

The UE 311 associates and stores the MAC address of the secondary eNB 323 acquired from the RRC connection reconfiguration from the eNB 321 with the IP address of the secondary eNB 323. The UE 311, when transmitting data destined for the communications apparatus 4001 by the WLAN, uses the stored MAC address of the secondary eNB 323 as the destination and transmits the data to the secondary eNB 323. In this manner, for uplink data from the UE 311 to the communications apparatus 4001, the resolution of the MAC address can be performed using a RRC message.

Figure 41:
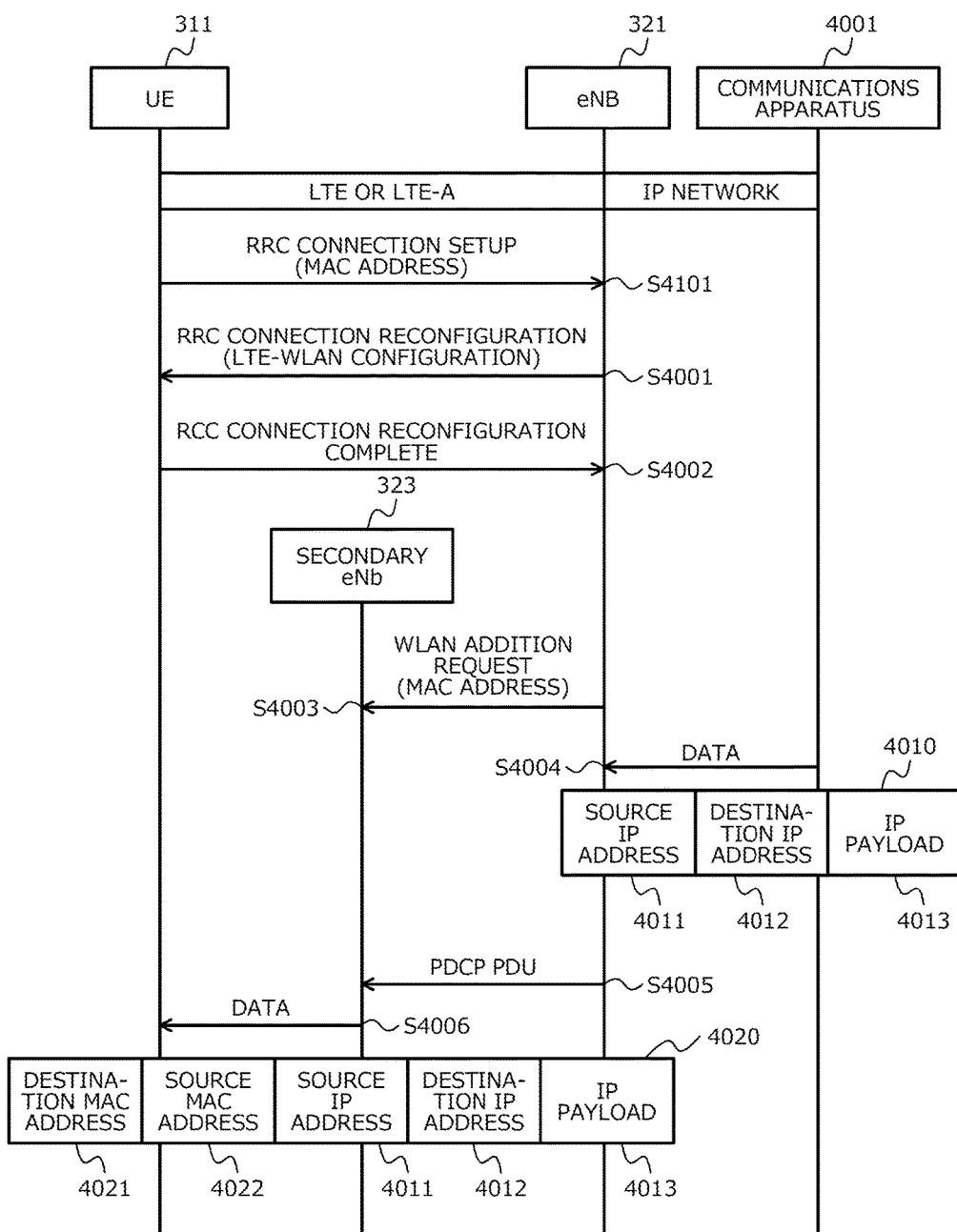
FIG. 41 is a sequence diagram of notification of the MAC address by a different RRC message in processing in the wireless communications system according to the fourth embodiment.

FIG. 41 is a sequence diagram of notification of the MAC address by a different RRC message in the processing in the wireless communications system according to the fourth embodiment. In FIG. 41, parts identical to those depicted in FIG. 40 are designated by the same reference numerals used in FIG. 40 and will not again be described. In a RRC connection establishment procedure, prior to step S4001, the UE 311 transmits a RRC connection setup to the eNB 321 (step S4101). Further, the UE 311 stores the MAC address of the UE 311 to the RRC connection setup transmitted at step S4101. In this case, the UE 311 may store the MAC address of the UE 311 to the RRC connection reconfiguration complete transmitted at step S4002.

Figure 42:
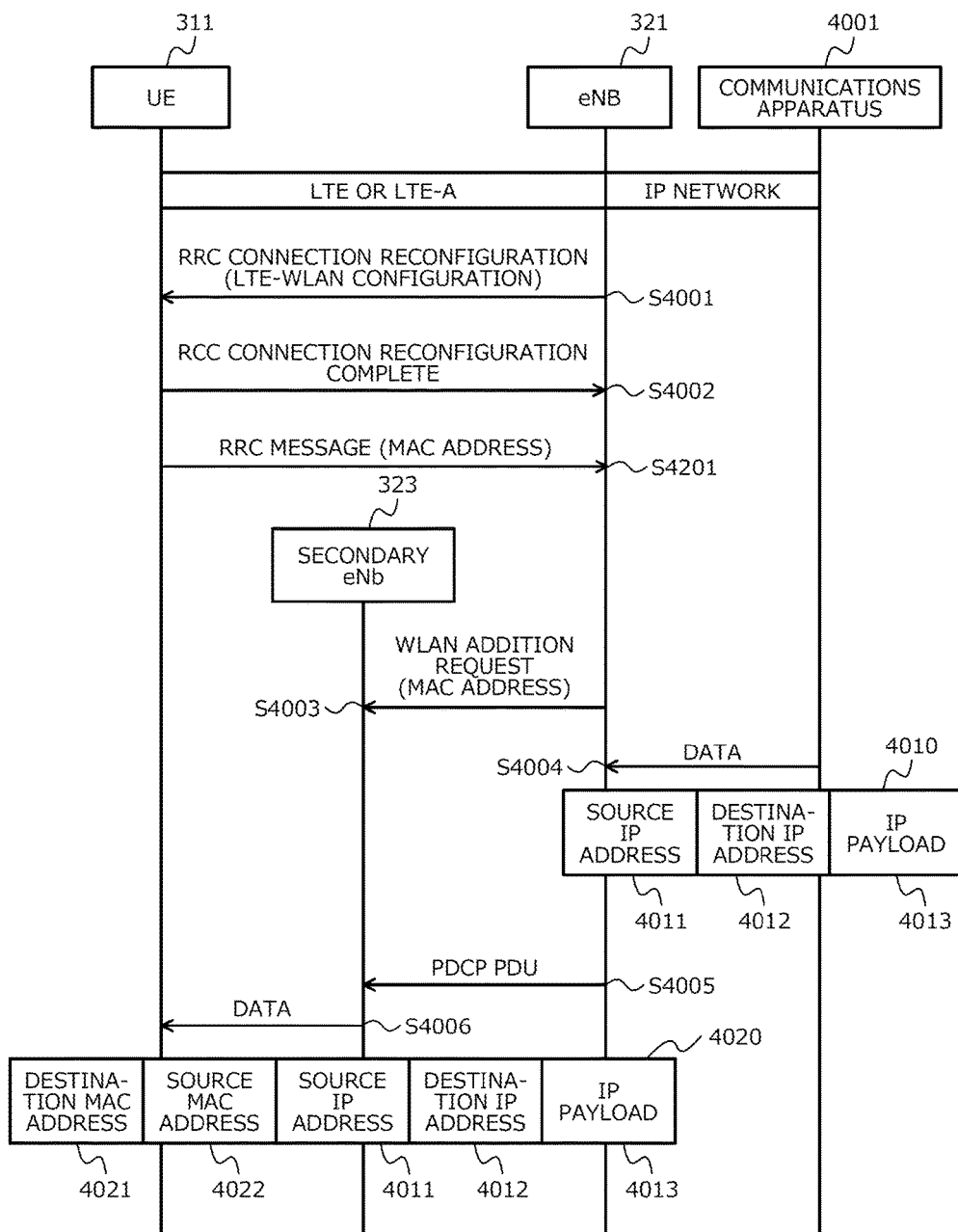
FIG. 42 is a sequence diagram of notification of the MAC address by a different RRC message in the processing in the wireless communications system according to the fourth embodiment.

FIG. 42 is a sequence diagram of notification of the MAC address by a different RRC message in the processing in the wireless communications system according to the fourth embodiment. In FIG. 42, parts identical to those depicted in FIG. 40 are designated by the same reference numerals used in FIG. 40 and will not again be described. The UE 311 transmits to the eNB 321, a RRC message that is different from the RRC connection reconfiguration complete and the RRC connection setup after step S4002 (step S4201). Further, the UE 311 stores the MAC address of the UE 311 to the RRC message transmitted at step S4201. In this case, the UE 311 may store the MAC address of the UE 311 to the RRC connection reconfiguration complete transmitted at step S4002.

As depicted in FIGS. 41 and 42, the RCC message used for giving notification of the MAC address of the UE 311 is not limited to the RRC connection reconfiguration complete and various types of RRC messages can be used.

Figure 43:
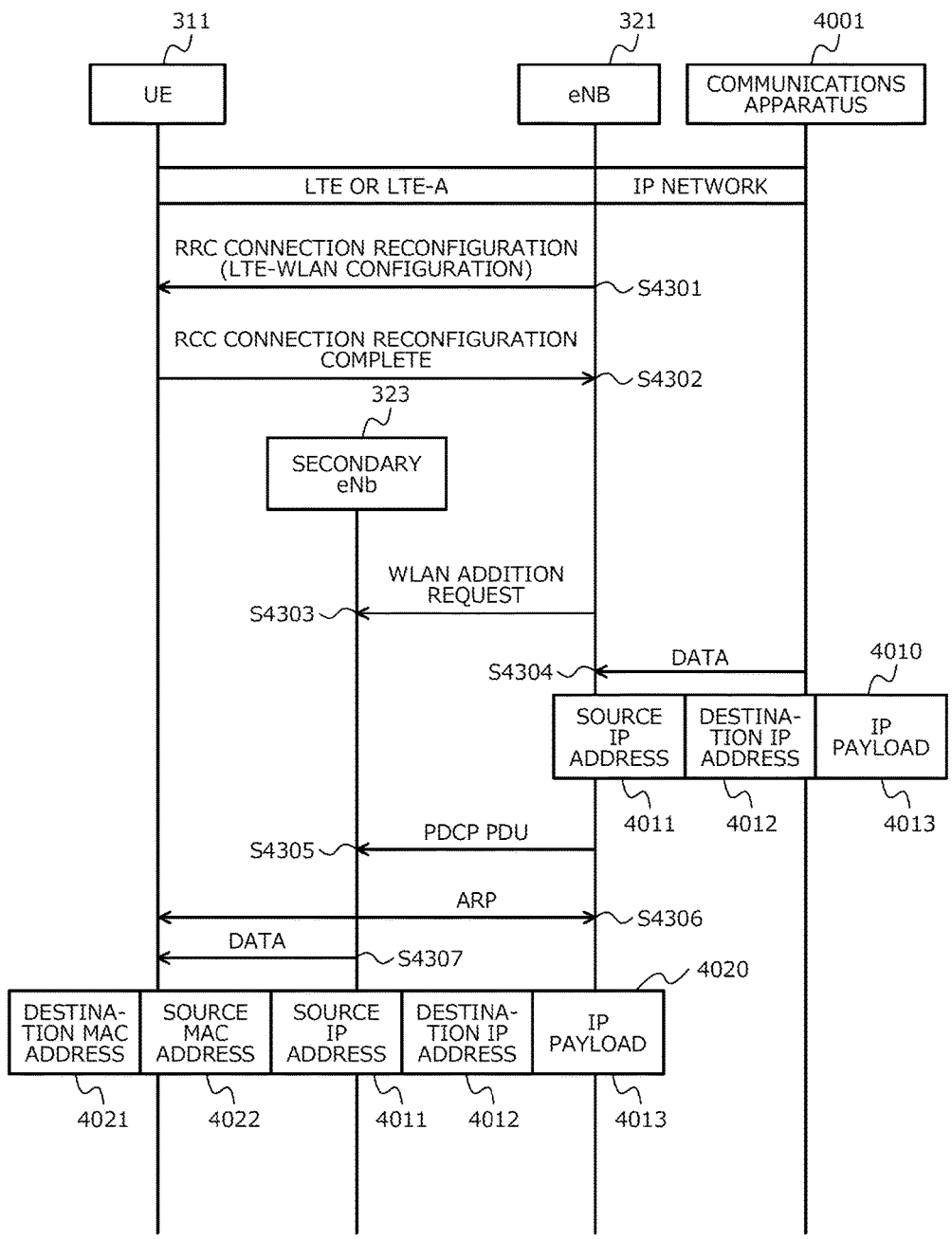
FIG. 43 is a sequence diagram of another example of processing in the wireless communications system according to the fourth embodiment.

FIG. 43 is a sequence diagram of another example of processing in the wireless communications system according to the fourth embodiment. In FIG. 43, parts identical to those depicted in FIG. 40 are designated by the same reference numerals used in FIG. 40 and will not again be described. In the wireless communications system 300 according to the fourth embodiment, address resolution is implemented by an execution of the steps depicted in FIG. 43.

Steps S4301 to S4305 depicted in FIG. 43 are identical to steps S4001 to S4005 depicted in FIG. 40. However, at step S4302, the UE 311 may store the MAC address of the UE 311 to the RRC connection reconfiguration complete. Further, at step S4303, the eNB 321 may store the MAC address of the UE 311 to the WLAN addition request.

Subsequent to step S4305, the eNB 321 causes operation under the ARP with the UE 311 by the adaption layer 3901 (step S4306). The eNB 321 notifies the secondary eNB 323 of the MAC address of the UE 311 acquired by the ARP. As a result, the secondary eNB 323 can acquire the MAC address of the UE 311.

Alternatively, at step S4306, operation under the ARP may be performed between the secondary eNB 323 and the UE 311. As a result, the secondary eNB 323 can acquire the MAC address of the UE 311.

The ARP at step S4306 can be, for example, an ARP originally designed at the adaption layer 3901 and not the ARP based on RFC826. The secondary eNB 323 can use an ARP packet to make an inquiry to the UE 311 for the MAC address. The ARP will be described hereinafter (e.g., refer to FIG. 44). The sequence of step S4305 and step S4306 may be interchanged.

Next, the secondary eNB 323 transmits to the UE 311 by a WLAN (IEEE MAC), the data converted into PDCP PDUs and transferred at step S4305 (step S4307). The data transmitted at step S4307, for example, is the same as the data 4020 depicted in FIG. 40. The destination MAC address 4021 in this case is the MAC address of the UE 311 acquired by the secondary eNB 323 by the ARP under operation at step S4306.

As depicted in FIG. 43, when the eNB 321 configures the LTE-WLAN aggregation in the secondary eNB 323(WLAN node), the adaption layer 3901 operates under an original ARP whereby acquisition of the MAC address of the UE 311 becomes possible. In this manner, for example, at the adaption layer 3901, the originally designed ARP can be used to resolve the MAC address.

Although configuration of the WLAN standalone configuration using the secondary eNB 323 having the eNB and WLAN communication functions, with the eNB 321 serving as a master eNB has been described, configuration may be such that the eNB 321 has the WLAN communication function and the secondary eNB 323 is not used. In this case, for example, step S4305 becomes unnecessary and the eNB 321, at step S4306, operates under the ARP. As a result, the eNB 321 can acquire the MAC address of the UE 311.

The eNB 321 transmits to the UE 311, the data 4020 obtained by adding the destination MAC address 4021 and the source MAC address 4022 to the data 4010 received from the communications apparatus 4001. The source MAC address 4022 in this case, is the MAC address of the eNB 321 that is the source of the data 4020.

Further, although downlink data transmitted from the communications apparatus 4001 to the UE 311 has been described, similarly for uplink data from the UE 311 to the communications apparatus 4001, the originally designed ARP can be used to resolve the MAC address. For example, when transmitting data destined for the communications apparatus 4001 by the WLAN, the UE 311 operates under the original ARP described above and acquires the MAC address of the secondary eNB 323 by making an inquire to the secondary eNB 323.

The UE 311 uses the acquired MAC address of the secondary eNB 323 as the destination to transmit uplink data to the secondary eNB 323. In this manner, for uplink data transmitted from the UE 311 to the communications apparatus 4001, the originally designed ARP can be used to resolve the MAC address.

Figure 44:
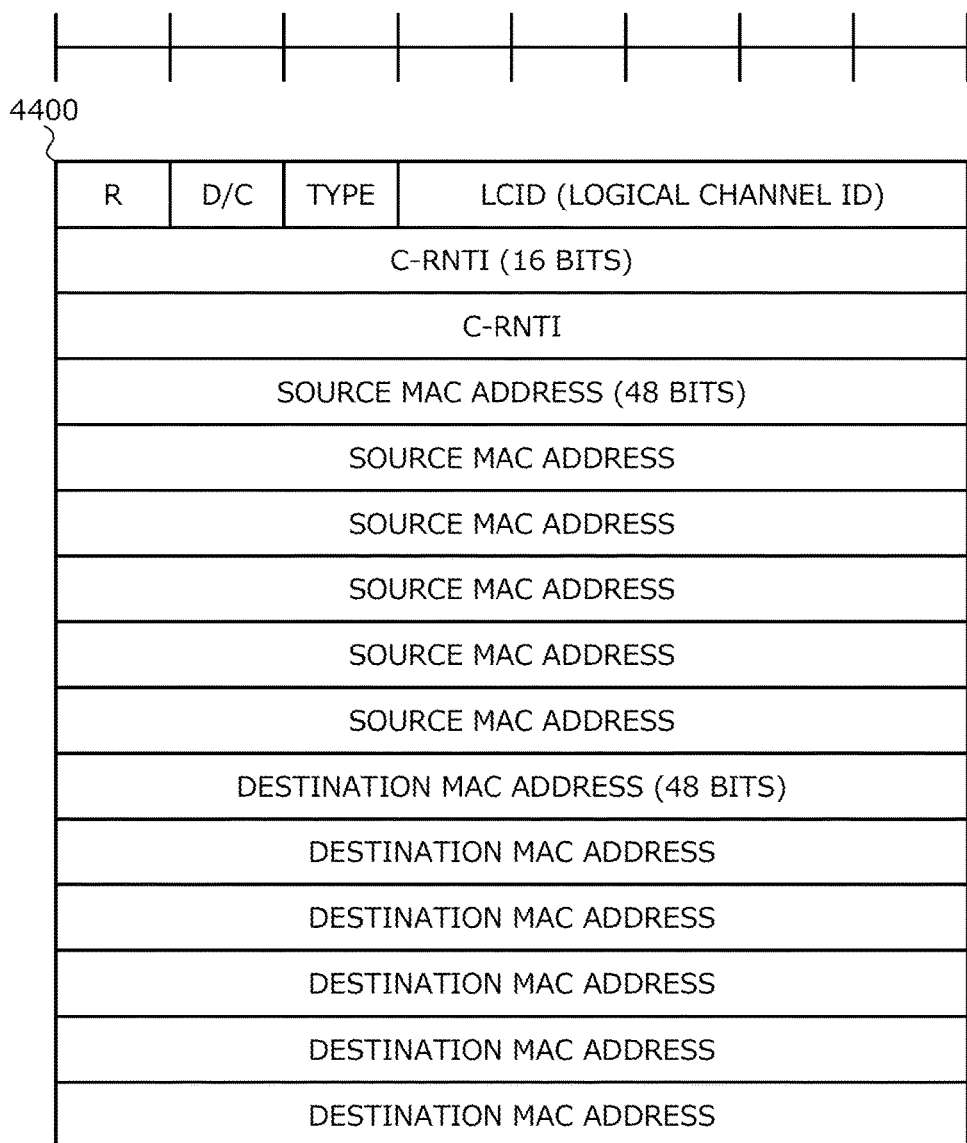
FIG. 44 is a diagram depicting an example of a packet format in an ARP applicable to the fourth embodiment.

FIG. 44 is a diagram depicting an example of a packet format in the ARP applicable to the fourth embodiment. As depicted in FIG. 43, in the originally designed ARP at the adaption layer 3901, for example, a packet 4400 depicted in FIG. 44 can be used. In the packet 4400, "R" represents a reserved bit (Reserved).

"D/C" represents information that indicates whether the packet 4400 is any one of a data signal (data) and a control signal (control). In "D/C", "D" (data) or "C" (control) is specified. In a case where "D" is specified in "D/C", this indicates that the second and subsequent packets 4400 are PDCP PDUs. In a case where "C" is specified in "D/C", this indicates that the second and subsequent packets 4400 are ARP control information. In the example depicted in FIG. 44, since the packet 4400 is used as an ARP packet, "C" in "D/C" is specified.

"Type" (Type) represents information that indicates whether the packet 4400 is any one of a request signal and a response signal. "Type" (Type) becomes disabled in cases where "D" is specified in "D/C". Further, "type" (Type) specifies a "request" (Request) or a "response" (Response) in cases where "C" is specified in "D/C". "LCID" represents a Logical Channel ID (LCID) under LTE. "C-RNTI" (Cell-Radio Network Temporary Identifier) is the Cell-Radio Network Temporary Identifier of the UE 311.

In the example depicted in FIG. 44, since the packet 4400 is used as an ARP packet, as described above, the second and subsequent packets 4400 store ARP control information. For example, the secondary eNB 323 (WLAN node) that makes an inquiry for the MAC address transmits the packet 4400 specifying "request" in "type". In this case, the MAC address (48 bits) of the secondary eNB 323 is stored in "the source MAC address" (Source MAC Address) of the packet 4400. Further, a broadcast MAC address (48 bits) is stored in "destination MAC address" (Destination MAC Address) of the packet 4400. As a result, the packet 4400 can be broadcast to make an inquiry for the MAC address to the UE 311.

With respect to the packet 4400 (request) from the secondary eNB 323, the UE 311 can determine that the packet 4400 is addressed to the UE 311 based on the "C-RNTI" of the packet 4400 and thus, can receive the packet 4400. The UE 311, when receiving the packet 4400 from the secondary eNB 323, transmits the packet 4400 specifying "response" in "type". In this case, the MAC address of the UE 311 (48 bits) is stored in "source MAC address" of the packet 4400. Further, the MAC address of the secondary eNB 323 is stored in "destination MAC address" (Destination MAC Address) of the packet 4400. As a result, the secondary eNB 323 can be notified of the MAC address of the UE 311.

However, in the originally designed ARP in the adaption layer 3901, a packet of a format of various forms can be used without limitation to the packet 4400 depicted in FIG. 44. For example, in the adaption layer 3901, destination identification information like "C-RNTI" together with "source MAC address" and "destination MAC address" may be included in the originally designed ARP. Further, in a case in which it is judged that the UE can be identified by only the MAC address, "C-RNTI" may be omitted.

In this manner, according to the fourth embodiment, for example, in a case in which the EPS bearers 1500 to 150*n* are divided for LTE-A and a WLAN and transmitted, PDCP packets transmitted by the WLAN can be transmitted by tunneling by the adaption layer 3901. As a result, at the receiver, data transmitted by the WLAN can be received as PDCP packets and the PDCP sequence numbers can be used to perform sequence control between the packets received by LTE-A and the packets received by the WLAN. Therefore, data transmission that concurrently uses LTE-A and a WLAN becomes possible.

Further, the receiver station can store to a RRC (radio resource control) message transmitted to the transmitter station, the MAC address of the receiver station usable in the WLAN (second wireless communication). As a result, when data is to be transmitted using the WLAN, the transmitter station can set the MAC address acquired from the RRC message as the destination address and transmit the data to the receiver station. Therefore, in the tunneling, even in cases where the adaption layer 3901 is used without using IP (the outer IP), resolution of the MAC address becomes possible.

Alternatively, when data is to be transmitted using the WLAN, the transmitter station can transmit to the receiver station, a first packet requesting the MAC address of the receiver station usable in the WLAN. In this case, in response to the first packet from the transmitter station, the receiver station can transmit to the transmitter station, a second packet that includes the MAC address of the receiver station. As a result, the transmitter station can transmit to the receiver station, data for which the MAC address of the receiver station acquired from the second packet from the receiver station is set as the destination address. Therefore, in the tunneling, even in a case in which the adaption layer 3901 is used without using IP (the outer IP), resolution of the MAC address becomes possible.

The fourth embodiment can be suitably implemented in combination with the first to third embodiments.

As described, according to the wireless communications system, the base station, the mobile station, and the processing method, data transmission concurrently using the first wireless communication and the second wireless communication can be performed. For example, aggregation concurrently using LTE-A and WLAN becomes possible whereby the transmission rate of user data can be improved.

Further, assuming that when aggregation that concurrently uses LTE-A and a WLAN is performed and the ToS field cannot be referred to in the WLAN, for example, it is conceivable that all of the traffic is regarded as best effort. However, in this case, QoS control cannot be performed according to the nature of the traffic. For example, VoLTE traffic also becomes best effort whereby the VoLTE communication quality degrades.

In contrast, according to the embodiments described above, an outer IP header is added to data that is to be transferred to the WLAN whereby in the WLAN, the ToS field can be referred to and QoS control performed according to the nature of the traffic becomes possible. For example, VoLTE traffic is classified to voice (VO) and preferentially transmitted by the WLAN whereby the VoLTE communication quality can be improved.

Further, under 3GPP LTE-A, in view of fifth generation mobile communication, in order to handle increasing mobile traffic and improve user experience, the study of an enhanced system is advancing so as to enable cellular communication in conjunction with other wireless systems. A particular issue is cooperation with a WLAN that is widely implemented not only in households and companies but also in smartphones.

In LTE Release 8, a technique of offloading user data to WLAN in an LTE-A core network has been standardized. In LTE Release 12, offloading has become possible taking into consideration WLAN wireless channel utilization rate or user inclination to offload. Dual connectivity for concurrent transmission of user data through aggregation of frequency carriers between LTE-A base stations has also been standardized.

In LTE-A Release 13, study of license assisted access (LAA), which is a wireless access scheme utilizing an unlicensed frequency band, has been initiated. LAA is a technique of layer 1 and is a carrier aggregation of the unlicensed frequency band and a licensed frequency band in LTE-A and controls wireless transmission of the unlicensed frequency band by LTE-A control channel.

Unlike LAA, standardization is also about to start for aggregating LTE-A and WLAN by the layer 2 to perform cooperative cellular communication. This is called LTE-WLAN aggregation. The LTE-WLAN aggregation has the following advantages as compared to the methods described above.

In the aggregation technology in the core network, high-speed aggregation according to the LTE-A radio quality is difficult, bringing about overhead of the control signal sent to the core network in the case of aggregation. Since the aggregation is carried out by the LTE-A layer 2 in the LTE-WLAN aggregation, the LTE-A radio quality can be rapidly reflected and control signals to the core network are unnecessary.

Although high-speed aggregation according to the LTE-A radio quality is possible in LAA, aggregation in cooperation with WLANs other than those of the LTE-A base stations is difficult. On the contrary, in LTE-WLAN aggregation, cooperative aggregation becomes possible by connecting the LTE-A base stations and already configured WLAN access points on the layer 2 level.

Currently, standardization is about to be promoted assuming not only a scenario that WLANs are incorporated into the LTE-A base stations, but also a scenario that the WLANs are independent. In this case, it becomes important to identify a LTE-A call (bearer) on the WLAN side and to establish a layer 2 configuration enabling user data transmission taking the QoS class of the LTE bearers into account. To this end, it is necessary to ensure LTE-A backward compatibility and not to impact to the WLAN specifications. In this regard, for example, although a method of encapsulating IP flows before reaching the layer 2 is also conceivable, the configuration of the layer 2 enabling the LTE-A bearers to be identified on the WLAN side leaves room for consideration.

According to the embodiments described above, aggregation concurrently using LTE-A and WLAN becomes possible while taking the QoS classes of the LTE bearers into account, by contriving the tunneling method of the PDCP packets obtained in the LTE-A layer 2.

However, with the conventional techniques above, when a first wireless communication of LTE, etc. and a second wireless communication of a WLAN, etc. are concurrently used to transmit data, it is difficult to control sequencing between the data received by the first wireless communication and data received by the second wireless communication of the receiving side. Therefore, in some cases, data transmission concurrently using the first wireless communication and the second wireless communication cannot be performed.

According to one aspect of the present invention, an effect is achieved in that data transmission that uses the first wireless communication and the second wireless communication can be performed.

(Note 1) A wireless communications system comprising:
a base station configured to control by a control unit configured to control a first wireless communication, a second wireless communication different from the first wireless communication; and
a mobile station capable of data transmission with the base station using the first wireless communication or the second wireless communication, wherein
in a case where data is transmitted between the base station and the mobile station by using the second wireless communication, a processing unit that is for performing the first wireless communication and that is the processing unit at a transmitter station among the base station and the mobile station and transmitting to a receiver station among the base station and the mobile station by performing tunneling processing, the data after convergence layer processing of a convergence layer for performing the first wireless communication, and
the receiver station makes performing reception of data transmitted from the transmitter station by the first wireless communication and data transmitted from the transmitter station by the second wireless communication, based on first wireless communication processing possible.

(Note 2) The wireless communications system according to Note 1, wherein
the processing unit transmits to the receiver station by the tunneling processing, a sequence number added by the convergence layer processing,
the first wireless communication processing includes performing based on the sequence number, sequence control of the data transmitted from the transmitter station by the first wireless communication and the data transmitted from the transmitter station by the second wireless communication.

(Note 3) The wireless communications system according to Note 1 or 2, wherein
data is transmitted between the base station and the mobile station by concurrently using the first wireless communication and the second wireless communication.

(Note 4) The wireless communications system according to any one of Notes 1 to 3, wherein
the processing unit for performing the first wireless communication in the transmitter station, in the case where the data is transmitted between the base station and the mobile station by using the second wireless communication, adds to the data after the convergence layer processing, a header that includes service quality information and that is the header of the data before the convergence layer processing and transmits to the receiver station, the data to which the header is added.

(Note 5) The wireless communications system according to Note 4, wherein in the second wireless communication, transmission control based on the service quality information is performed.

(Note 6) The wireless communications system according to Note 4 or 5, wherein
the convergence layer processing includes at least one of ciphering for the data, header compression, and addition of the sequence number.

(Note 7) The wireless communications system according to any one of Notes 1 to 6, wherein
the processing unit for performing the first wireless communication in the transmitter station, in the convergence layer, aggregates a plurality of bearers of the mobile station and transmits the data to the receiver station by the aggregated bearers.

(Note 8) The wireless communications system according to any one of Notes 1 to 6, wherein
the control unit is the plurality of bearers of the mobile station and controls transmission of the data to the receiver station so that each data of the plurality of bearers that have a same service class are not transmitted concurrently using the second wireless communication.

(Note 9) The wireless communications system according to any one of Notes 1 to 8, wherein
in the case where the data is transmitted from the base station to the mobile station by using the second wireless communication, the mobile station processes the data received using the second wireless communication without identifying a bearer that corresponds to the data among bearers of the first wireless communication of the mobile station.

(Note 10) The wireless communications system according to any one of Notes 1 to 9, wherein in the case where the data is transmitted from the base station to the mobile station by using the second wireless communication, the base station, with respect to the data received by using the second wireless communication, performs packet filtering using a filtering rule in an uplink from the mobile station to the base station and thereby identifies a bearer corresponding to the received data among bearers of the first wireless communication of the mobile station.

(Note 11) The wireless communications system according to any one of Notes 1 to 10, wherein in the case where the data is transmitted from the base station to the mobile station by using the second wireless communication, the mobile station, with respect to the data received by using the second wireless communication, performs packet filtering using a filtering rule in a downlink from the base station to the mobile station and thereby identifies a bearer corresponding to the received data among bearers of the first wireless communication of the mobile station.

(Note 12) The wireless communications system according to any one of Notes 1 to 9, wherein in the case where the data is transmitted from the base station to the mobile station by using the second wireless communication, the transmitter station transmits the data by a virtual data flow of the second wireless communication configured between the base station and the mobile station, and the receiver station identifies by a destination address of the virtual flow receiving the data, a bearer corresponding to the received data among bearers of the first wireless communication of the mobile station.

(Note 13) The wireless communications system according to any one of Notes 1 to 9, wherein in the case where the data is transmitted from the base station to the mobile station by using the second wireless communication, the transmitter station transmits the data by a virtual local area communications network of the second wireless communication configured between the base station and the mobile station, and the receiver station identifies by an identifier of the virtual local area communications network receiving the data, a bearer corresponding to the received data among bearers of the first wireless communication of the mobile station.

(Note 14) The wireless communications system according to any one of Notes 1 to 9, wherein in the case where the data is transmitted from the base station to the mobile station by using the second wireless communication, the transmitter station transmits the data by an encapsulated tunnel of the second wireless communication configured between the base station and the mobile station, and the receiver station identifies by a destination address of the encapsulated tunnel receiving the data, a bearer corresponding to the received data among bearers of the first wireless communication of the mobile station.

(Note 15) The wireless communications system according to any one of Notes 1 to 13, wherein in the case where the data is transmitted from the base station to the mobile station by using the second wireless communication, the base station and the mobile station configure therebetween a communication channel of the second wireless communication for transmitting data of the first wireless communication and transmit the data through the configured communication channel.

(Note 16) The wireless communications system according to any one of Notes 1 to 15, wherein the receiver station stores to a radio resource control message transmitted to the transmitter station, an address of the receiver station usable in the second wireless communication, and in the case where the data is transmitted from the base station to the mobile station by using the second wireless communication, the transmitter station sets the address acquired from the radio resource control message as a destination address and transmits the data to the transmitter station.

(Note 17) The wireless communications system according to any one of Notes 1 to 15, wherein in the case where the data is transmitted from the base station to the mobile station by using the second wireless communication, the transmitter station transmits to the receiver station, a first packet requesting an address of the receiver station usable in the second wireless communication, the receiver station transmits to the receiver station in response the first packet from the transmitter station, a second packet that includes the address, and the transmitter station sets the address acquired from the second packet from the receiver station as a destination address and transmits the data to the receiver station.

(Note 18) A base station capable of data transmission with a mobile station by using a first wireless communication or a second wireless communication different from the first wireless communication, the base station comprising:

a control unit configured to control the first wireless communication and the second wireless communication;

a processing unit that is a processing unit for performing the first wireless communication and configured to transmit to the mobile station by performing tunneling processing in a case where data is transmitted from the base station to the mobile station by using the second wireless communication, the data after convergence layer processing of a convergence layer for performing the first wireless communication.

(Note 19) A mobile station capable of data transmission with a base station by using a first wireless communication or a second wireless communication different from the first wireless communication, the mobile station comprising:

a processing unit that is for performing the first wireless communication and configured to transmit to the base station by performing tunneling processing in a case where data is transmitted from the base station to the mobile station by using the second wireless communication, the data after convergence layer processing of a convergence layer for performing the first wireless communication.

(Note 20) A processing method by a base station capable of data transmission with a mobile station by using a first wireless communication or a second wireless communication different from the first wireless communication, the processing method comprising:

controlling the first wireless communication and the second wireless communication; and at a processing unit for performing the first wireless communication, transmitting to the mobile station by performing tunneling processing in a case where data is transmitted from the base station to the mobile station by using the second wireless communication, the data after convergence layer processing of a convergence layer for performing the first wireless communication.

(Note 21) A processing method by a mobile station base station of data transmission with a base station by using a first wireless communication or a second wireless communication different from the first wireless communication, the processing method comprising:

at a processing unit for performing the first wireless communication, transmitting to the mobile station by performing tunneling processing in a case where data is transmitted from the base station to the mobile station by using the second wireless communication, the data after convergence layer processing of a convergence layer for performing the first wireless communication.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communications system comprising:
a first wireless communications apparatus configured to control a first wireless communication and a second wireless communication different from the first wireless communication;
a second wireless communications apparatus configured to perform the second wireless communication; and
a third wireless communications apparatus configured to communicate with the first wireless communications apparatus via the first wireless communication or the second wireless communication, wherein
the third wireless communications apparatus transmits to the first wireless communications apparatus a control message that includes an available address of the third wireless communications apparatus in the second wireless communication,
the first wireless communications apparatus notifies the second wireless communications apparatus of the address acquired from the control message,
in a case where data is transmitted from the first wireless communications apparatus to the third wireless communications apparatus by the second wireless communications apparatus via the second wireless communication, the first wireless communication apparatus transfers the data to the second wireless communications apparatus through an adaptation sublayer that includes a process of adding a header to the data, wherein before the process of the adaptation sublayer, the data is processed in a convergence layer that includes a process of routing the data between the first wireless communication and the second wireless communication, and
the second wireless communications apparatus transmits the data transferred from the first wireless communications apparatus, to the third wireless communications apparatus via the second wireless communication.

2. The wireless communications system according to claim 1, wherein
the first wireless communications apparatus transmits to the third wireless communications apparatus, a request signal to request the available address of the third wireless communications apparatus in the second wireless communication, and
the third wireless communications apparatus transmits to the first wireless communications apparatus in response to the request signal from the first wireless communications apparatus, a control message including the address.

3. The wireless communications system according to claim 2, wherein
the request signal is a RRC connection reconfiguration signal.

4. The wireless communications system according to claim 1, wherein
the processor transfers to the second wireless communications apparatus, the data to which a sequence number is added through the convergence layer processing, and
the third wireless communications apparatus performs according as the sequence number, sequence control of data transmitted from the first wireless communications apparatus via the first wireless communication and data transmitted from the second wireless communications apparatus via the second wireless communication.

5. The wireless communications system according to claim 1, wherein
the processor for performing the first wireless communication in the first wireless communications apparatus, in a case where the data is transmitted between the first wireless communications apparatus and the third wireless communications apparatus via the second wireless communication, adds to the data after the convergence layer processing, a header that includes service quality information and is the header of the data before the convergence layer processing, and transfers to the second wireless communications apparatus, the data to which the header is added.

6. The wireless communications system according to claim 5, wherein
in the second wireless communication, transmission control according to the service quality information is performed.

7. The wireless communications system according to claim 5, wherein
the convergence layer processing includes at least any one of ciphering the data, header compression, and addition of the sequence number.

8. A base station configured to communicate with a first wireless communications apparatus via a first wireless communication or a second wireless communication different from the first wireless communication, the base station comprising:
a receiver configured to receive from the first wireless communications apparatus a control message that includes an available address of the first wireless communications apparatus in the second wireless communication, and
a transmitter configured to notify a second wireless communications apparatus of the address acquired from the control message, wherein,
in a case of transmitting data from the base station to the first wireless communications apparatus by a second-wireless communications apparatus via the second wireless communication, the transmitter transfers the data to the second wireless communications apparatus through an adaptation sublayer that includes a process of adding a header to the data, wherein before the process of the adaptation sublayer, the data is processed in a convergence layer that includes a process of routing the data between the first wireless communication and the second wireless communication.

9. A mobile station configured to communicate with a first wireless communications apparatus via a first wireless communication or a second wireless communication different from the first wireless communication, the mobile station comprising:
  a transmitter configured to transmit to the first wireless communication apparatus a control message that includes an available address of the mobile station in the second wireless communication,
  a receiver configured to receive from a second wireless communications apparatus a data that being addressed to a destination address that is the address acquired from the control message and being notified to the second wireless communications apparatus by the first wireless communications apparatus,
  wherein, the data is transferred to the second wireless communications apparatus by the first wireless communications apparatus through an adaptation sublayer that includes a process of adding a header to the data, wherein before the process of the adaptation sublayer, and the data is processed in a convergence layer that includes a process of routing the data between the first wireless communication and the second wireless communication.

10. A processing method in a wireless communications system including:
  a first wireless communications apparatus configured to control a first wireless communication and a second wireless communication different from the first wireless communication;
  a second wireless communications apparatus configured to perform the second wireless communication; and
  a third wireless communications apparatus configured to communicate with the first wireless communications apparatus via the first wireless communication or the second wireless communication,
the processing method comprising:
  the third wireless communications apparatus transmitting to the first wireless communications apparatus, a control message that includes an available address of the third wireless communications apparatus in the second wireless communication;
  the first wireless communication apparatus notifies the second wireless communication apparatus of the address required from the control message,
  in a case where data is transmitted from the first wireless communications apparatus to the third wireless communications apparatus by the second wireless communications apparatus via the second wireless communication, the first wireless communications apparatus transfers the data to the second wireless communications apparatus through an adaptation sublayer that includes a process of adding a header to the data, wherein before the process of the adaptation sublayer, the data is processed in a convergence layer that includes a process of routing the data between the first wireless communication and the second wireless communication; and
  the second wireless communications apparatus transmits to the third wireless communications apparatus via the second wireless communication, the data transferred from first wireless communications apparatus.

* * * * *